US006339685B1

(12) United States Patent
Okamoto et al.

(10) Patent No.: US 6,339,685 B1
(45) Date of Patent: Jan. 15, 2002

(54) SHEET PROCESSING APPARATUS WITH SHEET SIZE DETECTION AND CONVEYANCE OR PROCESSING FEATURES AND CONTROL METHOD THEREOF, SHEET PROCESSING METHOD, IMAGE FORMATION APPARATUS, IMAGE FORMATION SYSTEM, CONTROL METHOD THEREOF, AND STORAGE MEDIUM RELATED THERETO

(75) Inventors: Kiyoshi Okamoto, Toride; Shokyo Koh, Mishima; Norifumi Miyake, Kashiwa; Mitsushige Murata, Abiko; Akinobu Nishikata, Yokohama; Nobuo Sekiguchi; Hideyuki Ikegami, both of Shizuoka-ken, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/616,075

(22) Filed: Jul. 13, 2000

(30) Foreign Application Priority Data

Jul. 15, 1999 (JP) ........................................... 11-201531
Jul. 23, 1999 (JP) ........................................... 11-209159
Aug. 27, 1999 (JP) ........................................... 11-241488

(51) Int. Cl.$^7$ .............................................. G03G 15/00
(52) U.S. Cl. ........................ 399/16; 399/18; 399/407; 270/58.01
(58) Field of Search .............................. 399/16, 15, 19, 399/20, 21, 382, 389, 407, 408; 270/58.02, 58.03, 58.04, 58.05, 58.01; 340/674, 675

(56) References Cited

U.S. PATENT DOCUMENTS

| 5,417,417 A | 5/1995 | Takehara et al. ............. 271/296 |
| 5,449,167 A | 9/1995 | Takehara et al. ............. 271/296 |
| 5,881,352 A | * 3/1999 | Kobayashi et al. .......... 399/408 |
| 5,938,186 A | 8/1999 | Sato et al. ................. 270/58.11 |
| 5,951,000 A | 9/1999 | Sato et al. ................. 270/58.11 |

FOREIGN PATENT DOCUMENTS

| JP | 8-113379 | * 5/1996 |
| JP | 11-65193 | * 3/1999 |

* cited by examiner

*Primary Examiner*—Joan Pendegrass
(74) *Attorney, Agent, or Firm*—Fitzpatrick, Cella, Harper & Scinto

(57) ABSTRACT

Even if a user sets an erroneous setting to a sheet, in order to provide an image formation system which can recycle sheets and improve operability without executing incorrect processing to the sheet, a reference value, which is referred in confirming an abnormal state of the sheet to be conveyed, before a generation of sheet size information is made to differ from the reference value after the generation of the sheet size information on the basis of a sheet detected result. In accordance with the sheet size information to be confirmed and the sheet size information acquired according to an instruction from an operator, processing corresponding to the instruction from the operator to the sheet is invalidated. An image formation operation is interrupted in accordance with the sheet size information to be confirmed and the sheet size information acquired according to the instruction from the operator.

63 Claims, 49 Drawing Sheets

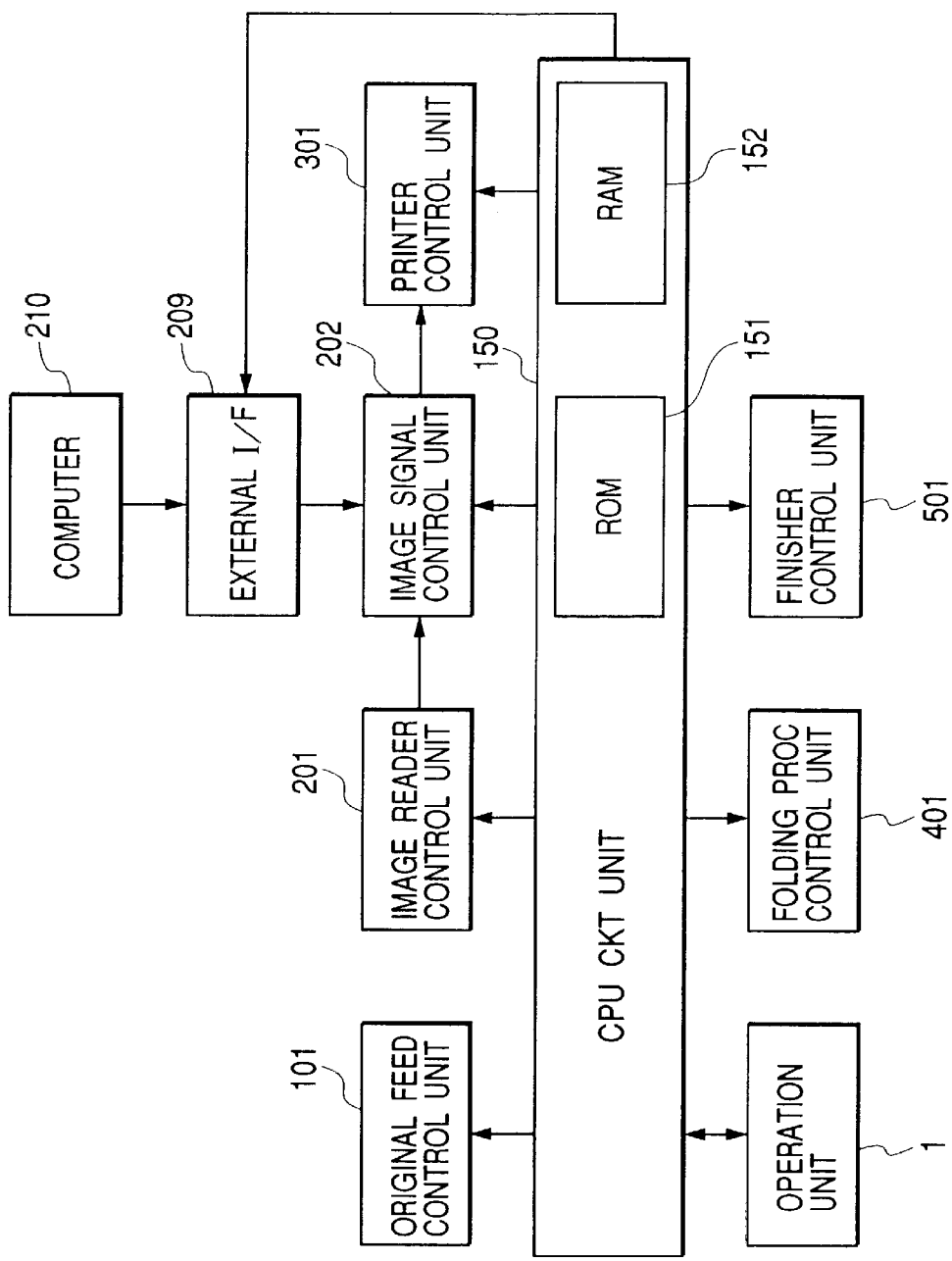

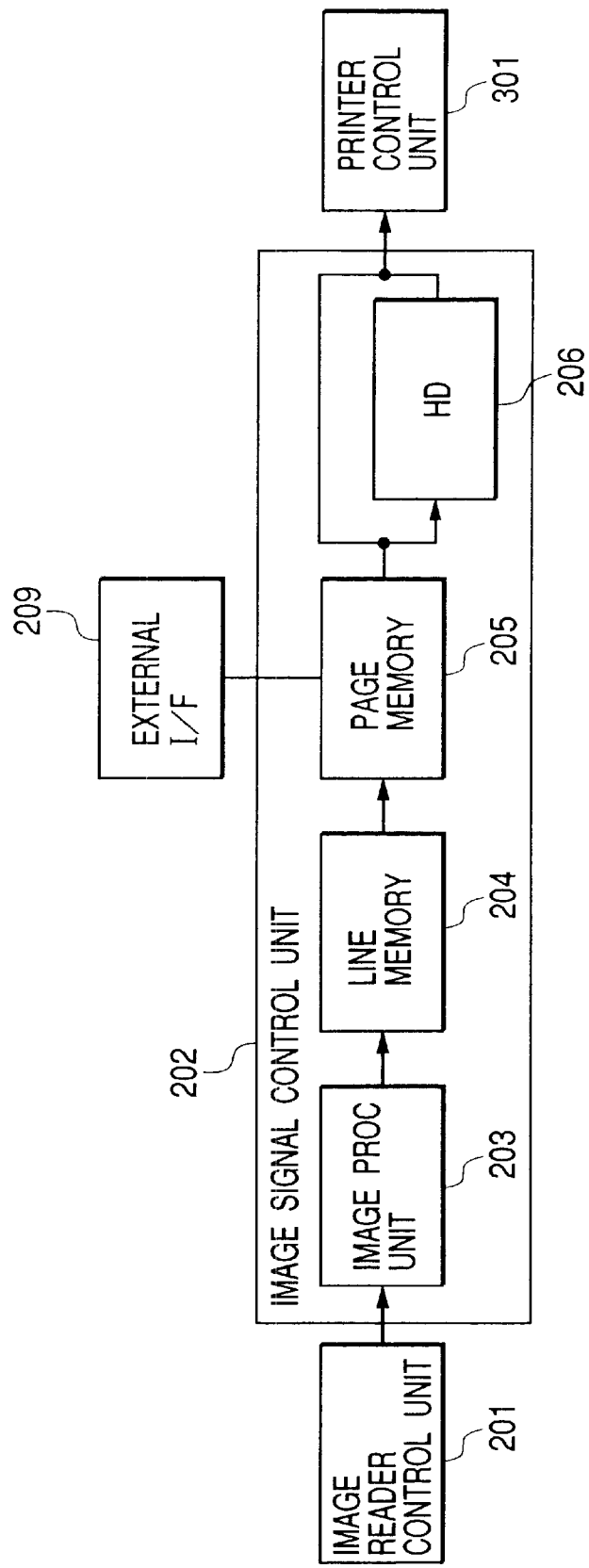

FIG. 7A

SHEET PROC SELECTION MENU

SELECT KIND OF SHEET PROC     CANCEL

SORT    GROUP    STAPLING SORT

Z FOLDING    PUNCHING    BOOKBINDING    OK

FIG. 7B

COVER DESIGNATION MENU

DESIGNATE COVER    CANCEL

INSERTER    MANUAL FEEDER

| POSITION OF SHEET A | PROC | RESIDUAL JAM TIMER SET VALUE |
|---|---|---|
| (1) | START OF SIZE DETECTION (IN CARRYING DIRECTION), SW907 RESIDUAL JAM TIMER SET | max_length+stay_margin |
| (2) | SIZE DETERMINATION, SW907 RESIDUAL JAM TIMER CLEARANCE | |
| (3) | SW531 RESIDUAL JAM TIMER SET | detect_length1+stay_margin |
| (4) | SW531 RESIDUAL JAM TIMER CLEARANCE | |
| (5) | SW533 RESIDUAL JAM TIMER SET | detect_length1+stay_margin |

| POSITION OF SHEET B | PROC | RESIDUAL JAM TIMER SET VALUE |
|---|---|---|
| (a) | START OF SIZE DETECTION (IN CARRYING DIRECTION), SW907 RESIDUAL JAM TIMER SET | max_length+stay_margin |
| (b) | SW531 RESIDUAL JAM TIMER SET | max_length+stay_margin |
| (c) | SIZE DETERMINATION, SW907 RESIDUAL JAM TIMER CLEARANCE | |
| (d) | SW531 RESIDUAL JAM TIMER CLEARANCE | |
| (e) | SW533 RESIDUAL JAM TIMER SET | detect_length2+stay_margin |

| NAME | CONTENT | VALUE | UNIT |
|---|---|---|---|
| max_length | MAX SIZE (IN CARRYING DIRECTION) MANAGEABLE BY INSERTER | 432 (CORRESPONDING TO LDR) | mm |
| stay_margin | DETECTION MARGIN FOR RESIDUAL JAM DETECTION | 50 | mm |
| delay_margin | DETECTION MARGIN FOR DELAY JAM DETECTION | 100 | mm |
| detect_length1 | SHEET LENGTH (IN CARRYING DIRECTION) AFTER SIZE DETERMINATION OF SHEET A | XA | mm |
| detect_length2 | SHEET LENGTH (IN CARRYING DIRECTION) AFTER SIZE DETERMINATION OF SHEET B | XB | mm |

FIG. 34

| SIZE INFORMATION | SIZE RANGE | SW0 | SW1 | SW2 | SW3 | SW4 | DEC |
|---|---|---|---|---|---|---|---|
| A4/A3 AND ABOVE | 303.0mm–299.0mm | 0 | 0 | 0 | 1 | 0 | 8 |
| | | 0 | 0 | 0 | 1 | 0 | 8 |
| A4/A3 | 299.0mm–295.0mm | 1 | 0 | 0 | 1 | 0 | 9 |
| | | 1 | 0 | 0 | 0 | 0 | 1 |
| LTR/LDR AND ABOVE | 295.0mm–281.4mm | 0 | 0 | 0 | 0 | 0 | 0 |
| | | 0 | 1 | 0 | 0 | 0 | 2 |
| LTR/LDR | 281.4mm–277.4mm | 1 | 1 | 0 | 0 | 0 | 3 |
| | | 1 | 1 | 1 | 0 | 0 | 7 |
| B5/B4 AND ABOVE | 277.4mm–259.0mm | 0 | 1 | 1 | 0 | 0 | 6 |
| | | 0 | 0 | 1 | 0 | 0 | 4 |
| B5/B4 | 259.0mm–255.0mm | 1 | 0 | 1 | 0 | 0 | 5 |
| | | 1 | 0 | 1 | 0 | 1 | 21 |
| STMT/LGL/LTRR AND ABOVE | 255.0mm–217.9mm | 0 | 0 | 1 | 0 | 1 | 20 |
| | | 0 | 1 | 1 | 0 | 1 | 22 |
| STMT/LGL/LTRR | 217.9mm–213.9mm | 1 | 1 | 1 | 0 | 1 | 23 |
| | | 1 | 1 | 0 | 0 | 1 | 19 |
| A5/A4R AND ABOVE | 213.9mm–212.0mm | 0 | 1 | 0 | 0 | 1 | 18 |
| | | 0 | 1 | 0 | 1 | 1 | 26 |
| A5/A4R | 212.0mm–208.0mm | 1 | 1 | 0 | 1 | 1 | 27 |
| | | 1 | 1 | 0 | 1 | 1 | 25 |
| B5R AND ABOVE | 208.0mm–184.0mm | 0 | 0 | 0 | 1 | 1 | 24 |
| | | 0 | 0 | 0 | 0 | 1 | 16 |
| B5R | 184.0mm–180.0mm | 1 | 0 | 0 | 0 | 1 | 17 |
| | | 1 | 0 | 0 | 0 | 1 | 17 |

SHEET PROCESSING APPARATUS WITH SHEET SIZE DETECTION AND CONVEYANCE OR PROCESSING FEATURES AND CONTROL METHOD THEREOF, SHEET PROCESSING METHOD, IMAGE FORMATION APPARATUS, IMAGE FORMATION SYSTEM, CONTROL METHOD THEREOF, AND STORAGE MEDIUM RELATED THERETO

BACKGROUND OF THE INVENTION

1. Field of the Invention

The present invention relates to a sheet processing apparatus which performs appropriate processing according to a sheet size, a control method thereof, a sheet processing method, an image formation apparatus, an image formation system, a control method thereof, and a storage medium.

2. Related Background Art

Conventionally, an image formation apparatus or an image formation system which has a mode such as a cover mode, an insert sheet mode (or a slipsheet mode) or the like has been proposed. It should be noted that in the cover mode a high added-value sheet (i.e., a specific sheet) on which an image was previously formed and which is thus different from an ordinary recording sheet is inserted in a head page or a final page, and in the insert sheet mode the specific sheet is inserted between adjacent intermediate pages. When such the mode is set by a user on an operation unit of the image formation apparatus, for example, a sheet of different color or a color-copied sheet can be inserted as a cover or a divider to divided or partition an arbitrary number of sheets. Further, in order to bind and manage such plural different-type sheets as one sheaf of sheets, an apparatus or a system which performs sheet process (or operation) such as sort processing, binding processing, punch processing and the like to realize high-quality processing is being designed.

However, in the above apparatus or system, for example, when the size of the specific sheet designated by the user through the operation unit or the like is different from the size of the specific sheet actually set to the apparatus or system because of user's erroneous setting, there is some fear that inappropriate processing is performed to the sheet.

For example, there is some fear that a sheet jam is erroneously detected in such the situation as above. When a real sheet jam occurs, a user must eliminate a jammed sheet. Therefore, if the sheet tears or becomes dirty in such a sheet elimination working, this sheet can not be reused and thus must be discarded, whereby the user has to prepare the identical sheet again. For this reason, there is some fear that extra time and labor to the user increase, and also costs increase. The possibility that such an inconvenience occurs increases, as the erroneous detection of the sheet jam happens. Even if such the inconvenience does not occur, there is some fear that data which the user does not intend is output. For example, there are possibilities that erroneous sort processing is performed on the sheets, and sheet processing such as binding processing, punch processing or the like is performed at a position quite different from a user-intended position. Even in such cases, the processed sheets can not be reused and thus must be discarded resultingly, whereby extra time and labor to the user increase, and also costs increase.

As above, when the size of the sheet designated by the user or the like is different from the size of the actual sheet, it is impossible to deal with anything, whereby there is a possibility that the above various inconveniences occur.

SUMMARY OF THE INVENTION

An object of the present invention is to provide a sheet processing apparatus which solves the above problems, a control method thereof, a sheet processing method, an image formation apparatus, an image formation system, a control method thereof, and a storage medium.

The present invention relates to a sheet processing apparatus which can make, even if a user performed erroneous setting to a sheet, this sheet reusable and improve operability without performing inappropriate processing to this sheet, a control method thereof, a sheet processing method, an image formation apparatus, an image formation system, a control method thereof, and a storage medium.

Other objects and features of the present invention will become apparent from the following detailed description and the attached drawings.

BRIEF DESCRIPTION OF THE DRAWINGS

FIG. 3 is a block diagram showing a copying machine;

FIG. 4 is a block diagram for explaining an image signal control unit in detail;

FIGS. 7A and 7B are diagrams showing contents of an display panel of an operation unit;

FIG. 31 is a diagram for explaining an example of a jam detection method;

FIG. 34 is a table showing width-direction size information of insert sheets determined by the slide switch;

DETAILED DESCRIPTION OF THE PREFERRED EMBODIMENTS

Figure 1:
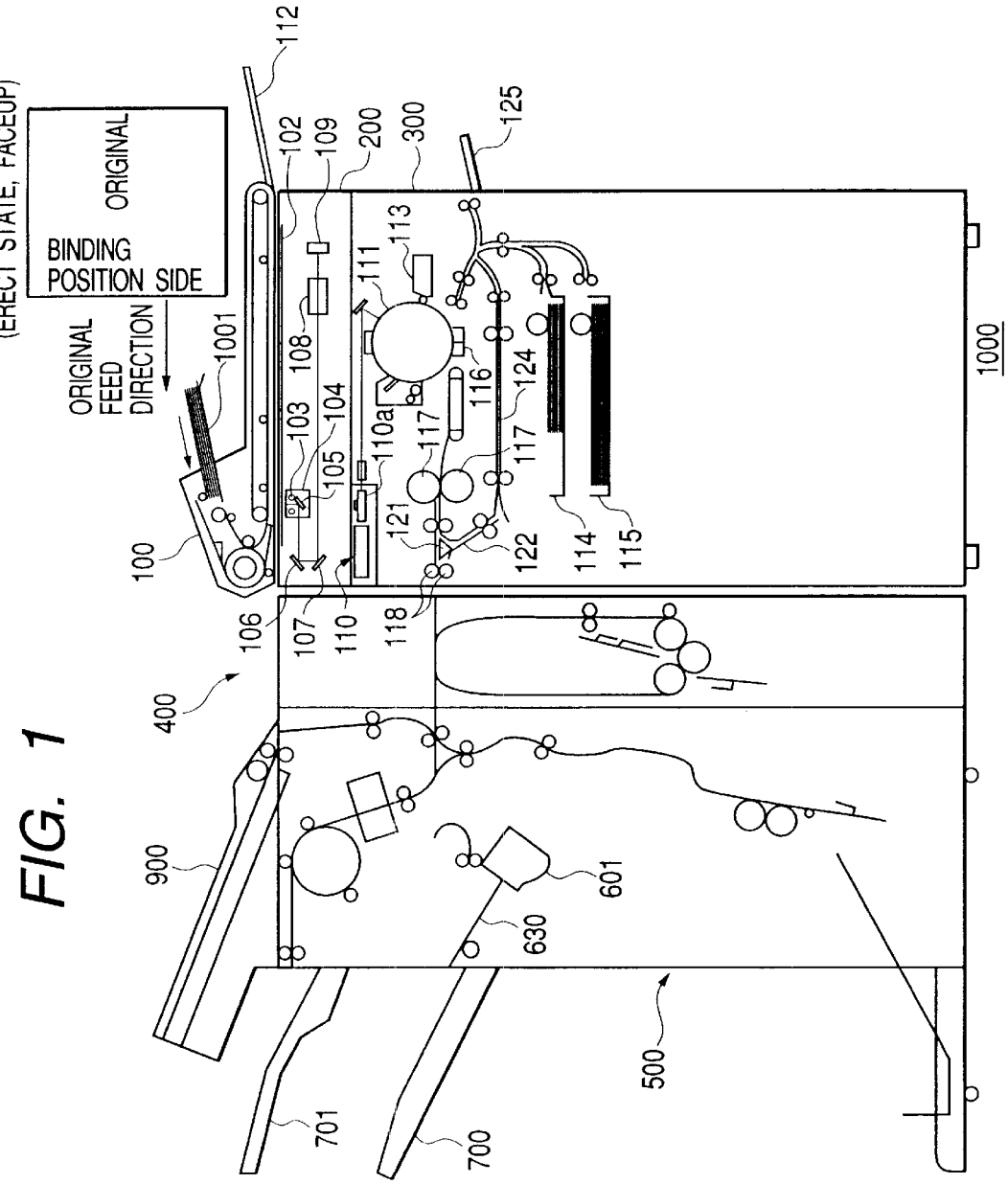
FIG. 1 is a sectional view showing an example of an image formation system.

FIG. 1 is a sectional view showing an internal structure of an image formation system 1000 according to the embodiment of the present invention. The image formation system 1000 includes an original feed unit 100, an image reader unit 200, a printer unit 300, a folding processing unit 400, a finisher 500, an inserter 900 and the like.

In FIG. 1, it is assumed that an original is set on an original tray 1001 of the original feed unit 100 such that the original is in an erect state and in a faceup state (i.e., the face on which an image was formed is set faceup) from the viewpoint of a user, and an original binding position is located at the left of the original. The original set on the tray 1001 is carried (or conveyed) left (i.e., in the direction indicated by the arrow) one by one from its head page. Namely, the original is carried such that its binding position becomes the leading edge. Further, the original is reversed through a curved path, carried from the left to the right on a platen glass 102, and then discharged onto a sheet discharge tray 112. At this time, a scanner unit 104 is held at a predetermined position, whereby original reading processing (or operation) is performed when the original is carried on the scanner unit 104 from the left to the right. Such an original reading method is defined as original running reading. When the original is carried on the platen glass 102, the original is illuminated by a lamp 103 of the scanner unit 104, and reflection light from the original is guided to an image sensor 109 through mirrors 105, 106 and 107 and a lens 108.

Also, it is possible to perform the original reading processing by once stopping the original carried by the original feed unit 100 on the platen glass 102 and then moving the scanner unit 104 from the left to the right in this state. Such an original reading method is defined as original standing reading. When the original is read without using the original feed unit 100, the user lifts the original feed unit 100 and directly sets the original onto the platen glass 102. In this case, the original standing reading is performed.

The image data of the original read by the image sensor 109 is subjected to predetermined image processing and transferred to an exposure control unit 110. The exposure control unit 110 outputs a laser beam in response to the transferred image data. The output laser beam is irradiated onto a photosensitive drum 111 through a polygonal mirror 110a to scan the drum 111, whereby an electrostatic latent image according to the scanning laser beam is formed on the drum 111.

The electrostatic latent image formed on the photosensitive drum 111 is developed by a development unit 113 and thus visualized as a toner image. On the other hand, a recording sheet is carried to a transfer unit 116 from either a cassette 114, a cassette 115, a manual sheet feed unit 125 or a double-faced sheet carrying (conveyance) path 124. The visualized toner image is transferred to the recording sheet by the transfer unit 116, and the recording sheet is subjected to fixing processing (or operation) by a pair of fixing units (simply called a fixing unit) 117.

The recording sheet passed the fixing unit 117 is once guided to a path 122 by a flapper 121. After the trailing edge of the recording sheet passed the flapper 121, the sheet is returned and carried to a pair of sheet discharge rollers (simply called a sheet discharge roller) 118 by the flapper 121. Thus, the recording sheet is discharged from the printer unit 300 by the sheet discharge roller 118, whereby it is possible to discharge the sheet from the printer unit 300 in the state that its face on which the toner image was formed is facedown. This is called reverse sheet discharge.

As described above, the recording sheet is discharged facedown outside the apparatus. Thus, if the image formation processing is performed from the head page of the original in due order, it is possible to set the page order, e.g., when the image formation processing is performed by using the original feed unit 100, or when the image formation processing is performed to image data from a computer.

When the image formation processing is performed to a hard sheet such as an OHP (overhead projector) sheet carried from the manual sheet feed unit 125, the sheet is not guided to the path 122 but is discharged from the printer unit 300 by the sheet discharge roller 118 such that the face on which the toner image was formed is faceup.

Moreover, when the image formation processing is performed to both the faces of one recording sheet, the sheet is directly guided from the fixing unit 117 to the sheet discharge roller 118. Immediately after the trailing edge of the sheet passed the flapper 121, the sheet is returned and guided to the double-faced sheet carrying path 124 by the flapper 121.

Figure 2A:
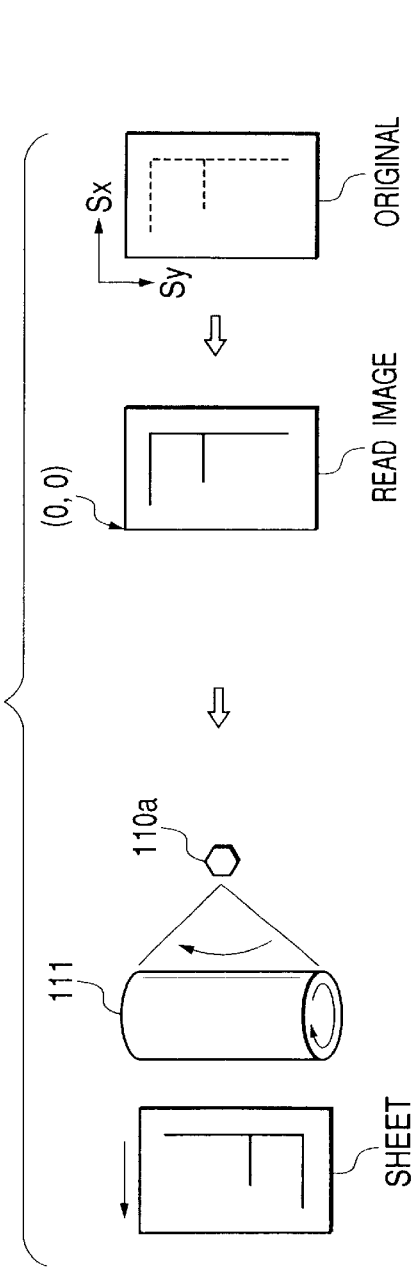
FIGS. 2A and 2B are diagrams for explaining image formation processing (or operation) which is performed in each of original standing reading and original running reading.

Next, the image formation processing method which is performed in each of the original standing reading and the original running reading will be explained with reference to FIGS. 2A and 2B.

In the original standing reading, the original image is scanned by carrying the scanner unit 104 from the left to the right. Namely, as shown in FIG. 2A, the reading scan is performed to the original image in a main scan direction Sy and a sub scan direction Sx, and the original image is read by the image sensor 109. As to the image which is read by the image sensor 109, the image read in the main scan direction Sy is sequentially converted into the laser beam by the exposure control unit 110, and the laser beam is scanned (in the direction indicated by the arrow) by the polygonal mirror 110a, whereby the electrostatic latent image is formed on the photosensitive drum 111. The electrostatic latent image thus formed is visualized as the toner image, and the toner image is formed on the sheet. Thus, a right image (a non-mirror image) which is not a mirror image is formed on the sheet.

Figure 2B:
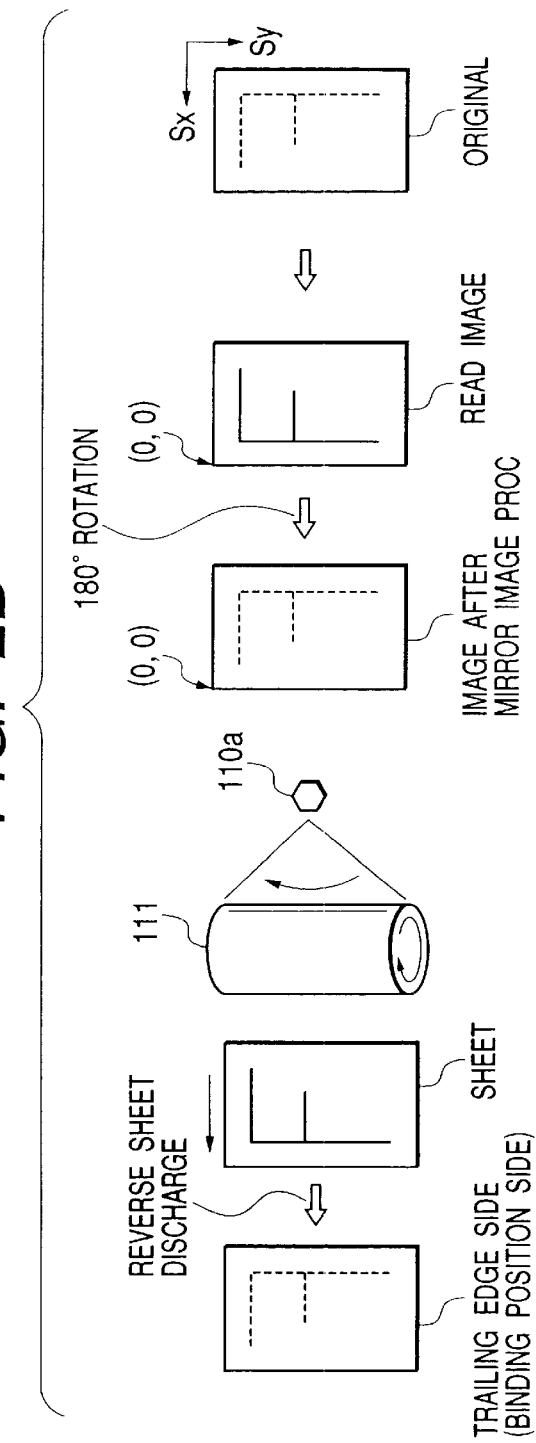

On the other hand, in the original standing reading, as shown in FIG. 2B, the reading scan is performed to the original image in the main scan direction Sy and the sub scan direction Sx, and the original image is ready by the image sensor 109. In the original running reading, since the original is carried from the left to the right, the sub scan direction is opposite to that in the original standing reading. Therefore, since the image read by the image sensor 109 is a mirror image to the original image, it is necessary to correct such mirror image to the right image. Thus, in the original running reading, mirror image processing (or operation) which is to correct the image read by the image sensor 109 to the right image is performed. In the mirror image processing, the image which is read in one direction along the main scan direction is reversed toward the direction opposite to such the one direction along the main scan direction, thereby reversing the main scan direction.

Namely, as shown in FIG. 2B, the mirror image processing in the embodiment is to output the image which can be acquired or obtained by rotating the read image by 180°. In the embodiment, rotation processing (or operation) to rotate the input image by 180° is called the mirror image processing (or simply called mirror processing).

The image read by the image sensor 109 is converted into the right image in the above mirror image processing, and the electrostatic latent image subjected to the mirror image processing is formed on the photosensitive drum 111. The electrostatic latent image thus formed is visualized as the toner image, and the toner image is formed on the sheet. Thus, the right image which is not the mirror image is formed on the sheet. Further, by reversing and discharging the sheet on which the image was formed, it is possible to discharge the sheet outside the apparatus (i.e., the printer unit 300) in the state that its face on which the toner image was formed is facedown. Then, if the trailing edge side of the sheets discharged in the above reverse sheet discharge is bound by a stapler 601 of the later-described finisher 500, it is possible to bind the left end side of the sheets from the viewpoint of the image-formed face.

Also, it is possible to perform the mirror image processing by changing the sub scan direction for the opposite direction. However, in this case, the mirror image processing can not be performed if the image reading processing for one page of the original does not end. Further, the left end side of the sheet is bound to the image when the trailing edge is bound after the reverse sheet discharged. Thus, in consideration of the above, it is preferable to perform the mirror image processing by changing the main scan direction instead of the sub scan direction.

In FIG. 1, the sheet which was discharged from the printer unit 300 by the sheet discharge roller 118 is then carried to the folding processing unit 400. The folding processing unit 400 performs folding processing (or operation) to fold the sheet into a Z shape. For example, when the sheet the size of which is A3 or B4 and the folding processing is instructed by the operation unit, the sheet discharged from the printer unit 300 is subjected to the folding processing. In other cases, the sheet discharged from the printer unit 300 is not subjected to the folding processing but is carried to the finisher 500 as it is.

The inserter 900 is disposed on the finisher 500. The inserter 900 is to insert the sheet different from the ordinary recording sheet in the head page, the final page or the intermediate page of the recording sheets. Concretely, the inserter 900 is to insert an insert sheet or the sheet for a cover between the adjacent sheets on which the images were respectively formed by the printer unit 300. The body of the finisher 500 performs bookbinding processing (or operation), binding processing (or operation), punch processing (or operation) and the like to a sheaf of sheets composed of the sheets carried from the printer unit 300 and the sheet from the inserter 900.

FIG. 3 is a block diagram showing the image formation system 1000. In FIG. 3, a CPU circuit unit 150 which includes a CPU (not shown) controls an original feed control unit 101, an image reader control unit 201, an image signal control unit 202, a printer control unit 301, a folding processing control unit 401, a finisher control unit 501 and an external interface (I/F) 209, in accordance with a control program stored in a ROM 151 and the setting by the operation unit 1. The original feed control unit 101 controls the original feed unit 100, the image reader control unit 201 controls the image reader unit 200, the printer control unit 301 controls the printer unit 300, the folding processing control unit 401 controls the folding processing unit 400, and the finisher control unit 501 controls the finisher 500. The operation unit 1 includes plural keys for setting various functions as to the image formation, a display unit for displaying setting states, and the like. The operation unit 1 outputs a key signal corresponding to a key operation by the user to the CPU circuit unit 150, and also displays the corresponding information on the basis of a signal from the CPU circuit unit 150.

A RAM 152 is used as an area for temporarily holding (or storing) the control data and a working area for calculation in the control. The external I/F 209 is the interface between the image formation system 1000 and a remote computer 210. Concretely, the external I/F 209 expands print data from the computer 210 to a bit map image, and then outputs the bit map image as image data to the image signal control unit 202. Also, the original image read by the image sensor 109 is output as image data from the image reader control unit 201 to the image signal control unit 202. The image data from the image signal control unit 202 is output to the exposure control unit 110 by the printer control unit 301.

FIG. 4 is a block diagram for explaining the image signal control unit 202 in detail. The image signal control unit 202 includes an image processing unit 203, a line memory 204, a page memory 205, and an HD (hard disk) 206. The image processing unit 203 performs image correction processing (or operation) and editing processing (or operation) based on the setting by the operation unit 1. In the line memory 204, the above mirror image processing (i.e., the processing to change the data in the main scan direction). The image data output from the line memory 204 is input to the printer control unit 301 through the page memory 205. It should be noted that the HD 206 is used in page order changing processing (or operation) such as electronic sort or the like.

Figure 5:
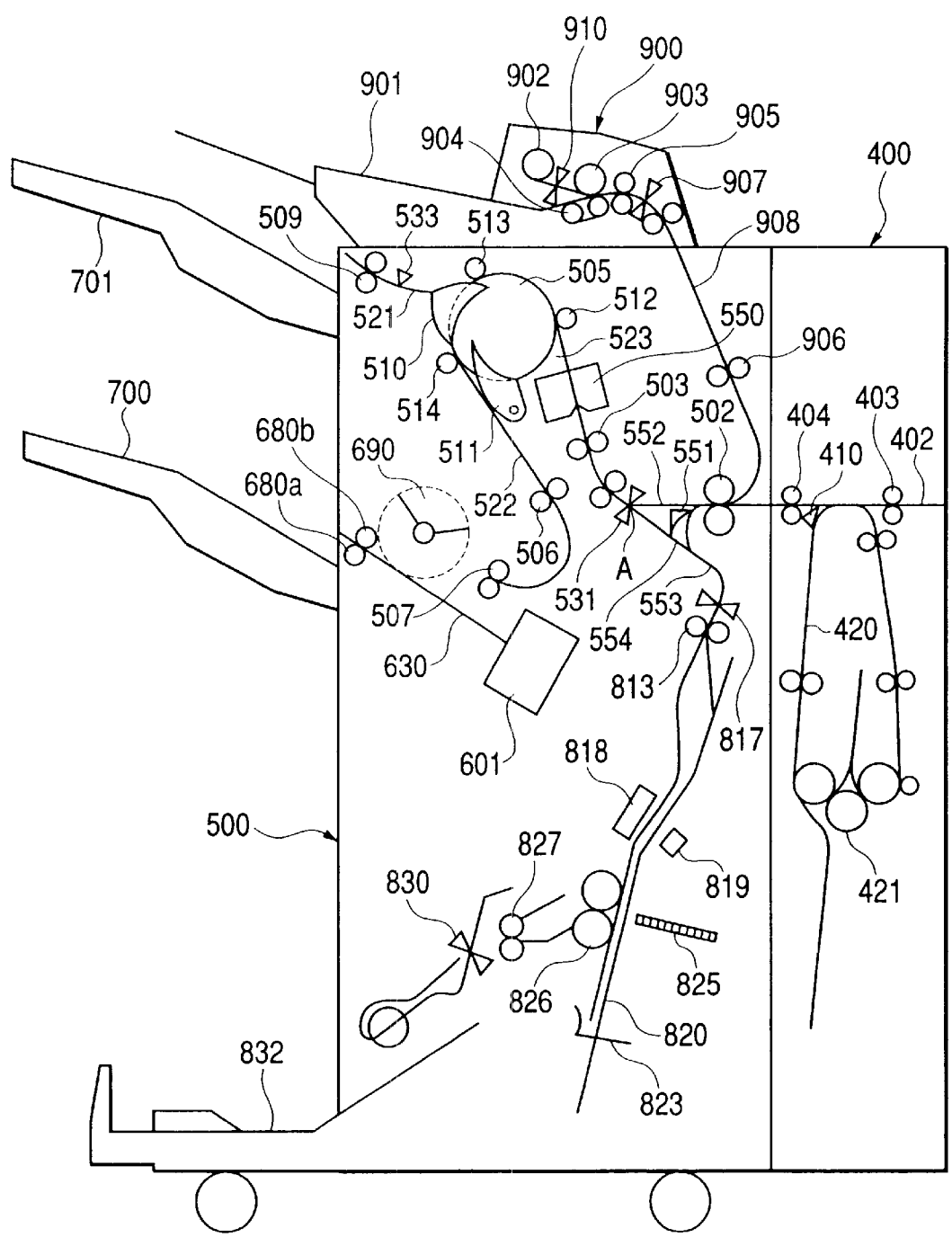
FIG. 5 is a sectional view showing structures of a folding processing unit and a finisher.

Next, the structures of the folding processing unit 400 and the finisher 500 will be explained with reference to FIG. 5. FIG. 5 is the sectional view showing the structures of the folding processing unit 400 and the finisher 500 both shown in FIG. 1.

The folding processing unit 400 includes a carrying (conveyance) path 402 which accepts the sheet discharged from the printer unit 300 and guides the accepted sheet to the side of the finisher 500. A pair of carrying (conveyance) rollers (simply called a carrying roller) 403 and a pair of carrying (conveyance) rollers (simply called a carrying roller) 404 are disposed on the carrying path 402. A change flapper 410 is disposed in the vicinity of the carrying roller 404 to guide the sheet carried by the carrying roller 403 to either the side of a folding path 420 or the side of the finisher 500.

In the folding processing, the change flapper 410 is changed to the side of the folding path 420, whereby the sheet is guided to the folding path 420. The sheet guided to the folding path 420 is carried to a folding roller 421 and folded into the Z shape. Conversely, if the folding processing is not performed, the change flapper 410 is changed to the side of the finisher 500 to directly carry the sheet discharged from the printer unit 500 to the finisher 500 through the carrying path 402.

The structure of the finisher 500 will be explained. The finisher 500 accepts the sheets carried from the printer unit 300 through the folding processing unit 400. Then the finisher 500 performs sheet postprocessing (or operation) which includes processing to align or jog the accepted sheets and sheave the aligned sheets as one sheaf, stapling processing (or operation) or binding processing (or operation) to staple the trailing edge side of the sheaf, sort processing (or operation), nonsort processing (or operation), and bookbinding processing (or operation) and the like.

As shown in FIG. 5, the finisher 500 includes a pair of inlet rollers (simply called an inlet roller) 502 to enter the sheet carried from the printer unit 300 through the folding processing unit 400 into the finisher 500. A change flapper 551 which guides the sheet to either a finisher path 552 or a first bookbinding path 553 is provided at the downstream side of the inlet roller 502.

The sheet guided to the finisher path 552 is carried toward a buffer roller 505 through a pair of carrying (conveyance) rollers (simply called a carrying roller) 503. It should be noted that the carrying roller 503 and the buffer roller 505 are structured to be able to rotate forwardly and reversely.

An inlet sensor 531 is disposed between the inlet roller 502 and the carrying roller 503. A second bookbinding path 554 is branched off from the finisher path 552 at the upstream side and in the vicinity of the inlet sensor 531. Hereinafter, such a branch point is called a branch point A.

The branch point A on the carrying path acts as the branch point to carry the sheet from the side of the inlet roller 502 to the side of the carrying roller 503. However, when the carrying roller 503 rotates reversely to carry the sheet from the side of the carrying roller 503 to the side of the inlet sensor 531, the branch point A acts as the branch point having a one-way mechanism to carry the sheet only to the side of the second bookbinding path 554.

A punch unit 550 is disposed between the carrying roller 503 and the buffer roller 505 to perform the punch processing at the trailing edge and its vicinities of the sheet carried through the carrying roller 503 if necessary.

The sheet of a predetermined number carried through the carrying roller 503 can be wound around the buffer roller 505. During rotation of the buffer roller 505, the sheet is wound by push rollers 512, 513 and 514. The sheet wound around the buffer roller 505 is carried in the rotational direction of the roller 505.

A change flapper 510 is disposed between the push rollers 513 and 514, and a change flapper 511 is disposed at the downstream side of the push roller 514. The change flapper 510 separates the wound sheet from the buffer roller 505 and guides the separated sheet to either a nonsort path 521 or a sort path 522.

The change flapper 511 separates the wound sheet from the buffer roller 505 and guides the separated sheet to the sort path 522. The change flapper 511 also guides the sheet wound around the buffer roller 505, to a buffer path 523 as it is.

The sheet guided to the nonsort path 521 by the change flapper 510 is discharged onto a sample tray 701 through a pair of sheet discharge rollers (simply called a sheet discharge roller) 509. A sheet discharge sensor 533 is disposed on the way of the nonsort path 521 to detect sheet jam and the like.

On the other hand, the sheet guided to the sort path 522 by the change flapper 510 is stacked or laid on an intermediate tray (referred as a processing tray hereinafter) 630 through a pair of carrying (conveyance) rollers (simply called a carrying roller) 506 and a pair of carrying (conveyance) rollers (simply called a carrying roller) 507.

The sheets which have been stacked or laid on the processing tray 630 in the form of a sheaf are subjected to the aligning processing and the stapling processing in accordance with the setting from the operation unit 1. Then the sheaf of the sheets is discharged onto a stacking tray 700 by sheet discharge rollers 680a and 680b. It is structured that the stacking tray 700 can be up-and-down.

The sheet carried from the first bookbinding path 553 or the second bookbinding path 554 passes a bookbinding inlet sensor 817, and the sheet is held in a holding (storage) guide 820 through a pair of carrying (conveyance) rollers (simply called a carrying roller) 813. The sheet is carried by the carrying roller 813 until its leading edge comes into contact with a movable sheet positioning member 823. The bookbinding inlet sensor 817 is disposed at the upstream side of the carrying roller 813, two pairs of staplers (simply called a stapler) 818 is disposed at the downstream side of the carrying roller 813, i.e., on the way of the holding guide 820, and an anvil 819 is opposed to the stapler 818. Thus, the stapler 818 cooperates with the anvil 819 to bind the sheaf of the sheets.

A pair of folding rollers (simply called a folding roller) 826 is disposed at the downstream side of the stapler 818, and an extrusion member 825 is opposed to the folding roller 826. When the extrusion member 825 is extruded toward the sheaf of the sheets held in the holding guide 820, the sheaf is protruded between the two rollers 826. Thus, the sheaf of the sheets is folded by the folding roller 826, and the folded sheaf is discharged onto a sheet discharge tray 832 through a sheet discharge roller 827. A bookbinding sheet discharge sensor 830 is disposed at the downstream side of the sheet discharge roller 827.

In a case where the sheaf of the sheets bound by the stapler 818 is folded, after the sheaf of the sheets was subjected to the stapling processing, the sheet positioning member 823 is lowered from the stapling-processing position by a predetermined distance such that the stapling position of the sheaf of sheet reaches the central position (i.e., a nip point) of the folding roller 826. Thus, the sheaf of the sheets can be folded along the position (i.e., the line) at which the stapling processing was performed.

Next, the inserter 900 which is provided on the finisher 500 will be explained. The inserter 900 is used to feed the sheet set on a tray 901 to either the sample tray 701, the stacking tray 700 or the sheet discharge tray 832 without passing the sheet through the printer unit 300. In the present embodiment, it is assumed that the sheet for the cover (or the insert sheet) is set faceup on the tray 901 of the inserter 900 by the user. The sheaf of the sheets stacked or laid on the tray 901 by the user is sequentially separated one by one from the uppermost sheet in the sheaf, and the separated sheet is carried to the finisher path 552 or the first bookbinding path 553. Hereinafter, the structure of the inserter 900 will be explained.

The sheaf of the sheets stacked on the tray 901 is carried by a sheet feed roller 902 to a separation unit composed of a carrying (conveyance) roller 903 and a separation belt 904. Thus, the sheet is sequentially separated one by one from the uppermost one by the carrying roller 903 and the separation belt 904. Then the separated sheet is carried to a carrying (conveyance) path 908 by a pair of extraction rollers (simply called an extraction roller) 905 disposed in the vicinity of the separation unit, and then the sheet is carried to the inlet roller 502 through a pair of carrying (conveyance) rollers (simply called a carrying roller) 906.

A sheet setting sensor 910 is disposed between the sheet feed roller 902 and the carrying roller 903 to detect whether or not the sheet is set. A sheet feed sensor 907 is disposed in the vicinity of the extraction roller 905 to detect whether or not the sheet is carried by the extraction roller 905. The carrying path 908 for carrying the sheet from the inserter 900 is interflowed to the carrying path 402 for carrying the sheet from the printer unit 300, at the upstream side and in the vicinity of the inlet roller 502.

Figure 6:
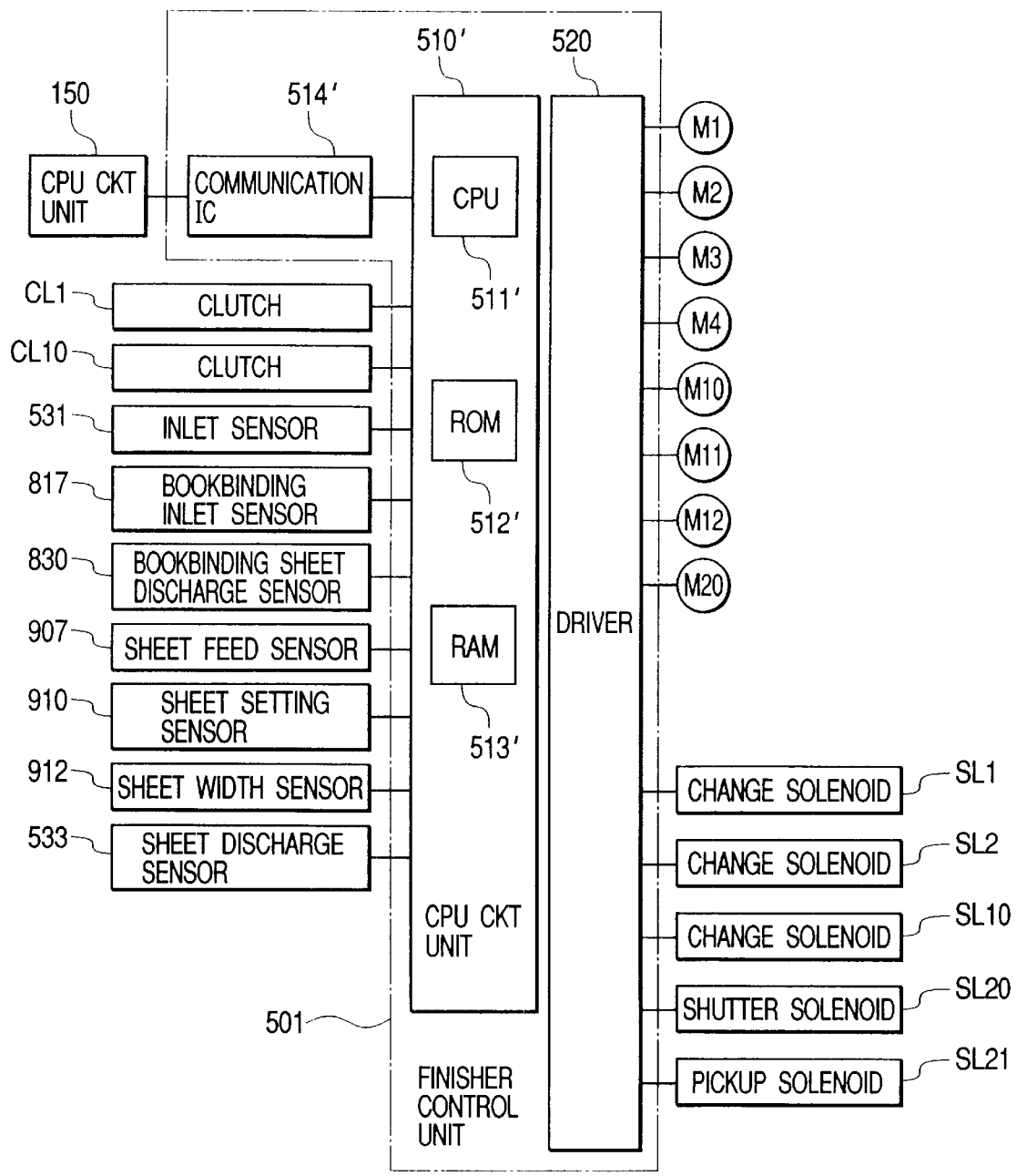
FIG. 6 is a block diagram showing a structure of a finisher control unit.

Next, the structure of the finisher control unit 501 which driving-controls the finisher 500 will be explained with reference to FIG. 6. FIG. 6 is the block diagram showing the structure of the finisher control unit 501 shown in FIG. 3.

As shown in FIG. 6, the finisher control unit 501 includes a CPU circuit unit 510' composed of a CPU 511', a ROM 512', a RAM 513' and the like. The CPU circuit unit 510' communicates with the CPU circuit unit 150 on the side of the body of the copying machine through a communication IC 514' for data conversion. Thus, the CPU circuit unit 510' executes various programs which have been stored in the ROM 512', on the basis of instructions from the CPU circuit unit 150, and thus driving-controls the finisher 500. It should be noted that the CPU circuit unit 510' contains a not-shown jam timer for detecting a jam.

In case of driving-controlling the finisher 500, detection signals are input from various sensors to the CPU circuit unit 150. As the various sensors, there are the inlet sensor 531, the bookbinding inlet sensor 817, the bookbinding sheet discharge sensor 830, the sheet feed sensor 907, the sheet setting sensor 910, the sheet discharge sensor 533, and the like (FIG. 5).

A driver 520 is connected to the CPU circuit unit 510'. Thus, the driver 520 drives various motors, various solenoids, clutches CL1 and CL10, and the like.

As various motors, there are an inlet motor M1 which is the driving source of the inlet roller 502, the carrying roller 503 and the carrying roller 906, a buffer motor M2 which is the driving source of the buffer roller 505, a sheet discharge motor M3 which is the driving source of the carrying roller 506, the carrying roller 507 and the sheet discharge roller 509, a sheaf discharge motor M4 which is the driving source of the sheet discharge rollers 680a and 680b, a carrying (conveyance) motor M10 which is the driving source of the carrying roller 813, a positioning motor M11 which is the driving source of the sheet positioning member 823, a folding motor M12 which is the driving source of the extrusion member 825, the folding roller 826 and the sheet discharge roller 827, and a sheet feed motor M20 which is the driving source of the sheet feed roller 902, the carrying roller 903, the separation belt 904 and the extraction roller 905 of the inserter 900.

Each of the inlet motor M1, the buffer motor M2 and the sheet discharge motor M3 is made of a stepping motor. It is possible by controlling an excitation pulse rate to rotate the pair of the rollers driven by the motor, at an uniform speed or different (or independent) speeds. Further, it is possible by the driver 520 to rotate each of the inlet motor M1 and the buffer motor M2 forwardly and reversely.

Each of the carrying motor M10 and the positioning motor M11 is made of a stepping motor, and the folding motor M12 is made of a DC motor. It is possible to synchronize the carrying motor M10 and the inlet motor M1 to carry the sheet.

The sheet feed motor M20 is made of a stepping motor. It is possible to synchronize the sheet feed motor M20 and the inlet motor M1 to carry the sheet.

As the solenoids, there are a solenoid SL1 which changes the change flapper 510, a solenoid SL2 which changes the change flapper 511, a solenoid SL10 which changes the change flapper 551, a solenoid SL20 which drives a sheet feed shutter (not shown) of the inserter 900, and a solenoid SL21 which vertically drives the sheet feed roller 902 of the inserter 900.

Next, the method to set the operation mode will be explained with reference to FIGS. 7A and 7B. FIGS. 7A and 7B show the contents of the display panel of the operation unit 1 of the body of the image formation apparatus 1000. Since the display panel is a touch panel, a function is executed when the box displayed on the display panel and representing such function is touched.

Thus, the user can select the desired operation mode such as the nonsort mode, the sort mode, the stapling sort mode (the binding mode), the bookbinding mode or the like on the screen shown in FIG. 7A.

Further, the user can set the cover mode and the insert sheet mode on the screen shown in FIG. 7B, and set to insert the sheet for the cover or the insert sheet in the head page, the final page or the intermediate page of the recording sheets, from the inserter 900 or the manual sheet feed unit 125. Further, the user can designate and input a sheet size of the inserter 900 through a not-shown screen.

Next, the sheet carrying from the inserter 900 and the printer unit 300 to the processing tray 630 within the finisher 500 will be explained with reference to FIGS. 8A, 8B, 9, 10, 11, 12, 13A and 13B. FIGS. 8A to 13B are the diagrams for explaining the flow of the sheets when the sheet from the inserter 900 and the sheet from the printer unit 300 are carried and then laid on the processing tray 630 of the finisher 500.

In the present embodiment, it is assumed that the sheet carried from the inserter 900 is the sheet for the cover, and the three sheets composed of the one sheet from the inserter 900 and the two sheets from the printer unit 300 are laid on the processing tray 630.

Figure 8A:
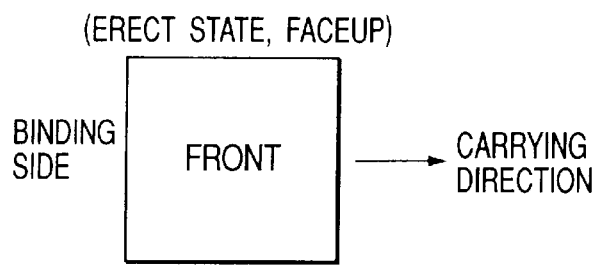
FIGS. 8A and 8B are diagrams for explaining a flow of sheets in a case where the sheet from an inserter and the sheet from a printer unit are laid on a processing tray.
Figure 8B:
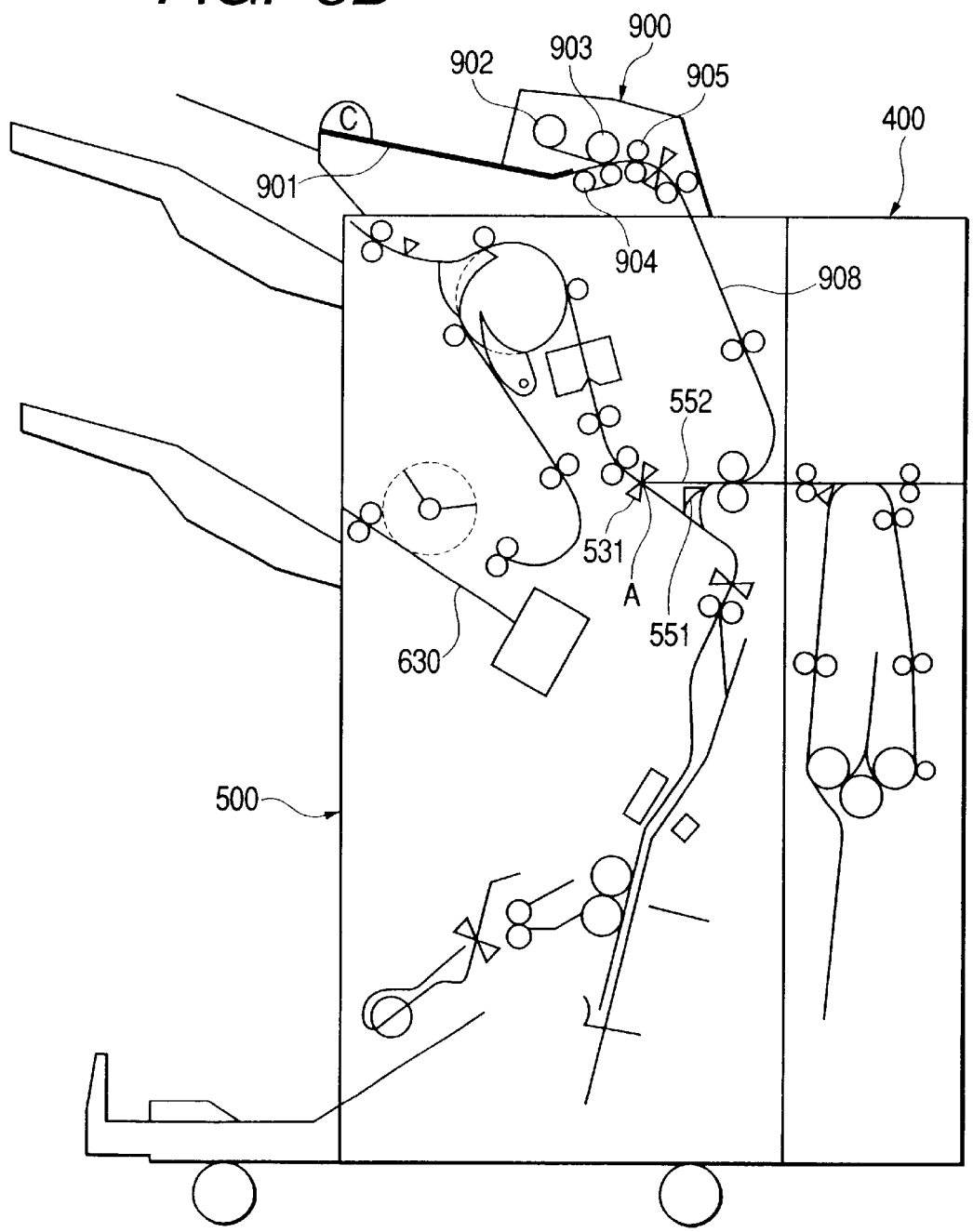

When the sheet of a sheaf C is inserted in the sheets on which the images were respectively formed by the printer unit 300, as shown in FIG. 8B, the sheaf C is first set on the tray 901 of the inserter 900 by the user. At this time, the sheaf C is set on the tray 901 in the state that the face on which the image was formed is set faceup and the binding position is set left, i.e., in an erect state (FIG. 8A). The sheet set on the tray 901 is carried in the direction (rightward) indicated by the arrow of FIG. 8A.

Figure 9:
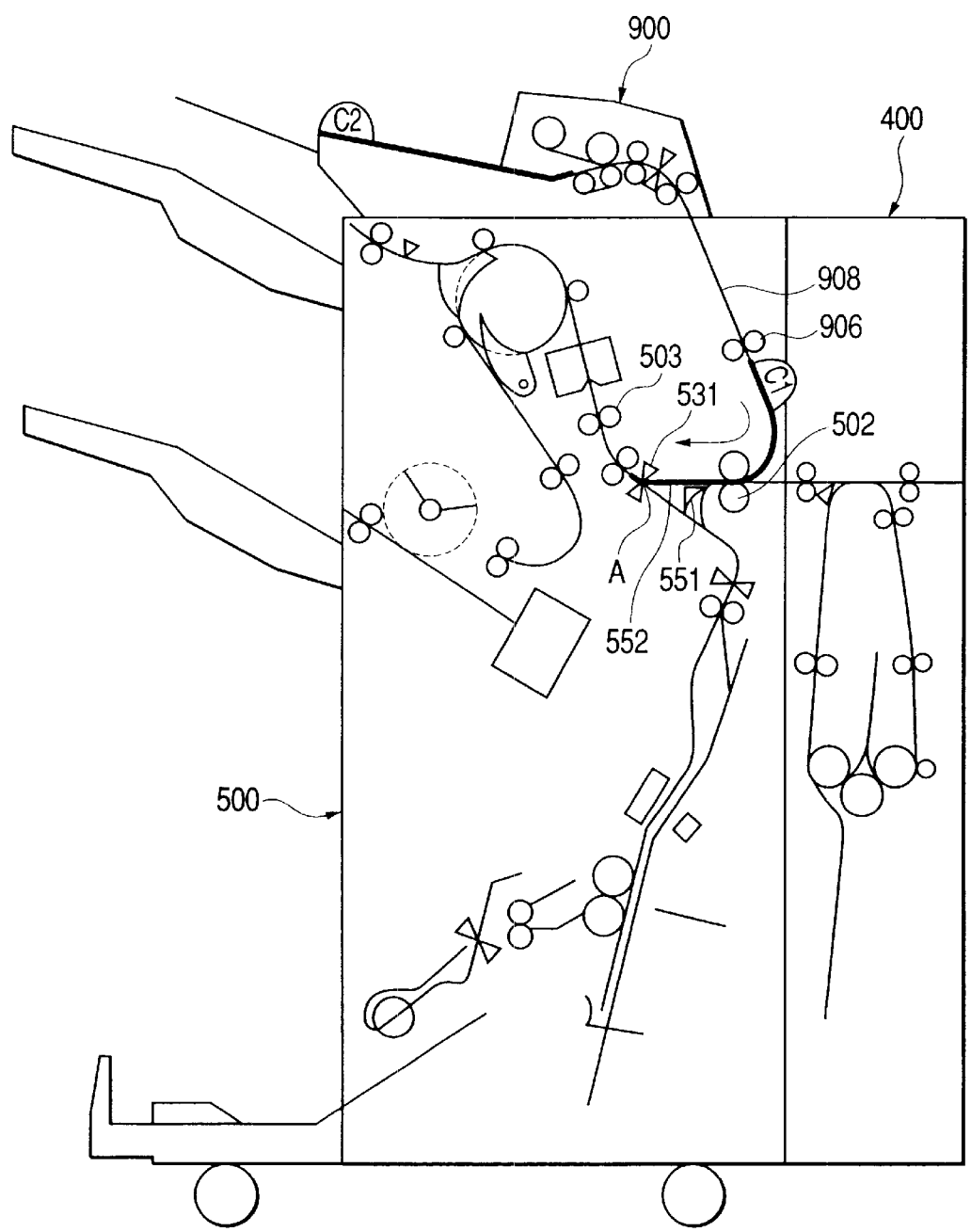
FIG. 9A is a diagram for explaining the flow of the sheets in the case where the sheet from the inserter and the sheet from the printer unit are laid on the processing tray.

Next, in FIG. 9, when the user sets the sheaf C of sheets on the tray 901 and depresses a start key (not shown) on the operation unit 1, the uppermost sheet (called a sheet C1 hereinafter) of the sheaf C and the following sheets are sequentially separated by the separation unit (the carrying roller 903 and the separation belt 904) of the inserter 900, and the separated sheets are carried to the carrying path 908. At this time, the change flapper 551 has been changed to the side of the finisher path 552 as shown in FIG. 9.

The uppermost sheet C1 of the sheaf C carried to the carrying path 908 is further carried to the side of the buffer roller 505. As shown in FIG. 9, the sheet C1 is carried to the roller 505 with its image-formed face (the face on which the image was formed) facedown.

When the leading edge of the sheet C1 carried from the carrying path 906 through the inlet roller 502 passes the inlet sensor 531, the sheet carrying from the printer unit 300 to the inside of the finisher 500 starts. It is assumed that the sheets carried from the printer unit 300 to the inside of the finisher 500 are sheets P1 and P2 (FIGS. 10 to 13B), and that the sheet P1 is carried and the sheet P2 is subsequently carried.

Figure 10:
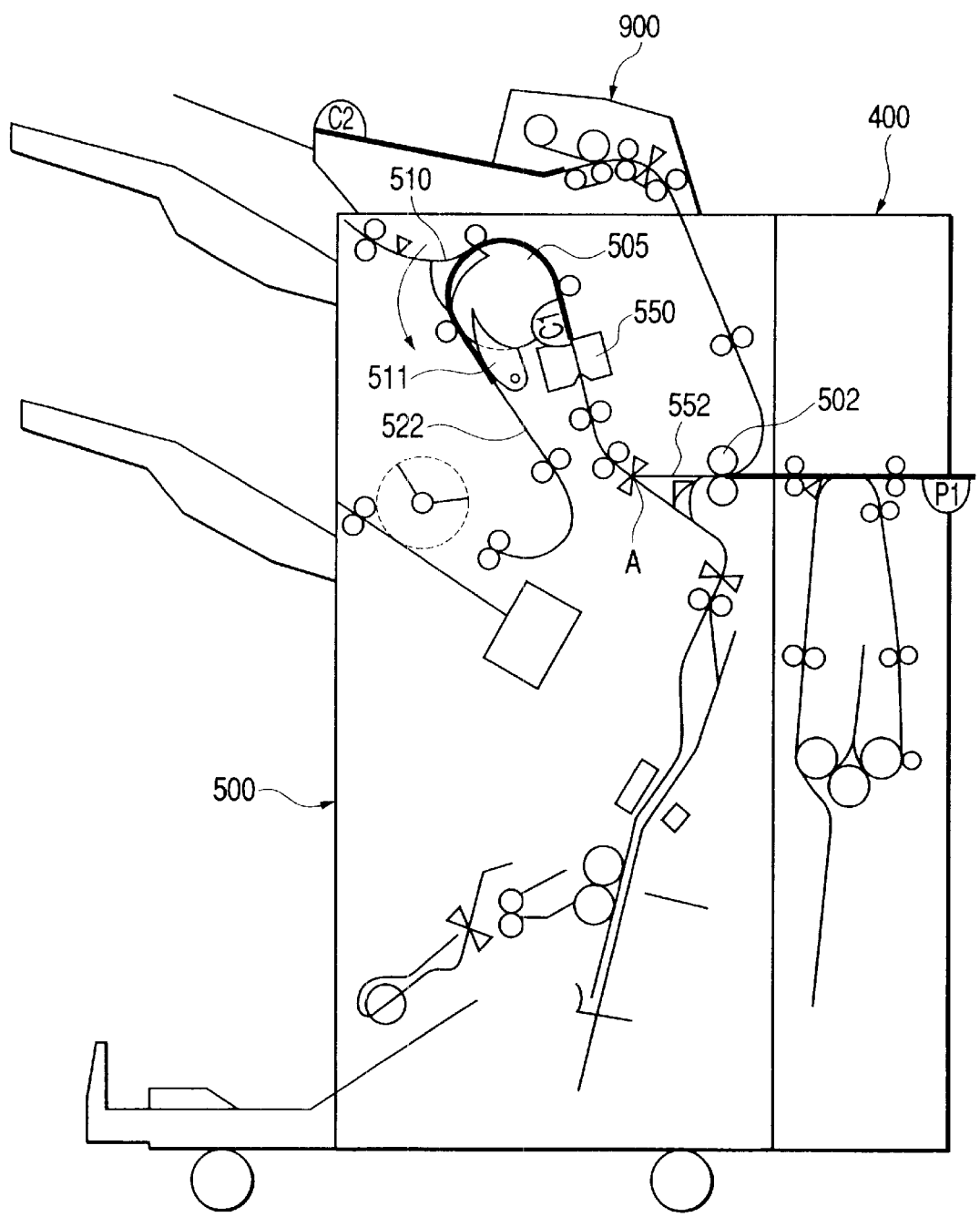
FIG. 10 is a diagram for explaining the flow of the sheets in the case where the sheet from the inserter and the sheet from the printer unit are laid on the processing tray.

Next, as shown in FIG. 10, since both of the change flappers 510 and 511 have been changed to the side of the sort path 522, the sheet C1 carried by the buffer roller 505 is guided to the sort path 522. At this time, subsequent to the sheet C1, the sheet P1 from the printer unit 300 is carried to the inside of the finisher 500. Further, as shown in FIG. 10, the sheet P1 is guided to the finisher 500 with its image-formed face facedown. Hereinafter, the details about this flow will be explained in detail.

In the present embodiment, the original set to the original feed unit 100 is subjected to the reading processing by the image reader unit 200, the image of the read original is subjected to the image formation processing by the printer unit 300, and the processed image is formed on the sheet. In this operation, the original is read in the original running reading.

As described above, in the original running reading, the read image is subjected to the mirror image processing (i.e., the processing to rotate the input image by 180°) such that the right image is formed on the sheet, and the processed image is formed on the sheet. When the image-formed sheet is discharged from the printer unit 300, the sheet is reversed to set the image-formed face facedown, and the reversed sheet is discharged. Therefore, as shown in FIGS. 10 to 13B, the sheets P1 and P2 from the printer unit 300 are carried to the finisher unit 500 with their image-formed faces facedown.

Figure 11:
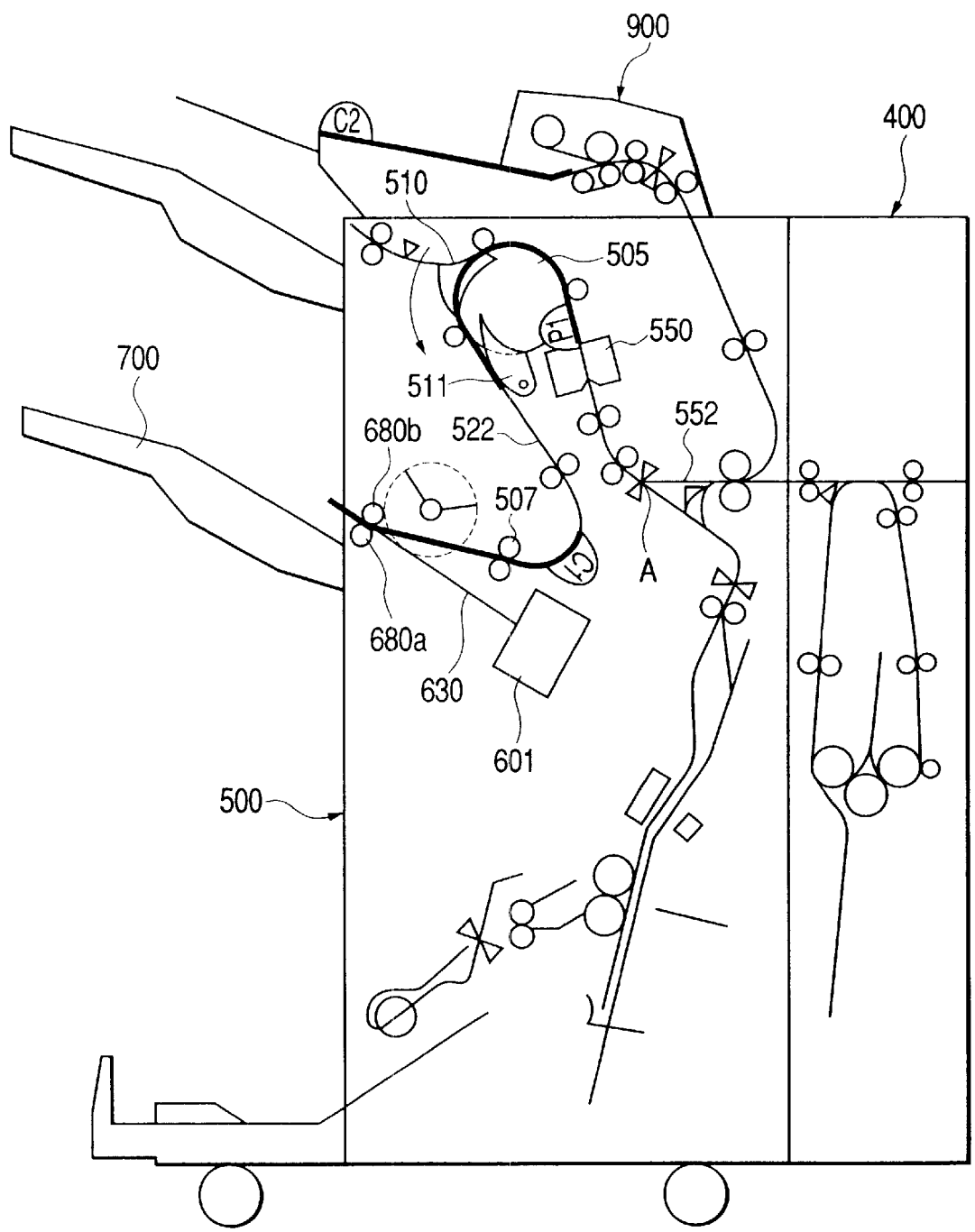
FIG. 11 is a diagram for explaining the flow of the sheets in the case where the sheet from the inserter and the sheet from the printer unit are laid on the processing tray.

As shown in FIG. 11, the sheet C1 carried to the sort path 522 is further carried to the processing tray 630. Conversely, the sheet P1 subsequent to the sheet C1 is carried to the buffer roller 505 through the finisher path 552, and then guided to the sort path 522. At this time, subsequent to the sheet PI, the carrying of the sheet P2 from the printer unit 300 to the inside of the finisher 500 starts. When the second copy is output, the separation unit of the inserter 900 starts at this time to separate the sheet (i.e., a sheet C2 in this case) subsequent to the sheet C1 stacked or laid on the tray 901.

Figure 12:
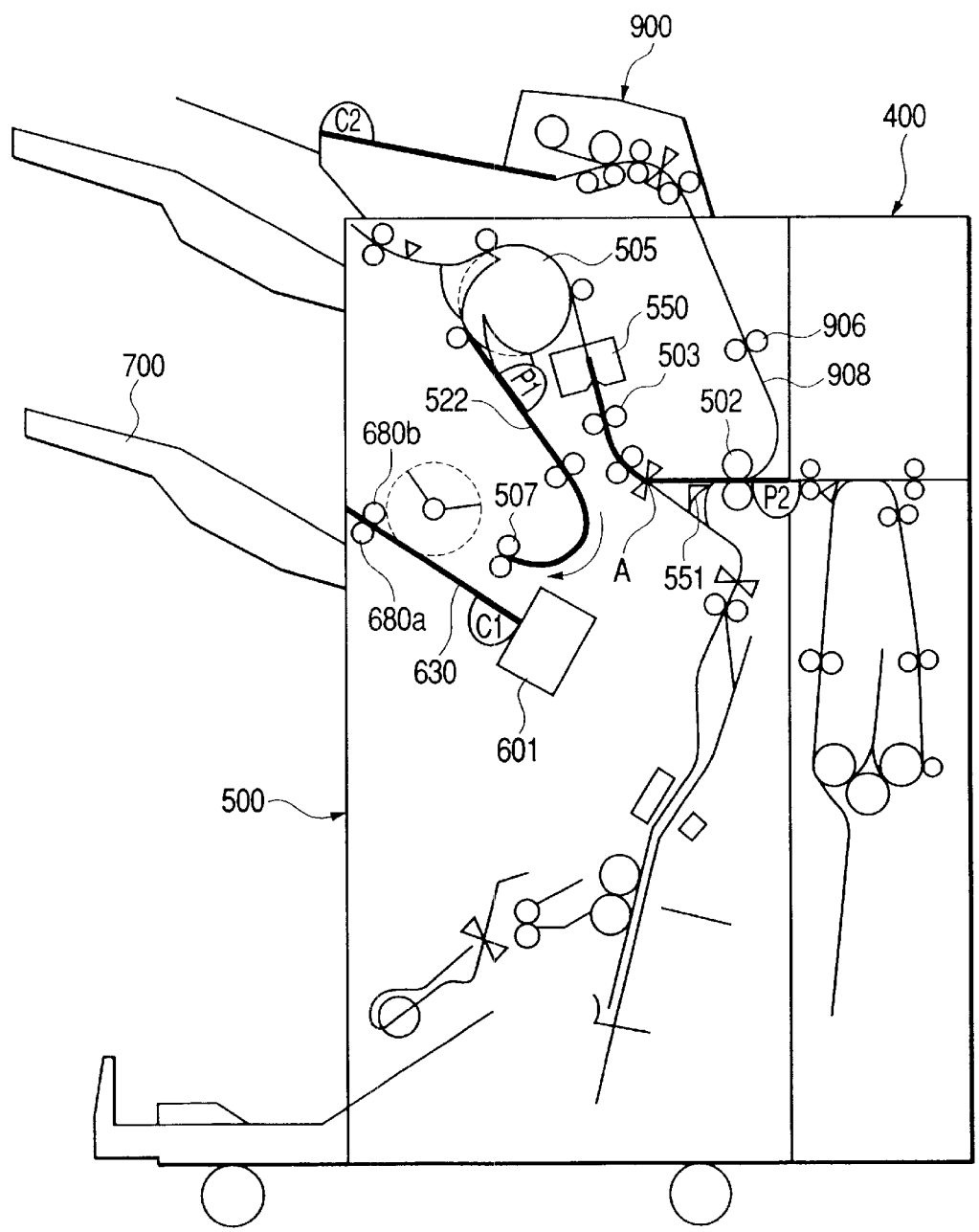
FIG. 12 is a diagram for explaining the flow of the sheets in the case where the sheet from the inserter and the sheet from the printer unit are laid on the processing tray.

Next, as shown in FIG. 12, the sheet C1 is stacked or laid on the processing tray 630 in the state that its image-formed face is set facedown and its binding position is set on the side of the stapler 601. Like the sheet C1, the sheet P1 subsequent to the sheet C1 is carried toward the processing tray 630. Further, the sheet P2 subsequent to the sheet P1 is guided to the body of the finisher 500, and carried toward the buffer roller 505. The sheets P1 and P2 are sequentially carried to and laid on the processing tray 630.

When the second copy is output, subsequent to the sheet P2, the sheet C2 for the cover of the second copy is carried to the carrying path 908. While the sheet P2 is being carried to the processing tray 630, the sheet C2 is once stopped at the front of and in the vicinity of the carrying roller 908. Thus, according as the preceding sheet P2 of the first copy is laid on the processing tray 630, the carrying of the sheet C2 restarts.

Figure 13A:
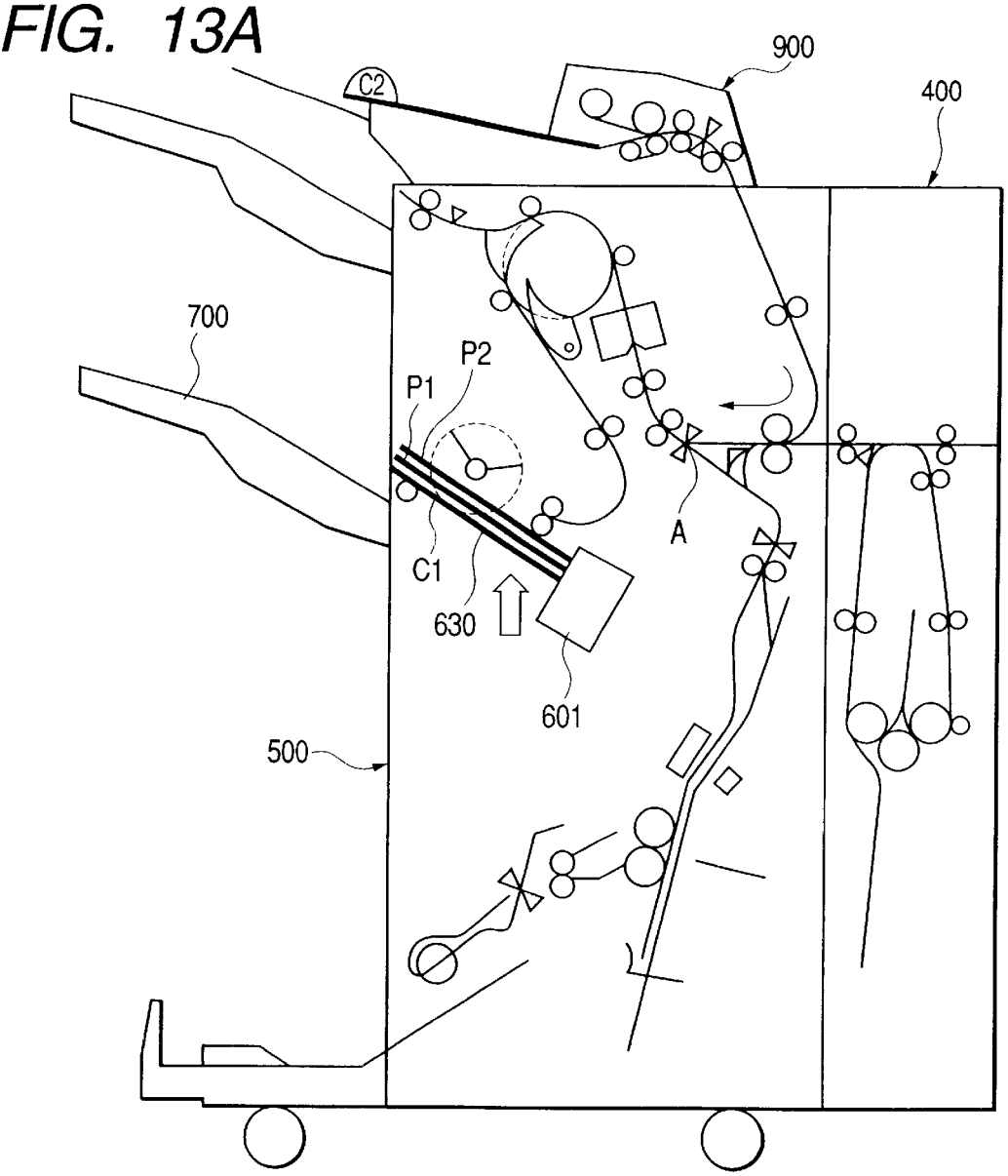
FIGS. 13A and 13B are diagrams for explaining the flow of the sheets in the case where the sheet from the inserter and the sheet from the printer unit are laid on the processing tray.
Figure 13B:
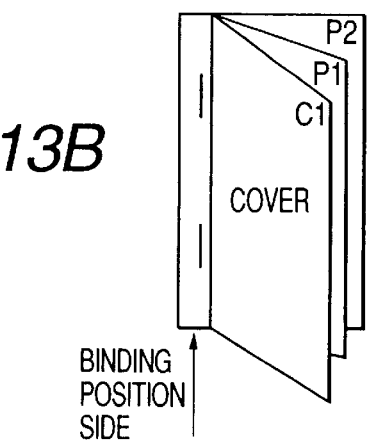

Next, as shown in FIGS. 13A and 13B, the sheet P1 is stacked on the sheet C1 previously laid on the processing tray 630. Then the sheet P2 subsequent to the sheet P1 is stacked on the sheet P1 (FIG. 13A). It should be noted that the images of the sheets P1 and P2 were subjected to the mirror image processing to become the right images. When the sheet is carried from the printer unit 300 to the finisher 500, this sheet is reversed on the side of the printer unit 300 and then discharged therefrom. Therefore, like the sheet C1, the sheets P1 and P2 are stacked on the processing tray 630 in the state that their image-formed faces are set facedown and their binding positions are located on the side of the stapler 601.

When the binding processing is performed to the sheaf of these plural sheets as the postprocessing, according as the sheet P2 is laid on the processing tray 630, the binding processing is performed by the stapler 601. When the sheaf of the sheets subjected to the binding processing by the stapler 601 is viewed from the direction indicated by the white arrow of FIG. 13A, the state of FIG. 13B is visible. As above, when the stapling process is performed to the sheaf composed of the sheets carried from the inserter 900 and the sheets subjected to the image formation by the printer unit 300, in the present embodiment, it is possible to conform the image directions and the binding positions of the plural sheets to others. Therefore, when the sheets carried from the inserter 900 and the sheets subjected to the image formation by the printer unit 300 are mixedly stacked, it is possible to satisfactorily perform both the head-page processing and the postprocessing.

As explained above, in the present embodiment, the processing to rotate the input image by 180° (called the mirror image processing in the present embodiment) is performed as the processing to conform the image direction of the sheet set on the tray 901 of the inserter 900 to the direction of the image input from the image reader unit 200, the image subjected to the mirror image processing is formed on the sheet, and the sheet from the inserter 900 and the sheet on which the image was formed are stacked on the processing tray 630 (or the holding guide 820).

Thus, when the sheets from the inserter 900 and the printer unit 300 are mixedly stacked on the processing tray 630 (or the holding guide 820), it is possible to conform the image direction on the sheet from the inserter 900 to the image direction on the sheet from the printer unit 300. Therefore, since the positions of the sheets can be easily conformed to others in the postprocessing, it is possible to prevent the disadvantage which occurs when the postprocessing is performed to the sheaf of the sheets mixedly composed of the sheets from the inserter 900 and the sheets from the printer unit 300.

When the sheet is carried to the processing tray 630, the sheet set to the inserter 900 is once reversed and then carried to the tray 630, and similarly the sheet on which the image was formed by the printer unit 300 is reversed and then carried to the tray 630. In this operation, the sheet is carried from the inserter 900 before the sheet is carried from the printer unit 300. Thus, when the sheets from the inserter 900 and the sheets on which the images were respectively formed by the printer unit 300 are mixedly stacked, it is possible to satisfactorily perform both the head-page processing and the postprocessing. For example, when the stapler 601 performs the stapling processing to the sheaf composed of such the plural sheets stacked on the processing tray 630, as shown in FIG. 13B, it is possible to conform the image directions and the binding positions of the respective sheets to others.

Further, the setting direction of the original to be set on the original tray 1001 of the original feed unit 100 (i.e., the original stacking direction for the original tray 1001) is identical with the setting direction of the sheet to be set on the tray 901 of the inserter 900 (i.e., the sheet stacking direction for the tray 901) (FIGS. 1, 8A and 8B). Further, the user can set the original and the sheet to the respective trays in the erect state and in the state that their image-formed faces are set faceup. Therefore, when the cover mode and the insert sheet mode are used, it is possible to prevent the erroneous operation by the user and to improve the operability for the user.

Further, in the present embodiment, as shown in FIG. 1, the feed direction (from the right to the left) of the original stacked on the original tray 1001 of the original feed unit 100 is opposite to the feed direction (from the left to the right) of the sheet stacked on the tray 901 of the inserter 900, and each tray faces outside of the apparatus. Thus, it is possible to downsize the apparatus and improve sheet setting condition for the inserter 900.

In the present embodiment, the case where the original image is input from the image reader unit 200 was explained. However, as shown in FIG. 3, the present invention is also applicable to even a case where the image data is input from the external computer 210. Even in this case, the image direction and the binding position of the sheet set on the tray 901 of the inserter 900 are considered, the rotation processing (called the mirror image processing in the present embodiment) is performed to the input image if necessary, the processed image is formed on the sheet, the front and rear faces of this sheet are reversed, and the reversed sheet is discharged to the finisher 500. Thus, when the sheet from the inserter 900 and the sheet from the printer unit 300 are mixedly stacked, it is possible to satisfactorily perform both the processing from the head page and the postprocessing. Further, when the postprocessing such as the stapling processing is performed to the sheaf of the plural sheets which have been stacked or laid on the processing tray 630, it is possible to conform the image directions and the binding positions with others.

In FIGS. 8A to 13B, the case where the sheet from the inserter 900 is inserted in the head page of the sheets from the printer unit 300 was explained as the explanation of the cover mode. However, the present invention is also applicable to the insert sheet mode in which the sheet from the inserter 900 is inserted as the insert sheet in the sheets from the printer unit 300.

Next, the bookbinding processing will be explained with reference to FIGS. 14A, 14B, 14C and 14D. The bookbinding processing is performed when the user sets bookbinding mode as the operation mode on the display panel (FIGS. 7A and 7B) of the operation unit 1. FIGS. 14A to 14D are the diagrams for explaining the image formation processing of the image formation system 1000 (FIG. 1) in the bookbinding mode.

When the bookbinding mode is designated, the originals set on the original tray 1001 of the original feed unit 100 are sequentially read from the head page, the images of the read originals are sequentially stored in the HD 206 of the image signal control unit 202 through the line memory 204 and the page memory 205, and the number of read originals is counted. After the original reading processing ended, the read original images are classified according to the following equation (1) to determine image formation order and image formation positions.

$$M = n \times 4 - k \tag{1}$$

where M represents the number of originals, n which is an integer equal to or larger than "1" represents the number of sheets on which the read original images are to be formed, and k is either "0", "1", "2" or "3".

Figure 14A:
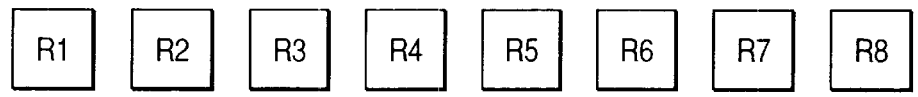
FIGS. 14A, 14B, 14C and 14D are diagrams for explaining bookbinding processing.

The image formation processing in the bookbinding mode will be explained with reference to a case where, for example, the number of read originals is eight. As shown in FIG. 14A, original image data (R1, R2, R3, R4, R5, R6, R7, R8) of the eight pages are sequentially stored in the HD 206 in the order identical with the original reading order.

Figure 14B:
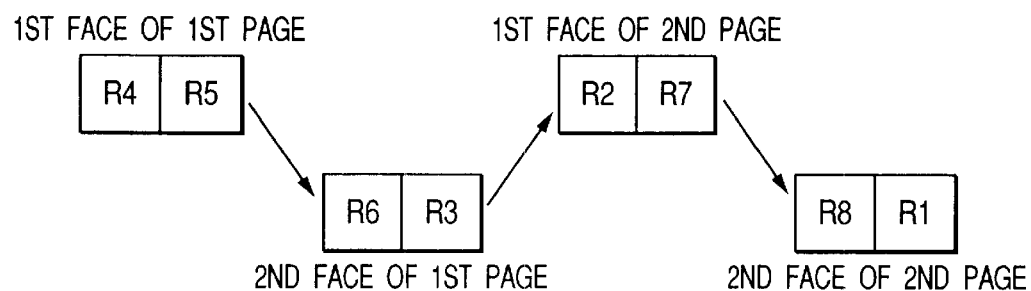

Then the image formation order and the image formation position are determined for each image data. Thus, as shown in FIG. 14B, the image of the image data R4 is formed in the left half of the first face (or the front face) of the first sheet P1, and the image of the image data R5 is formed in the right half thereof. As previously described, it should be noted that the image to be formed on the sheet was subjected to the mirror image processing.

The sheet P1 on which the images of the image data R4 and R5 were formed is again fed to the transfer unit 116 through the double-faced sheet carrying path 124. Next, the image of the image data R6 is formed in the left half of the second face (or the rear face) of the first sheet P1, and the image of the image data R3 is formed in the right half thereof. The sheet P1 the both faces of which are formed with the images is discharged from the printer unit 300 as it is (i.e., the rear face), and the discharged sheet P1 is carried to the first bookbinding path 553 of the finisher 500.

Figure 14C:
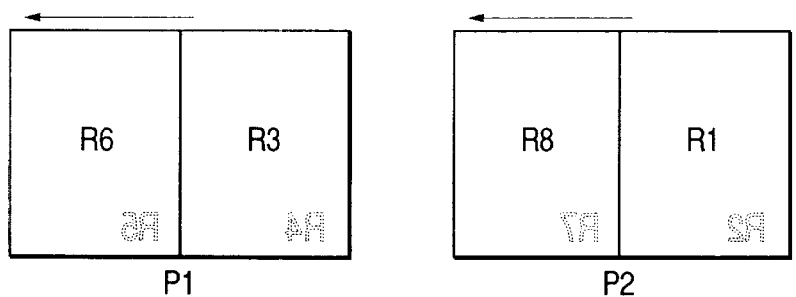

When the sheet P1 is carried from the printer unit 300 to the finisher 500, as shown in FIG. 14C, the sheet P1 is carried in the direction indicated by the arrow in the state that the second face on which the images of the image data R6 and R3 were formed is set faceup and the image of the image data R6 leads. Further, as shown in FIG. 14C, the image of the image data R5 is formed to the other side part of the sheet P1 corresponding to the part where the image of the image data R6 is formed, and the image of the image data R4 is formed to the other side part corresponding to the part where the image of the image data R3 is formed.

Subsequent to the above processing, the image of the image data R2 is formed in the left half of the first face (or the front face) of the second sheet P2, and the image of the image data R7 is formed in the right half thereof (FIG. 14B). Also, it should be noted that the image to be formed on the sheet was subjected to the mirror image processing.

The sheet P2 on which the images of the image data R2 and R7 were formed is again fed to the transfer unit 116 through the double-faced sheet carrying path 124. Next, the image of the image data R8 is formed in the left half of the second face (or the rear face) of the second sheet P2, and the image of the image data R1 is formed in the right half thereof. The sheet P2 the both faces of which are formed with the images is discharged from the printer unit 300 as it is (i.e., the rear face), and the discharged sheet P2 is carried to the first bookbinding path 553 of the finisher 500.

When the sheet P2 is carried from the printer unit 300 to the finisher 500, as shown in FIG. 14C, the sheet P2 is carried in the direction indicated by the arrow in the state that the second face on which the images of the image data R8 and R1 were formed is set faceup and the image of the image data R8 leads. Further, as shown in FIG. 14C, the image of the image data R7 is formed to the other side part of the sheet P2 corresponding to the part where the image of the image data R8 is formed, and the image of the image data R2 is formed to the other side part corresponding to the part where the image of the image data Ri is formed.

Figure 14D:
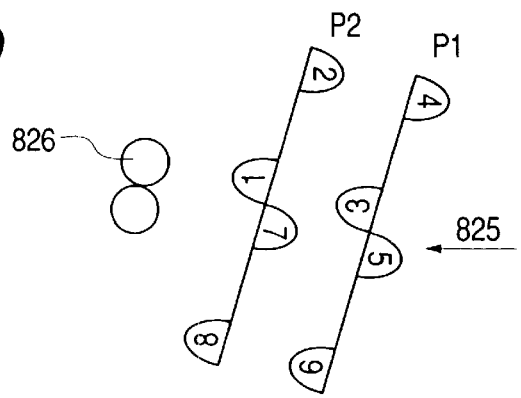

The sheets P1 and P2 are sequentially guided and held in the holding guide 820 through the first bookbinding path 553 of the finisher 500. In the holding guide 820, as shown in FIG. 14D, the sheet P1 is located on the side of the extrusion member 825, the sheet P2 subsequent to the sheet P1 is located on the side of the folding roller 826, and the first faces (the front faces) of the sheets P1 and P2 are turned toward the extrusion member 825. It should be noted that, in the holding guide 820, the sheets P1 and P2 are located by the sheet positioning member 823.

Figure 21:
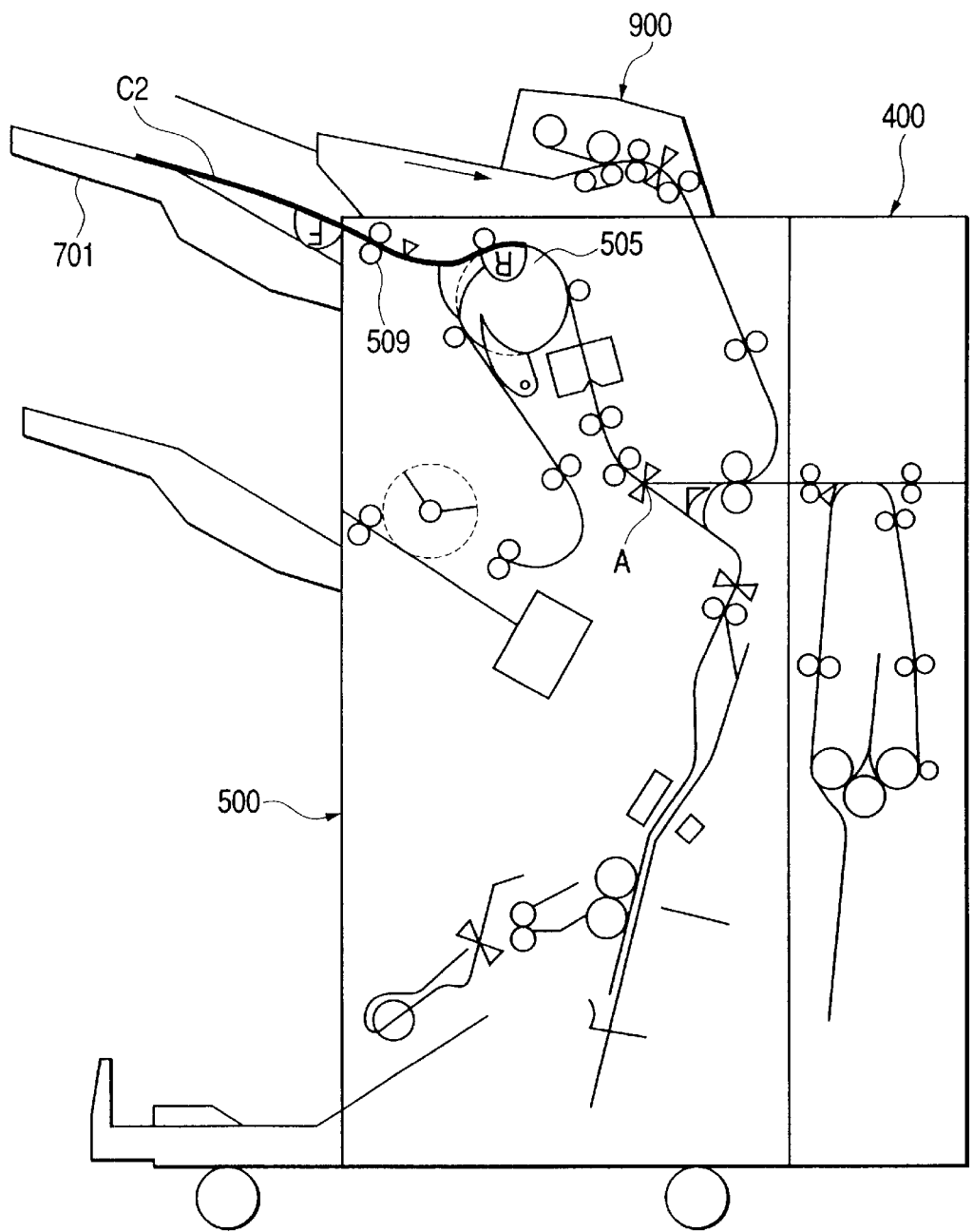
FIG. 21 is a diagram for explaining the flow of the sheets from the inserter and the printer unit to the holding guide within the finisher in the bookbinding mode.
Figure 22A:
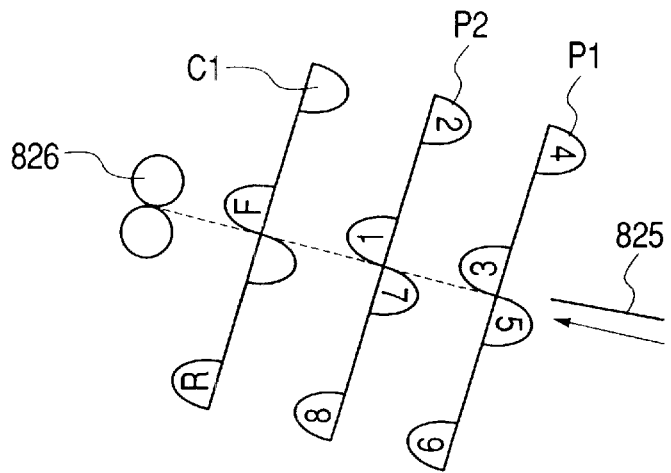
FIGS. 22A and 22B are diagrams for explaining the flow of the sheets from the inserter and the printer unit to the holding guide within the finisher in the bookbinding mode.
Figure 22B:
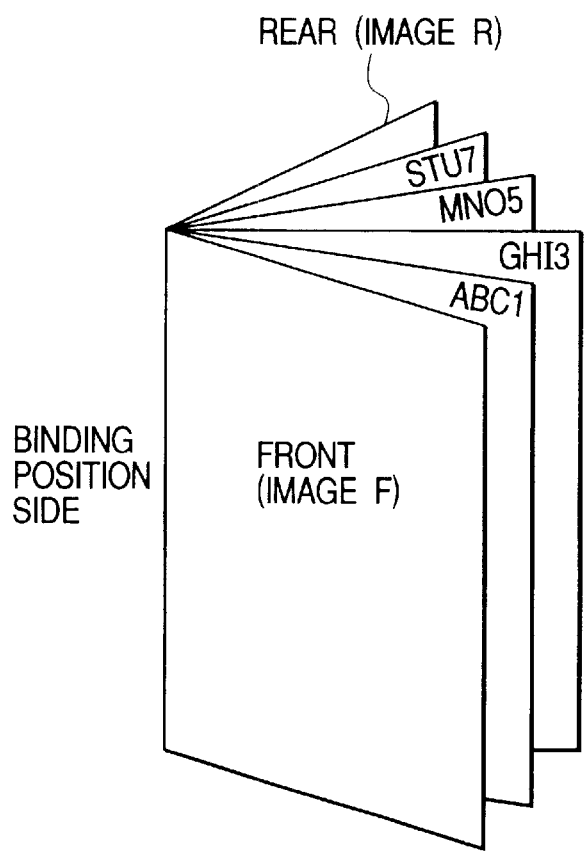

Next, the sheet carrying (conveyance) from the inserter 900 and the printer unit 300 to the holding guide 820 of the finisher in the bookbinding mode will be explained with reference to FIGS. 15A, 15B, 16, 17, 18, 19, 20, 21, 22A and 22B. FIGS. 15A to 21 are the diagrams for explaining the flow of the sheets from the inserter 900 and the printer unit 300 to the holding guide 820 within the finisher 500 in the bookbinding mode. FIGS. 22A and 22B are diagrams for explaining an example that the binding processing, the folding processing and the bookbinding processing are performed in the finisher of FIG. 5.

Figure 15A:
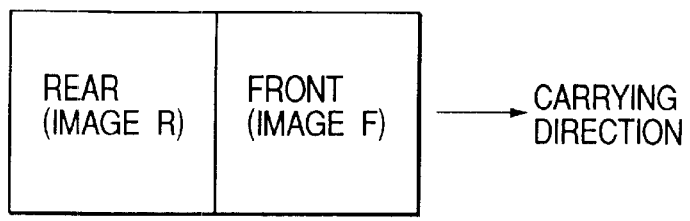
FIGS. 15A and 15B are diagrams for explaining a flow of sheets from the inserter and the printer unit to a holding (storage) guide within the finisher in a bookbinding mode.
Figure 15B:
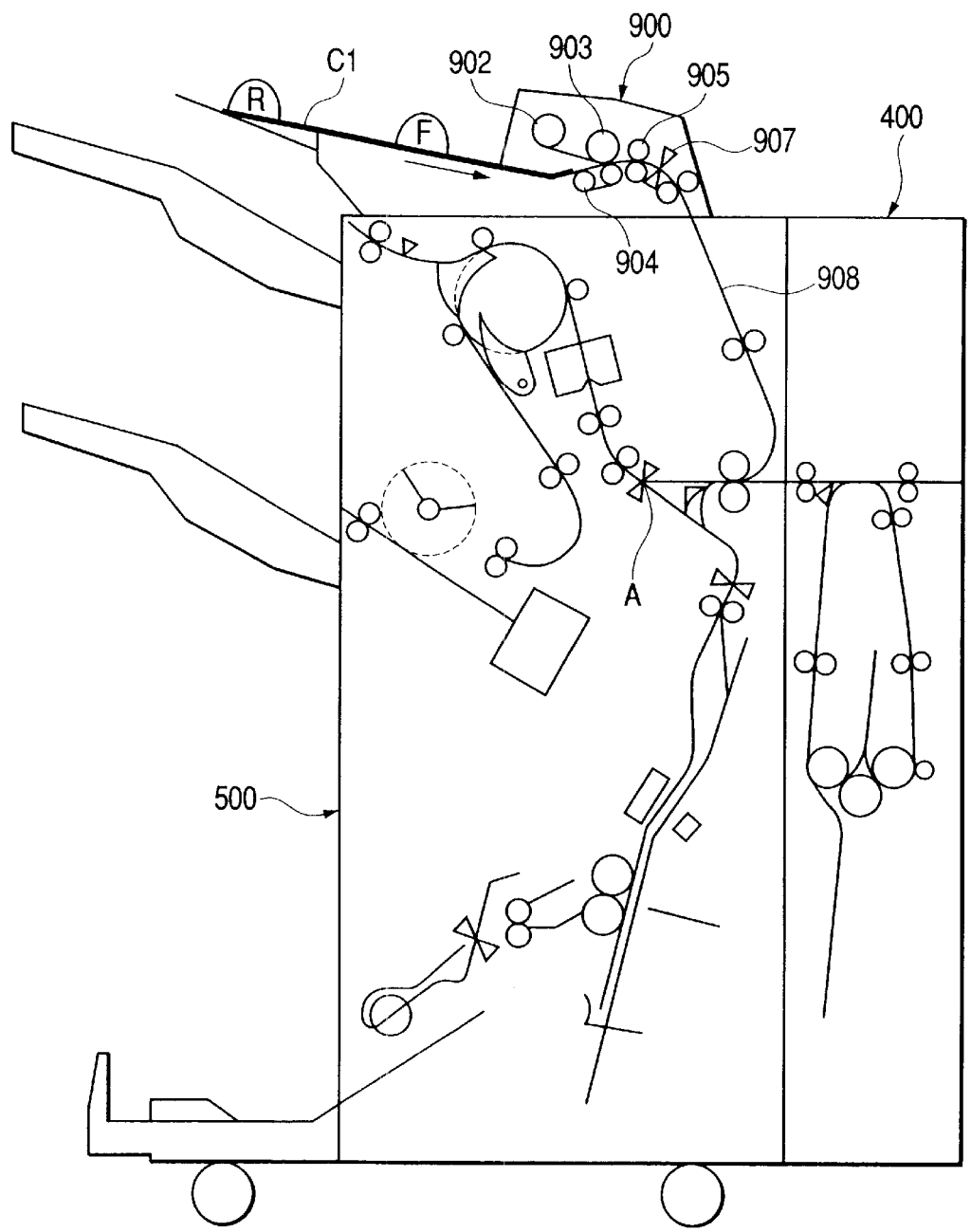

When a sheet C1 is inserted as the cover in the sheets on which the images were respectively formed and the acquired sheets are subjected to the bookbinding processing, as shown in FIG. 15B, the sheet C1 is set on the tray 901 of the inserter 900 by the user. As shown in FIG. 15A, the face on which images R and F were formed is turned faceup, the sheet is set on the tray 901, and the sheet is fed in the state that the image F leads.

Namely, the sheet C1 is set in the erect state and in the faceup state from the user's viewpoint, and the sheet setting state (i.e., the sheet stacking direction for the tray 901) is identical with the original setting state (i.e., the original stacking direction for the original tray 1001) in the original feed unit 100. Therefore, it is possible to increase the operability when the sheet is set to the inserter 900.

Figure 16:
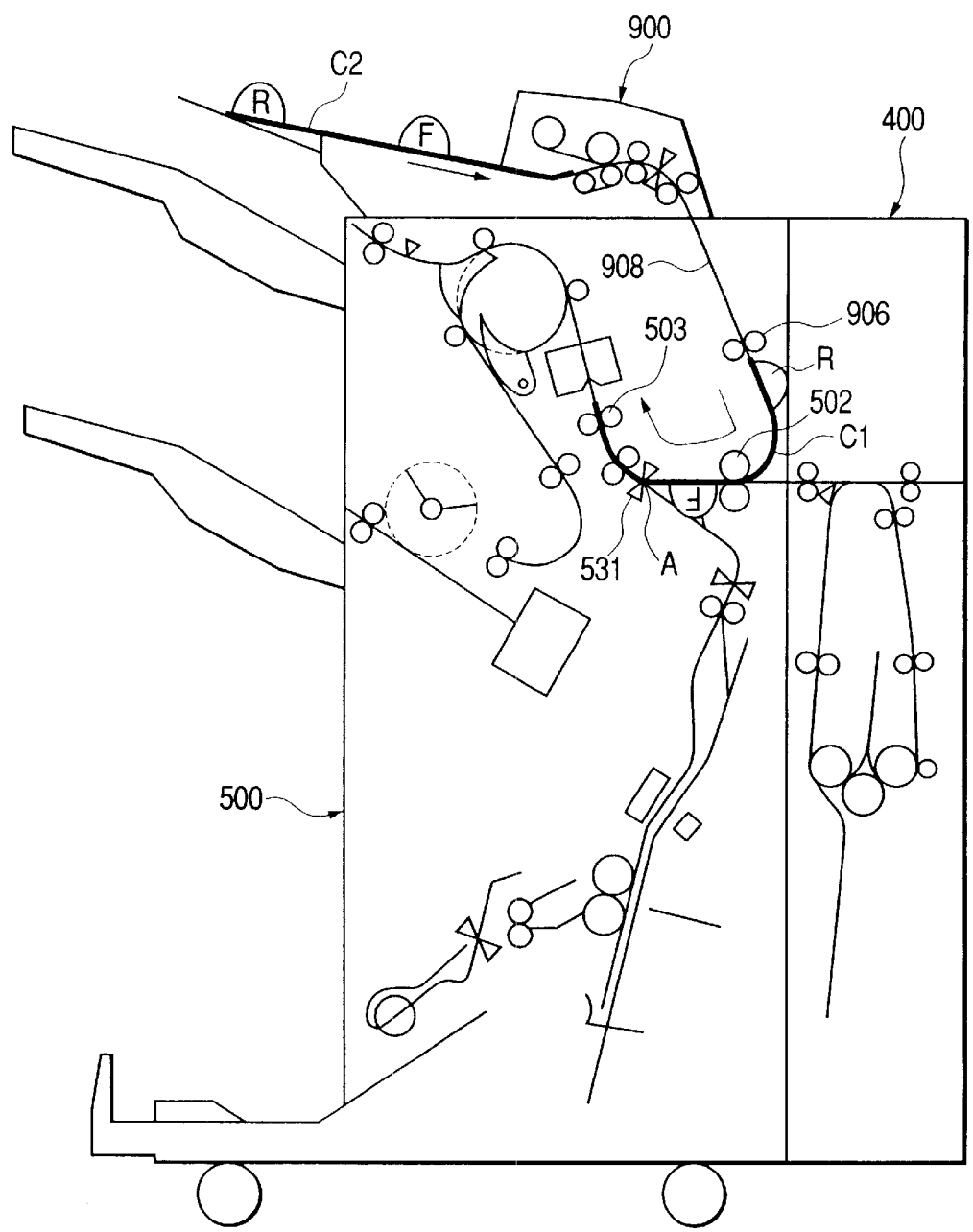
FIG. 16 is a diagram for explaining the flow of the sheets from the inserter and the printer unit to the holding guide within the finisher in the bookbinding mode.

When the user sets the sheaf composed of the sheet C1 to the tray 901 and depresses the not-shown start key on the operation unit 1, then, as shown in FIG. 16, the feed of the uppermost sheet C1 of the sheaf starts. At this time, the change flapper 551 is changed to the side of the finisher path 552. The sheet C1 is guided to the finisher path 552 from the carrying path 908 through the inlet roller 502. When the leading edge of the sheet C1 is detected by the inlet sensor 531, the feed of the sheet (a sheet P1 shown in FIG. 17) from the printer unit 300 starts.

Figure 17:
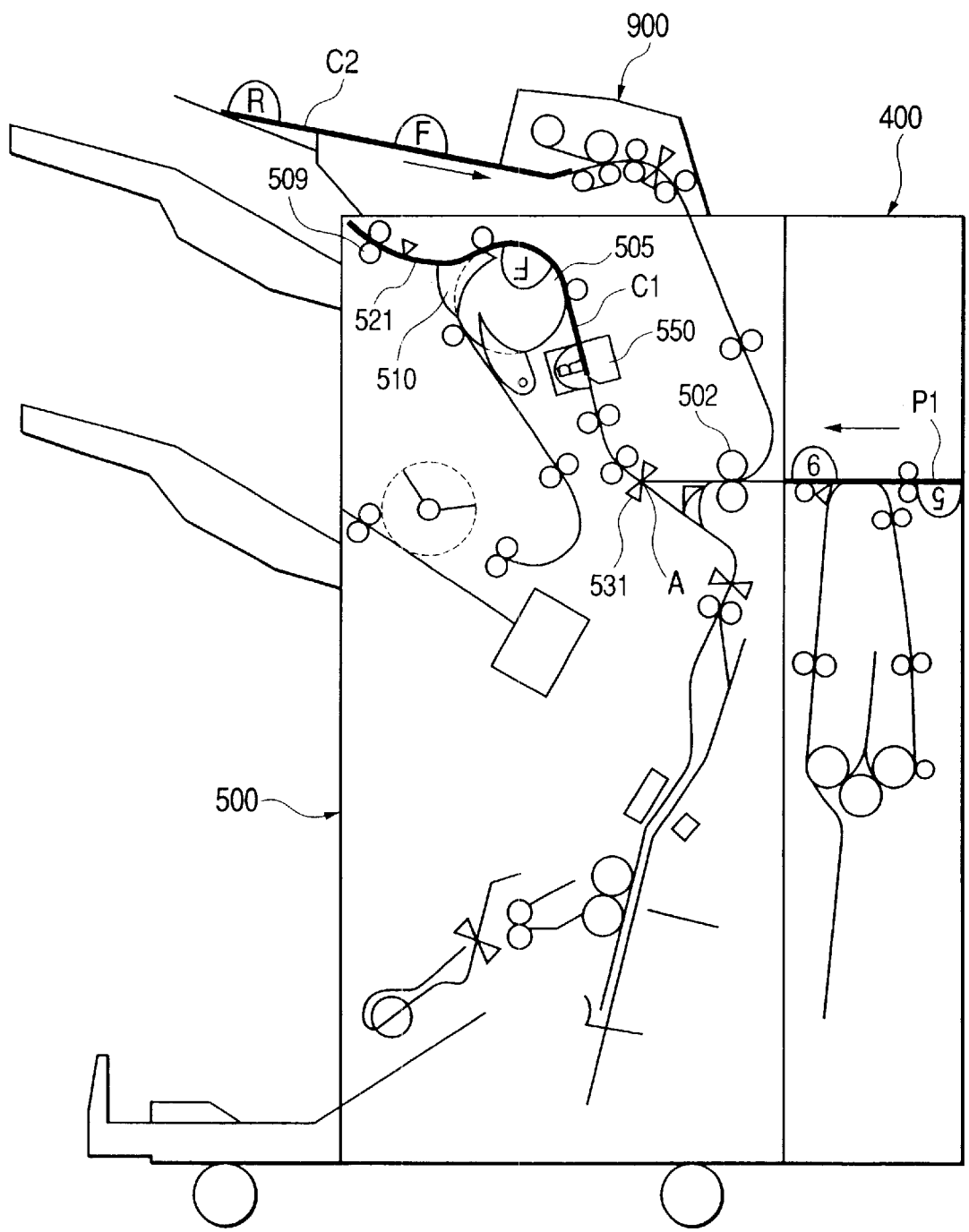
FIG. 17 is a diagram for explaining the flow of the sheets from the inserter and the printer unit to the holding guide within the finisher in the bookbinding mode.

Next, as shown in FIG. 17, the change flapper 510 has been changed to the side of the nonsort path 521. Thus, the sheet C1 is guided to the side of the nonsort path 521 through the buffer roller 505, and the sheet P1 carried from the printer unit 300 is guided into the finisher 500.

When the sheet C1 is guided to the side of the nonsort path 521 and its trailing edge is carried until it passes the inlet sensor 531, as shown in FIG. 17, the carrying of the sheet C1 is once stopped. The position at which the sheet C1 is stopped is the position which is not influenced at least by the driving from the inlet roller 502.

Figure 18:
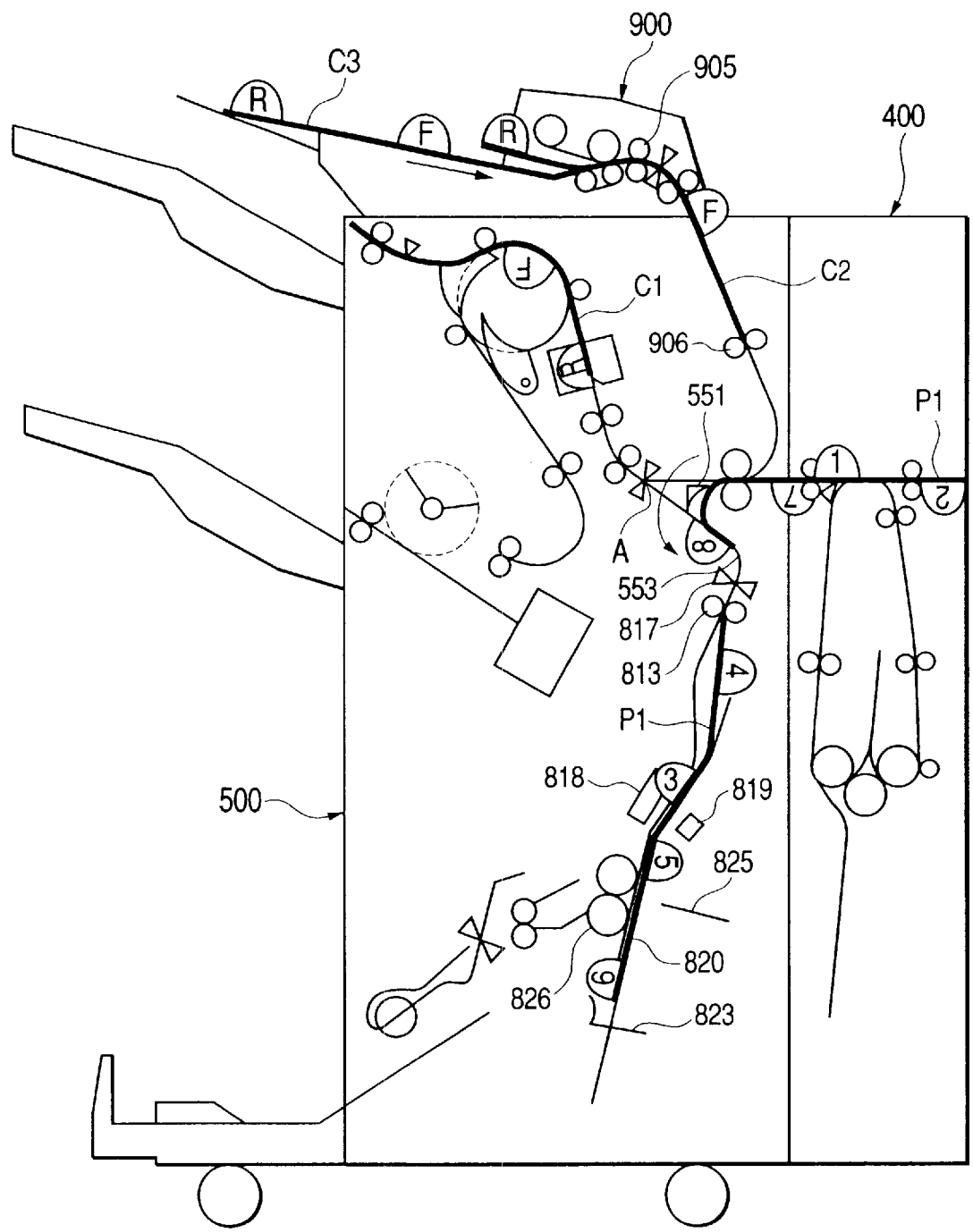
FIG. 18 is a diagram for explaining the flow of the sheets from the inserter and the printer unit to the holding guide within the finisher in the bookbinding mode.
Figure 19:
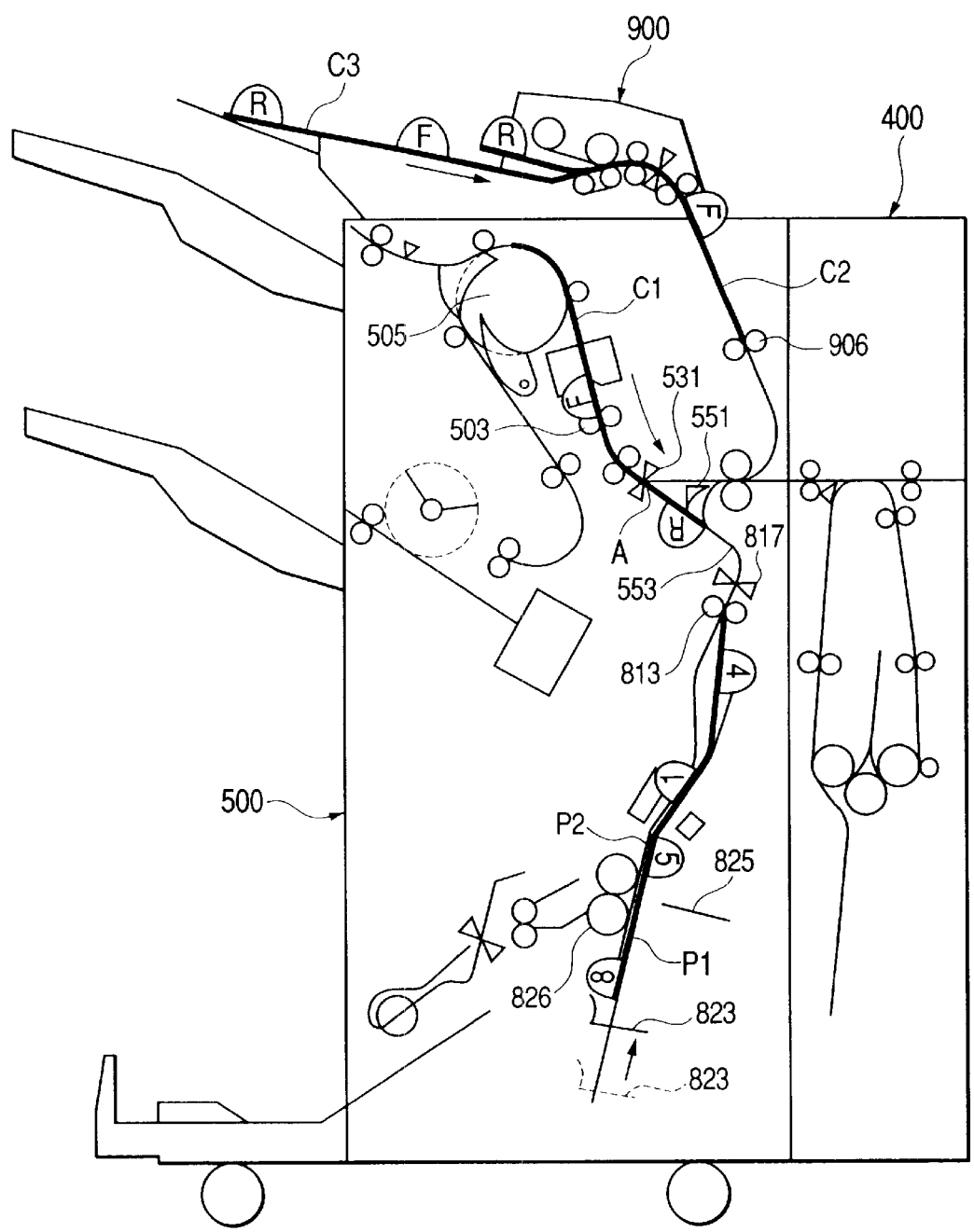
FIG. 19 is a diagram for explaining the flow of the sheets from the inserter and the printer unit to the holding guide within the finisher in the bookbinding mode.

On the other hand, the sheet P1 from the printer unit 300 has been guided into the finisher 500. Thus, as shown in FIG. 18, in the state that the carrying of the sheet C1 was stopped, the sheet P1 is guided to the first bookbinding path 553 by the change flapper 551 and held in the holding guide 820. Subsequent to the sheet P1, a sheet P2 is guided to the first bookbinding path 553.

In the present embodiment, the case where the three sheets composed of the sheet C1 from the inserter 900 and the two sheets P1 and P2 from the printer unit 300 are subjected to the bookbinding processing as one copy was explained by way of example. On the other hand, when the second copy is output, at this time the sheet C2 following the sheet C1 is separated from the sheaf on the tray 901 of the inserter 900, and the separated sheet C2 is carried up to the immediate-front position of the carrying roller 906 and on standby at this position until the sheets P1, P2 and C1 are all held in the holding guide 820.

Accordingly, as the sheets P1 and P2 are held in the holding guide 820, the carrying of the sheet C1 restarts. As shown in detail in FIG. 19, the sheet C1 is reversed and fed to the side of the holding tray 820, and then guided into the holding guide 820 through the branch point A and the second bookbinding path 554. It should be noted that the sheets P1 and P2 are held in the holding guide 820 in the state shown in FIG. 14D.

Figure 20:
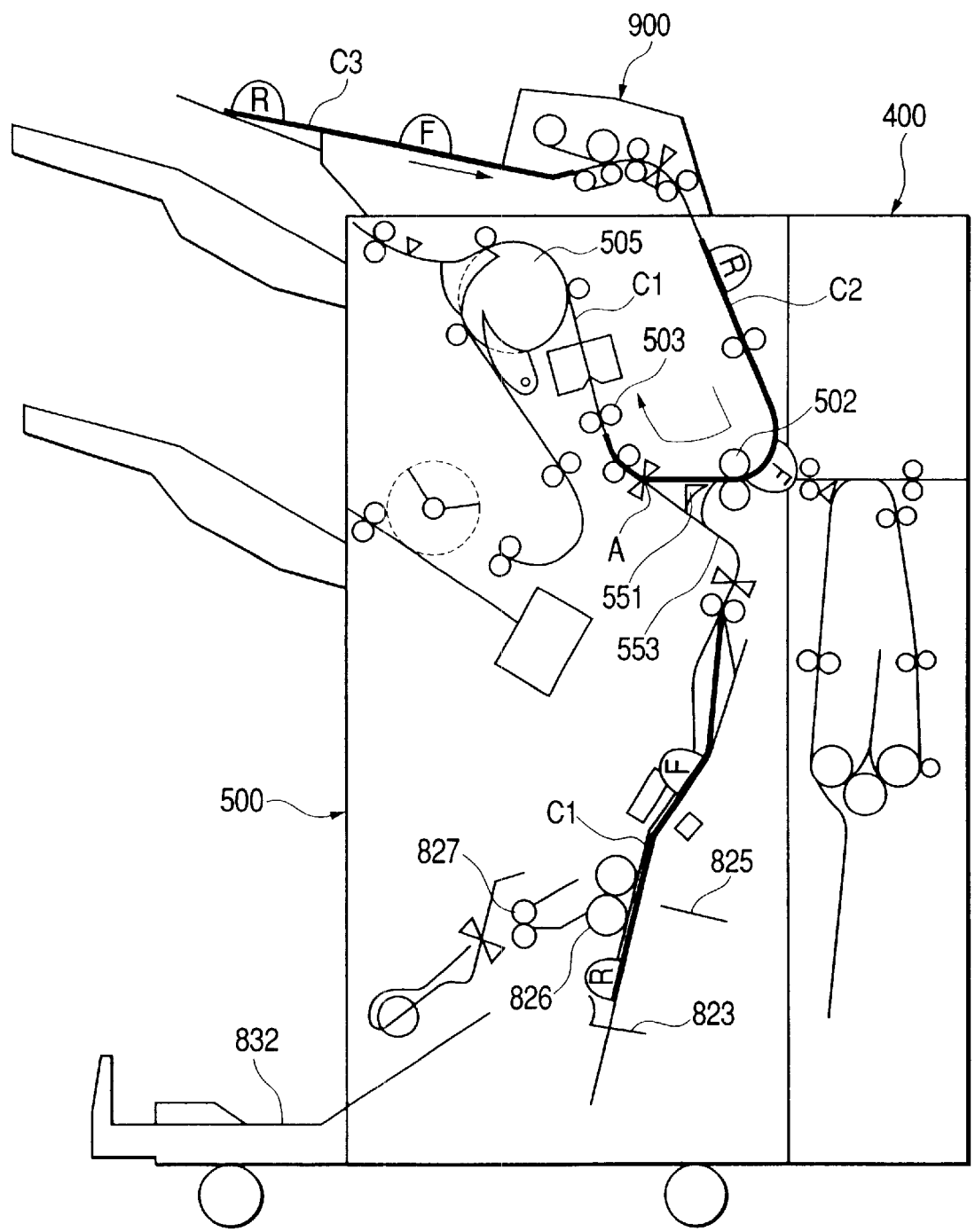
FIG. 20 is a diagram for explaining the flow of the sheets from the inserter and the printer unit to the holding guide within the finisher in the bookbinding mode.

At this time, since the sheet C1 is reversed and fed, as shown in FIG. 20, the sheet C1 is fed in the state that the image R leads, and stacked or laid on the sheaf of the sheets P1 and P2 already held in the holding guide 820.

When the second copy is output, the carrying of the sheet C2 following the sheet C1 restarts such that the sheet C2 is guided to the side of the buffer roller 505, according as the sheet C1 is held in the holding guide 820. Further, for example, when the sheet C2 is an inappropriate sheet because its size is different from the predetermined size, as shown in FIG. 21, the sheet C2 is discharged onto the sample tray 701 as it is. In this case, in the state shown in FIG. 18, the carrying of the sheet C2 is not stopped, and the sheet C2 is discharged onto the sample tray 701 through the buffer roller 505 as it is.

After the sheet C1 was held in the holding guide 820, as shown in FIG. 22A, the extrusion member 825 is extruded toward the sheaf of the sheets C1, P1 and P2, whereby the sheaf is protruded toward the folding roller 826. Thus, the sheaf is folded along the central position (i.e., the image boundary on the image-formed face) by the folding roller 826, and discharged onto the sheet discharge tray 832.

In the sheaf of the sheets which was folded as above, as shown in FIG. 22B, the image F of the sheet C1 is formed on the cover page, and the image R of the sheet C1 is formed on the final page. Further, since the images of the sheets P1 and P2 are disposed in the page order, the directions of the images on the sheets C1, P1 and P2 are conformed to others.

Thus, when the bookbinding processing is performed to the sheaf of the plural sheets, the sheet feed from the inserter 900 and the sheet carrying (conveyance) from the printer unit 300 are controlled, whereby the images of the sheet (C1 in this case) from the inserter 900 are disposed or formed on the head page and the final page, respectively. Therefore, it is possible to acquire the output result in which the images of the plural sheets (P1 and P2 in this case) from the printer unit 300 are disposed in the page order, and the directions of these images are conformed to others.

In the state that the sheet C1 is held in the holding guide 820, the sheaf of the sheets C1, P1 and P2 can be bound in its center part by the stapler 818 In this case, as shown in FIG. 22B, the binding position is located at the left end part of the book-bound sheaf of the sheets.

Next, the processing (i.e., control procedures) concerning the driving control of the finisher 500 will be explained with reference to FIGS. 23, 24, 25, 26, 27, 28 and 29.

Figure 23:
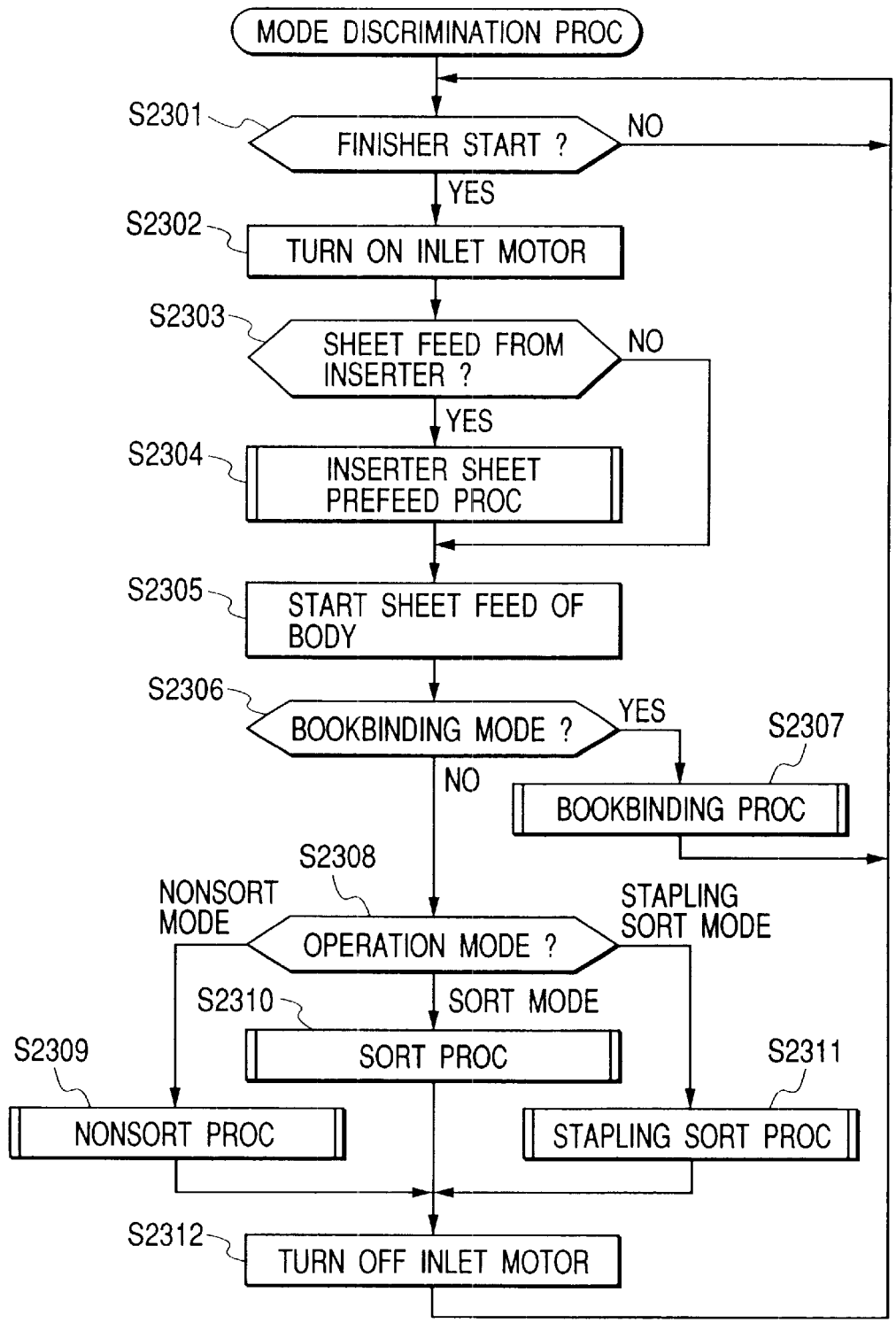
FIG. 23 is a flowchart showing operation mode discrimination processing.

FIG. 23 is the flowchart showing operation mode discrimination processing (or operation) for the finisher 500. The operation mode discrimination processing is performed by the CPU circuit unit 510 in the finisher control unit 501 in accordance with the instruction from the CPU circuit unit 150.

First, it is judged whether or not a finisher start signal To instruct the finisher 500 to start the operation is input to the finisher control unit 501 (step S2301). The processing in the step S2301 is repeated until the start key for instructing start of the copying is depressed on the control unit 1 by the user and thus the finisher start signal is input from the CPU circuit 150 to the finisher control unit 501

If Judged in the step S2301 that the finisher start signal is input to the finisher control unit 501, driving of the inlet motor M1 starts (step S2302). Next, it is judged whether or not there is a sheet feed request for the inserter 900 on the basis of the data from the communication IC 514' (step S2303). The sheet feed request to the inserter 900 is transferred to the finisher control unit 501, when the inserter is selected by the user on the setting screen displayed on the display panel of the control unit 1 (FIG. 7B)

If judged in the step S2303 that there is the sheet feed request for the inserter 900, inserter sheet prefeed processing (or operation) is performed (step S2304). The inserter sheet prefeed processing in the step S2304 will be later explained in detail with reference to FIG. 24.

If judged in the step S2303 that there is no sheet feed request for the inserter 900, of when the inserter sheet prefeed processing ends in the step S2304, a sheet feed signal is output from the CPU circuit unit 510 of the finisher 500 to the CPU circuit unit 150 of the body of the image formation apparatus (i.e., the copying machine 1000) through the communication IC 514' (step S2305). The CPU circuit unit 150 which received the sheet feed signal starts the image formation processing.

Next, based on postprocessing mode data received from the CPU circuit unit 150 through the communication IC 514', it is judged whether or not the operation mode set by the operation unit 1 is the bookbinding mode (step S2306) It should be noted that the operation mode is set on the operation mode setting screen displayed on the display panel of the control unit 1 (FIG. 7A) by the user.

Figure 28:
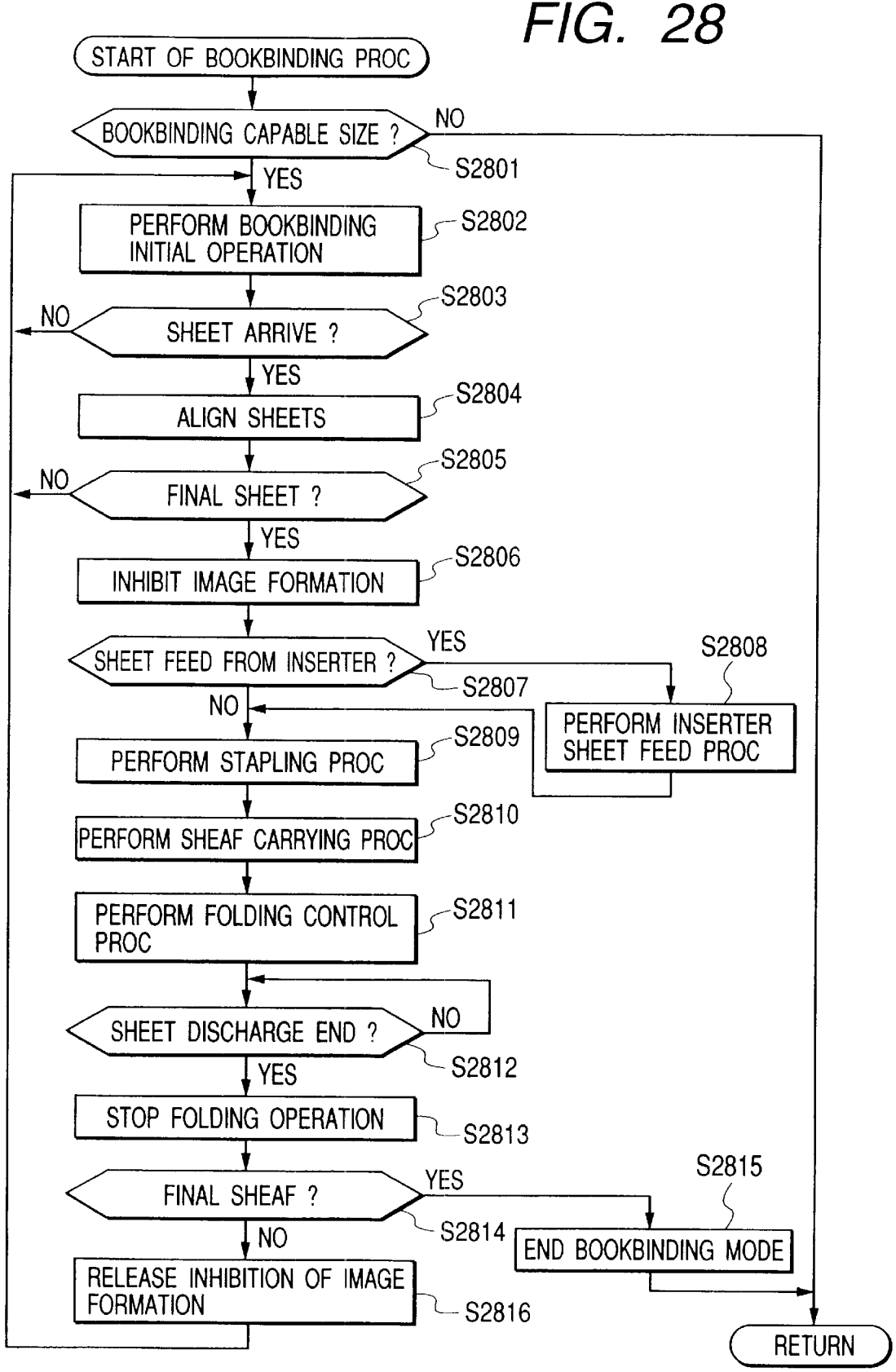
FIG. 28 is a flowchart showing the bookbinding processing.

If judged in the step S2306 that the set operation mode is the bookbinding mode, the bookbinding processing is performed (step S2307) The bookbinding processing in the step S2307 will be later explained in detail with reference to FIG. 28 When the bookbinding processing in the step S2307 ends, the flow returns to the step S2301.

If judged in the step S2306 that the set operation mode is not the bookbinding mode, then it is judged whether or not the set operation mode is any of the nonsort mode, the sort mode and the stapling sort mode (step S2308).

If judged in the step S2308 that the set operation mode is the nonsort mode, then the nonsort processing is performed (step S2309). The nonsort processing in the step S2309 will be later explained in detail with reference to FIG. 25.

If judged in the step S2308 that the set operation mode is the sort mode, then the sort processing is performed (step S2310). The sort processing in the step S2310 will be later explained in detail with reference to FIG. 26.

If judged in the step S2308 that the set operation mode is the stapling sort mode, then stapling sort processing is performed (step S2311). The stapling sort processing in the step S2311 will be later explained in detail with reference to FIG. 27.

When the nonsort processing ends in the step S2309, when the sort processing ends in the step S2310, or when the stapling sort processing ends in the step 2311, the driving of the inlet motor M1 is stopped (step S2312), and the flow returns to the step S2301 to wait for the input of the finisher start signal.

When the processing in any of the steps S2307, S2309, S2310 and S2311 is performed, if it is judged in the step S2303 that there is the sheet feed request for the inserter 900, the inserter sheet prefeed processing in the step S2304 is primarily performed.

Figure 24:
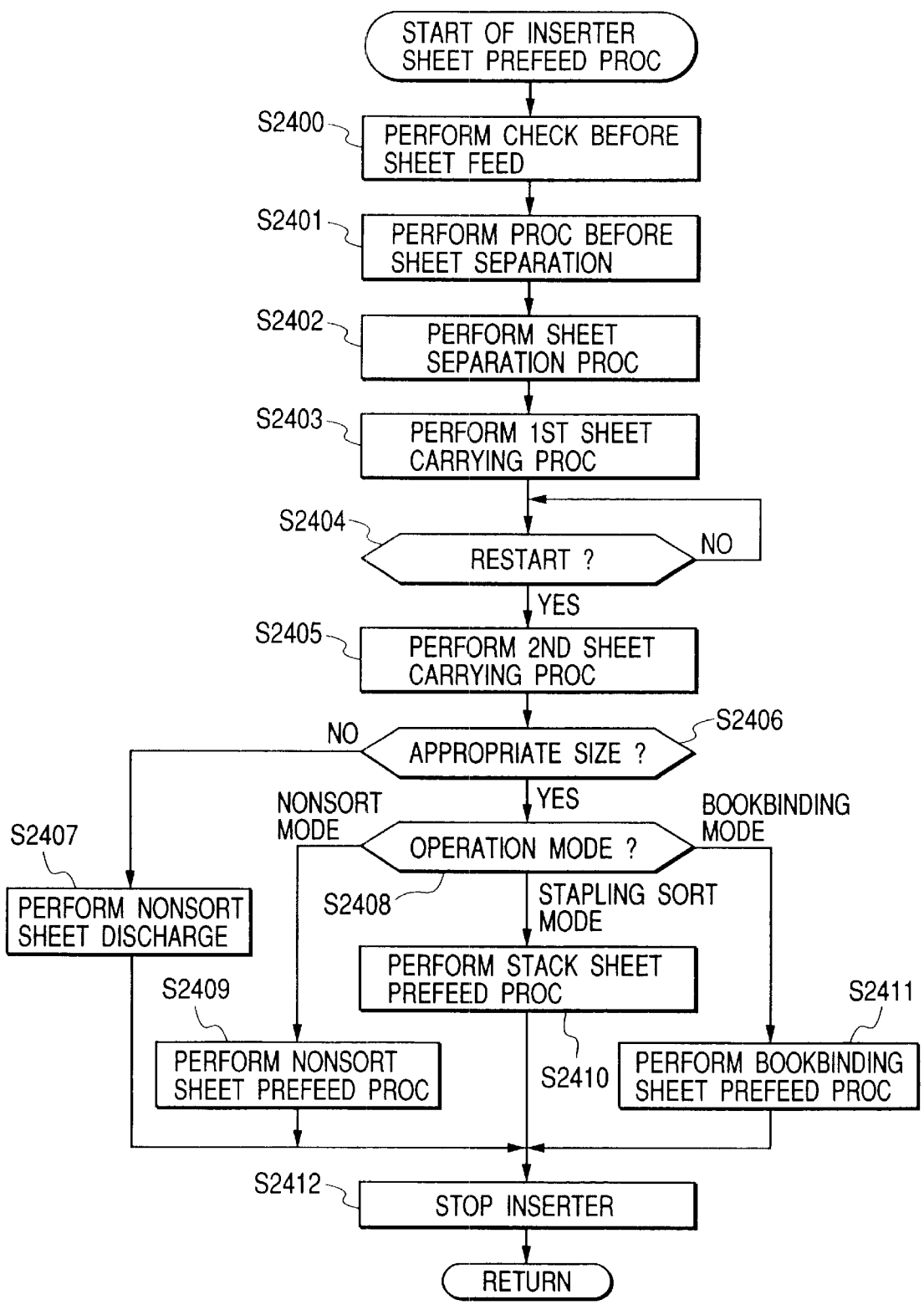
FIG. 24 is a flowchart showing inserter sheet prefeed processing.

Next, the inserter sheet prefeed processing in the step S2304 will be explained in detail with reference to FIG. 24. FIG. 24 is the flowchart for explaining in detail the inserter sheet prefeed processing in the step S2304 of FIG. 23. The inserter sheet prefeed processing which is performed by the CPU circuit unit 510 in the finisher control unit 501 is the processing which is performed in the step S2303 of FIG. 23 when it is judged that there is the sheet feed request for the inserter 900.

In the inserter sheet prefeed processing, a check is first performed before the sheet feed (step S2400). In the step S2400, it is confirmed whether or not the sheet exists on the tray 901 of the inserter 900, and it is confirmed whether or not information such as sheet designation data or the like is transferred from the operation unit 1. Then an image formation inhibition signal is transferred to the CPU circuit unit 150 in the body of the copying machine 1000.

When the check before the sheet feed is performed in the step S2400, and when it is confirmed that sheet feed conditions to feed the sheet from the inserter 900 were established, then processing before the sheet separation is performed (step S2401). In the processing before the sheet separation, the shutter solenoid SL20 (FIG. 6) is turned on to open a sheet feed shutter (not shown) of the inserter 900, and the pickup solenoid SL21 is turned on to lower the sheet feed roller 902 such that the roller 902 lands on the sheet on the tray 901. Further, the clutch CL10 is turned on to transmit driving of the sheet feed motor M20 to the sheet feed roller 902.

When the processing in the step S2401 ends, the driving of the sheet feed motor M20 is started after a predetermined time to rotate the separation roller 903, the separation belt 904 and the extraction roller 905 in the inserter 900 (step S2402). By the processing in the step S2402, the uppermost sheet (the sheet C1 in the present embodiment) of the sheaf (the sheaf C in the present embodiment) is separated and carried toward the carrying path 908.

Next, first carrying (conveyance) processing (or operation) is performed (step S2403). In the processing of the step S2403, the carrying condition of the sheet C1 is observed by the sheet feed sensor 907. When the leading edge of the sheet C1 is detected by the sheet feed sensor 907, the clutch CL10 is turned off, and the number of clocks from a clock sensor disposed in the sheet feed motor M20 is counted. Then when the counted value reaches a predetermined value N1, the driving of the sheet feed motor M20 is stopped. The counting operation is performed until the trailing edge of the sheet C1 is detected by the sheet feed sensor 907.

The processing in the step S2403 is to once stop the sheet carried from the inserter 900 through the extraction roller 905, at the immediate-front position of the carrying roller 906 (FIG. 18).

Next, it is judged whether or not a sheet refeed request for refeeding the sheet C1 to the inserter 900 is received from the CPU circuit unit 150 on the side of the body of the copying machine 1000 (step S2404). The processing in the step S2404 is repeated until the sheet refeed request for the sheet C1 is transferred from the CPU circuit unit 150 of the body of the copying machine 1000 to the CPU circuit unit 510 of the finisher control unit 501.

When the sheet refeed request for the sheet C1 is received in the step S2404, second carrying (conveyance) processing (or operation) is performed (step S2405). In the processing of the step S2405, the driving of the sheet feed motor M20 is restarted to guide the sheet C1 stopped at the at the immediate-front position of the carrying roller 906 to the side of the inlet roller 502. Besides, the buffer motor M2 and the sheet discharge motor M3 are driven. When the trailing edge of the sheet C1 is detected by the sheet feed sensor 907, the counting operation in the step S2403 ends, and the length of the sheet C1 in the carrying direction is calculated on the basis of the value acquired from the counting start to the counting end. Further, it is possible to adopt a structure that the CPU circuit unit 150 on the body side acquires the sheet detection result of the sensor 907 from the finisher control unit 501 through the communication IC 514', and this CPU circuit unit 150 calculates (or generates) the size data including the length data of the sheet carrying direction on the basis of the acquired detection result.

Next, it is judged whether or not the sheet C1 from the inserter 900 has an appropriate size, on the basis of the size data including the carrying-direction length data of the sheet C1 calculated in the step S2405 and designation size data acquired in the step S2400 (step S2406).

If judged in the step S2406 that the sheet C1 does not have the appropriate size, then the change flapper 510 is changed to the side of the nonsort path 521 to discharge the sheet C1 onto the sample tray 701 through the nonsort path 521. Besides, the CPU circuit unit 150 of the body of the image formation apparatus is informed that the sheet having an inappropriate size was carried from the inserter 900 (step S2407). Next, inserter stop processing (or operation) is performed (step S2412). After the processing in the step S2412 ended, the flow returns to the step S2305 of FIG. 23. Such the processing will be explained in the later-described another embodiment, in detail.

In the step S2412, the image formation inhibition signal transferred to the CPU circuit unit 150 in the step S2400 is released, and the driving of the sheet feed motor M20 is stopped. Besides, it is detected by the sheet setting sensor 910 whether or not the sheet exists on the tray 901 of the inserter 900. When the sheet still exists on the tray 901, the shutter solenoid SL20 is kept on.

Conversely, if judged in the step S2406 that the sheet C1 from the inserter 900 has the appropriate size, then the operation mode set from the operation unit 1 is discriminated (step S2408).

When the operation mode discriminated in the step S2408 is the nonsort mode, nonsort sheet prefeed processing (or operation) is performed (step S2409). In the processing of the step S2409, the sheet C1 from the inserter 900 is discharged onto the sample tray 701. When the processing in the step S2408 ends, the flow advances to the step S2412.

When the operation mode discriminated in the step S2408 is the sort mode or the stapling sort mode, stack sheet prefeed processing (or operation) is performed (step S2410), and the flow advances to the step S2412.

In the processing of the step S2410, the change flappers 510 and 511 are changed to the side of the sort path 522 to guide the sheet C1 to the processing tray 630. It should be noted that the sheet C1 from the inserter 900 is stacked or laid on the processing tray 630 with its image-formed face facedown. The sheets are aligned on the processing tray 630. Besides, by performing the binding processing to the sheaf composed of the plural sheets stacked on the processing tray 630 with use of the stapler 601, it is possible to perform the bookbinding processing.

When the operation mode discriminated in the step S2408 is the bookbinding mode, bookbinding sheet prefeed processing (or operation) is performed (step S2411). In the processing of the step S2411, the change flapper 510 is changed to the side of the nonsort path 521, and the sheet C1 is carried to the position at which its leading edge reaches the nonsort path 521 (FIG. 17). When it is detected that the trailing edge of the sheet C1 passes the carrying roller 503, the driving of the buffer motor M2 and the driving of the sheet discharge motor M3 are stopped, whereby the sheet C1 is on standby within the nonsort path 521. In the present embodiment, the sheet C1 from the inserter 900 is once on standby within the nonsort path 521 in the bookbinding mode. In this case, it is assumed that the position where the sheet C1 from the inserter 900 is once stopped is the position where the trailing edge of the sheet C1 which passed the carrying roller 503 is not influenced by carrying power of the carrying roller 503. When the processing of the step S2411 ends, the flow advances to the step S2412.

The inserter sheet prefeed processing shown in FIG. 24 is the processing to carry or convey the sheet from the inserter 900 to the finisher 500 before the sheet is carried from the printer unit 300 to the finisher 500. Particularly, in the cover mode, it is possible by the processing of the step S2406 or the like to previously know a cover size. Thus, it is possible to minimize system down when the size of the sheet from the inserter 900 is not coincident with the size of the sheet from the printer unit 300.

Figure 25:
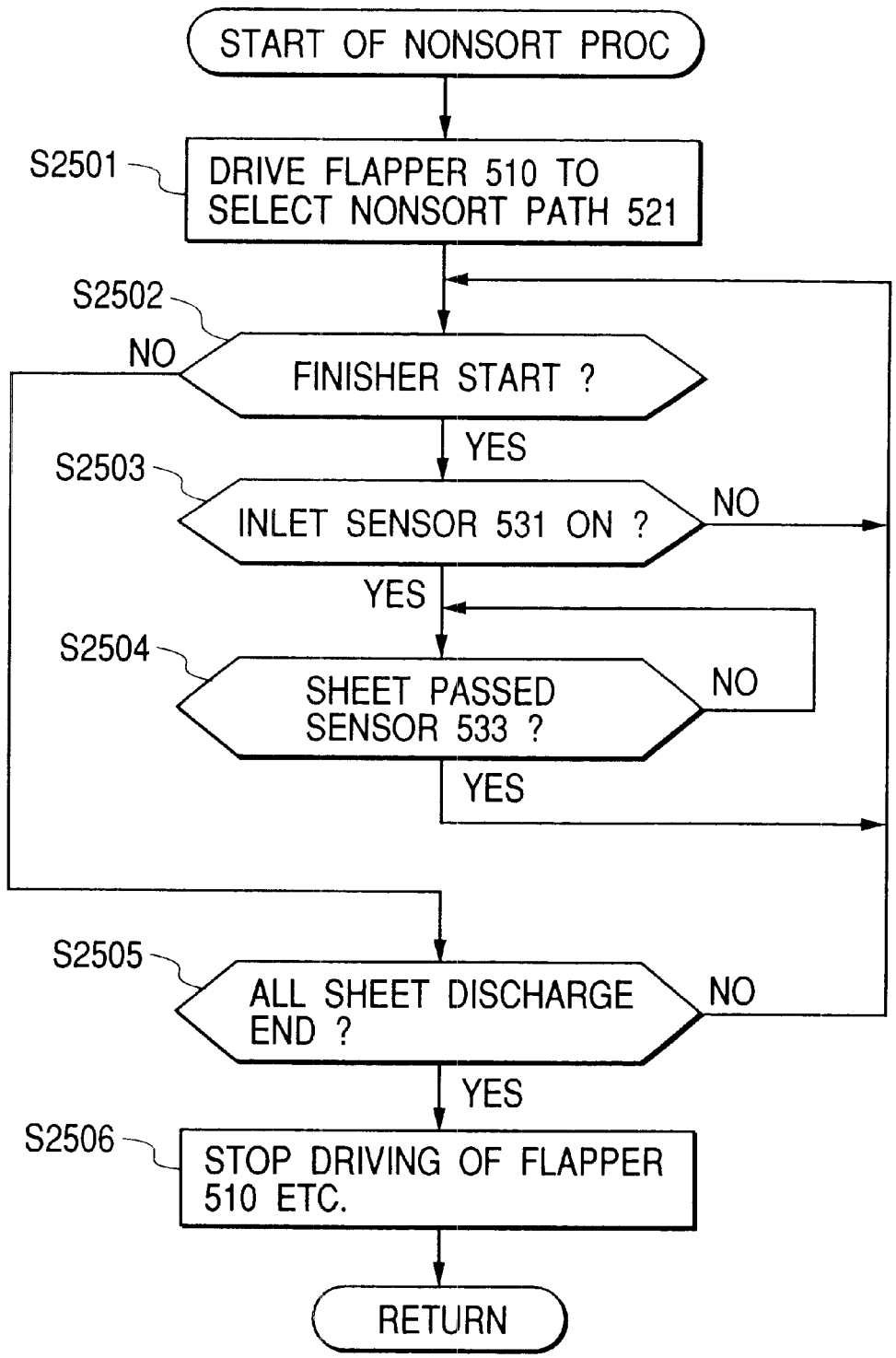
FIG. 25 is a flowchart showing nonsort processing.

Next, the nonsort processing in the step S2309 of FIG. 23 will be explained with reference to the flowchart of FIG. 25. The nonsort processing is performed when the operation mode discriminated in the step S2308 of FIG. 23 is the nonsort mode.

In the nonsort processing, the change flapper 510 is first driven to discharge the sheet onto the sample tray 701 (FIG. 5), whereby the change flapper 510 is changed to the side of the nonsort path 521 (step S2501). At this time, the change flapper 551 has been changed to the side of the finisher path 552.

Next, it is judged whether or not the finisher start signal for the finisher 500 is on (step S2502). The processing in the step S2502 is to confirm whether or not the sheet is carried from the printer unit 300 to the finisher 500. If judged in the step S2502 that the finisher start signal is on, then it is judged whether or not the inlet sensor 531 is on (step S2503).

The processing in the step S2503 is to detect whether or not the sheet was carried from the printer unit 300 into the finisher 500. When the leading edge of the sheet carried from the printer unit 300 reaches the position where the inlet sensor 531 is disposed, the sensor 531 becomes on. Further, the inlet sensor 531 is on until the sheet completely passes the sensor 531, i.e., until the trailing edge of the sheet traverses the sensor 531.

If judged in the step S2503 that the inlet sensor 531 is not on, the flow returns to the step S2502. Conversely, if judged in the step S2503 that the inlet sensor 531 is on, the buffer motor M2 and the sheet discharge motor M3 are started, and the flow advances to a step S2504 to wait until the sheet discharge sensor 533 becomes off (i.e., the sheet passes the sensor 533). When the sensor 533 becomes off, the flow returns to the step S2502.

If judged in the step S2502 that the finisher start signal is off, then it is judged whether or not all the sheets to be discharged from the printer unit 300 are discharged onto the sample tray 701 (step S2505). If judged in the step S2505 that all the sheets from the printer unit 300 are not discharged onto the sample tray 701, the flow returns to the step S2502.

Conversely, if judged in the step S2505 that all the sheets discharged from the printer unit 300 are discharged onto the sample tray 701, the driving of the change flapper 510 is stopped, and the driving of the buffer motor M2 and the driving of the sheet discharge motor M3 are also stopped (step S2506). Then the processing ends, and the flow returns to the step S2312 in FIG. 23.

Figure 26:
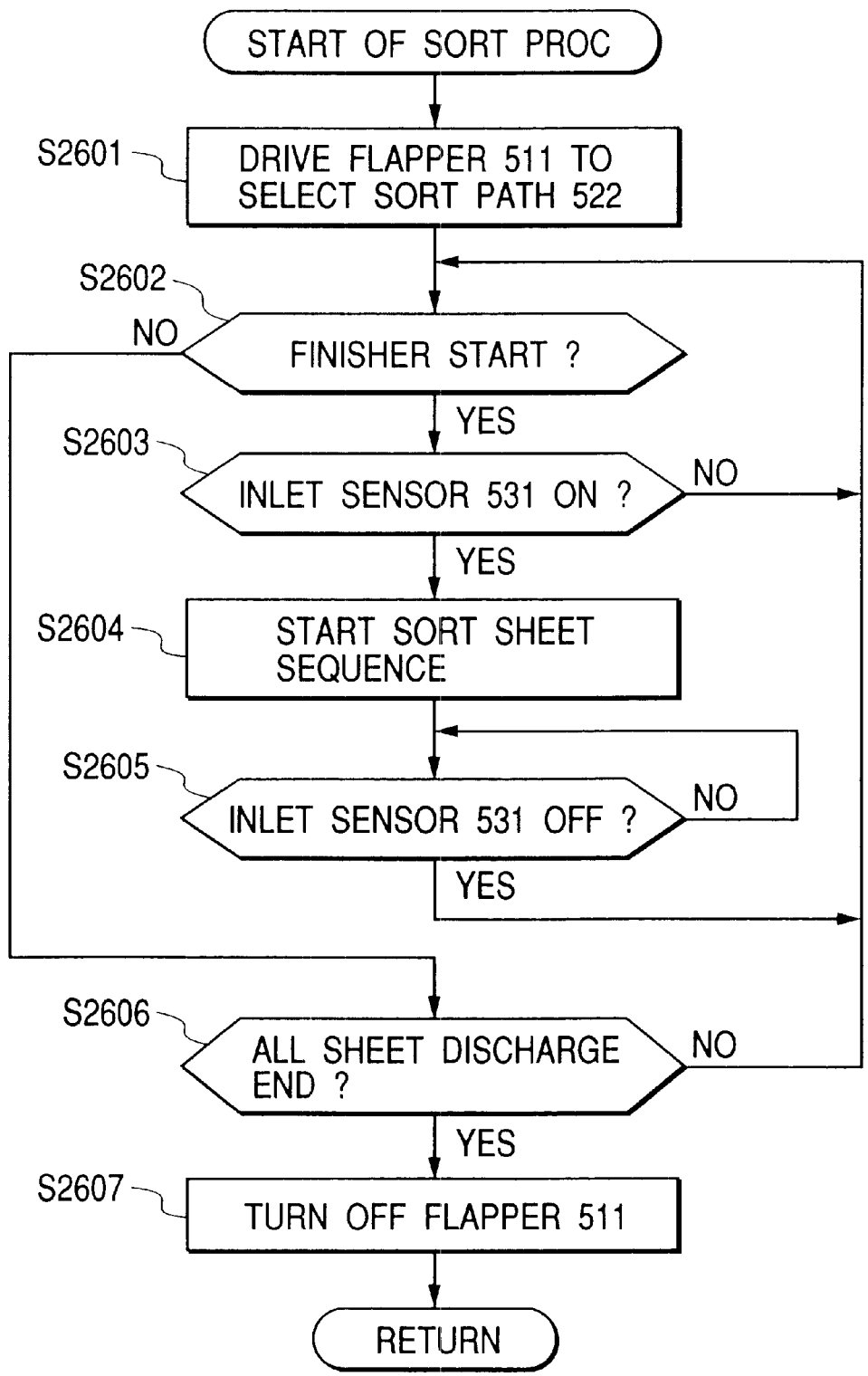
FIG. 26 is a flowchart showing sort processing.

Next, the sort processing in the step S2310 of FIG. 23 will be explained with reference to the flowchart shown in FIG. 26. The sort processing is performed when the operation mode discriminated in the step S2308 of FIG. 23 is the sort mode.-Please In the sort processing, the change flapper 511 is first driven to carry the sheet onto the processing tray 630 (FIG. 5), whereby the change flapper 511 is changed to the side of the sort path 522 (step S2601). At this time, the change flapper 551 has been changed to the side of the finisher path 552.

Next, it is judged whether or not the finisher start signal for the finisher 500 is on (step S2602). The processing in the step S2602 is to confirm whether or not the sheet is carried from the printer unit 300 to the finisher 500. If judged in the step S2602 that the finisher start signal is on, then it is judged whether or not the inlet sensor 531 is on (step S2603).

The processing in the step S2603 is to detect whether or not the sheet was carried from the printer unit 300 into the finisher 500. When the leading edge of the sheet carried from the printer unit 300 reaches the position where the inlet sensor 531 is disposed, the sensor 531 becomes on. Further, the inlet sensor 531 is on until the sheet completely passes the sensor 531, i.e., until the trailing edge of the sheet traverses the sensor 531.

If judged in the step S2603 that the inlet sensor 531 is not on, the flow returns to the step S2602. Conversely, if judged in the step S2603 that the inlet sensor 531 is on, a sort sheet sequence is started (step S2604).

In the sort sheet sequence of the step S2604, multitasking processing (or operation) is performed by the CPU of the CPU circuit unit 150 to control the start and stop of the buffer motor M2 and the acceleration and deceleration of the sheet discharge motor M3. By such the processing, the distance between the sheet to be carried to the processing tray 630 and the subsequent sheet is adjusted, and the sheets are subjected to aligning processing (or operation) by an aligning member (not shown) disposed on the processing tray 630 every time the sheet is stacked or laid on the tray 630. When the sheet stacking ends on the processing tray 630, then sheaf discharge processing (or operation) to the stacking tray 700 is performed.

After the processing in the step S2604 ended, the flow advances to a step S2605 to wait until the inlet sensor 531 becomes off. When the inlet sensor 531 becomes off, the flow returns to the step S2602.

If judged in the step S2602 that the finisher start signal is off, then it is judged whether or not all the sheaves to be discharged in the step S2604 are discharged onto the stacking tray 700 (step S2606).

If judged in the step S2606 that all the sheaves are not discharged onto the stacking tray 700, the flow returns to the step S2602. Conversely, if judged that all the sheaves are discharged onto the stacking tray 700, the driving of the change flapper 511 is stopped (step S2607). Then the processing ends, and the flow returns to the step S2312 in FIG. 23.

Figure 27:
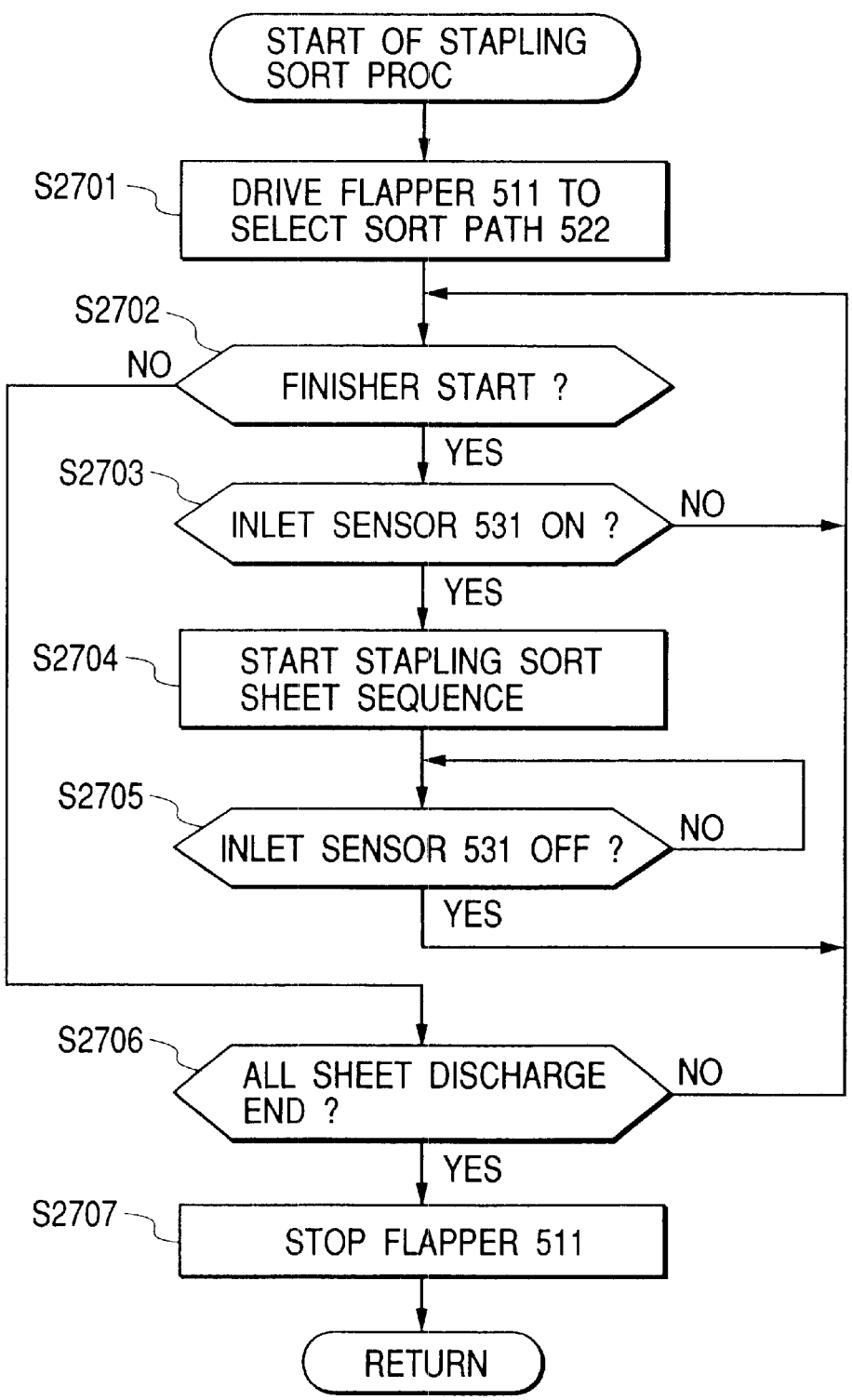
FIG. 27 is a flowchart showing stapling sort processing.

Next, the stapling sort processing in the step S23 11 of FIG. 23 will be explained with reference to the flowchart shown in FIG. 27. The stapling sort processing is performed when the operation mode discriminated in the step S2308 of FIG. 23 is the stapling sort mode.

In the stapling sort processing, the change flapper 511 is first driven to carry the sheet onto the processing tray 630 (FIG. 5), whereby the change flapper 511 is changed to the side of the sort path 522 (step S2701). At this time, the change flapper 551 has been changed to the side of the finisher path 552.

Next, it is judged whether or not the finisher start signal for the finisher 500 is on (step S2702). The processing in the step S2702 is to confirm whether or not the sheet is carried from the printer unit 300 to the finisher 500. If judged in the step S2702 that the finisher start signal is on, then it is judged whether or not the inlet sensor 531 is on (step S2703).

The processing in the step S2703 is to detect whether or not the sheet was carried from the printer unit 300 into the finisher 500. When the leading edge of the sheet carried from the printer unit 300 reaches the position where the inlet sensor 531 is disposed, the sensor 531 becomes on. Further, the inlet sensor 531 is on until the sheet completely passes the sensor 531, i.e., until the trailing edge of the sheet traverses the sensor 531.

If judged in the step S2703 that the inlet sensor 531 is not on, the flow returns to the step S2702. Conversely, if judged in the step S2703 that the inlet sensor 531 is on, a stapling sort sheet sequence is started (step S2704).

In the stapling sort sheet sequence of the step S2704, the multitasking processing is performed by the CPU of the CPU circuit unit 150 to control the start and stop of the buffer motor M2 and the acceleration and deceleration of the sheet discharge motor M3. By such processing, the distance between the sheet to be carried to the processing tray 630 and the subsequent sheet is adjusted, and the sheets are subjected to the aligning processing by the aligning member (not shown) disposed on the processing tray 630 every time the sheet is stacked or laid on the tray 630. When the sheet stacking ends on the processing tray 630, then the stapling processing to the sheaf of the sheets is performed by the stapler 601, and the sheaf subjected to the stapling processing is discharged onto the stacking tray 700.

After the processing in the step S2704 ended, the flow advances to a step S2705 to wait until the inlet sensor 531 becomes off. When the inlet sensor 531 becomes off, the flow returns to the step S2702.

If judged in the step S2702 that the finisher start signal is off, then it is judged whether or not all the sheaves to be discharged in the step S2704 are discharged onto the stacking tray 700 (step S2706).

If judged in the step S2706 that all the sheaves are not discharged onto the stacking tray 700, the flow returns to the step S2702. Conversely, if judged that all the sheaves are discharged onto the stacking tray 700, the driving of the change flapper 511 is stopped (step S2707). Then the processing ends, and the flow returns to the step S2312 in FIG. 23.

Next, the bookbinding processing in the step S2307 of FIG. 23 will be explained with reference to the flowchart shown in FIG. 28. The bookbinding processing is performed when the operation mode judged in the step S2306 of FIG. 23 is the bookbinding mode.

In the bookbinding processing, it is judged based on size information whether or not the size of the sheet carried from the printer unit 300 to the finisher 500 is suitable for the bookbinding (step S2801). If judged in the step S2801 that the sheet size is not suitable for the bookbinding, the processing ends, and the flow returns to the step S2301 of FIG. 23.

Conversely, if judged in the step S2801 that the sheet size is suitable for the bookbinding, a bookbinding initial operation is performed (step S2802). In the bookbinding initial operation of the step S2802, the carrying motor M10 is driven to rotate a bookbinding roller (i.e., the carrying roller 813), thereby setting a sheet carriable (conveyable) state. Besides, the change solenoid SL10 is driven to change the flapper 551 to the side of the first bookbinding path 553, such that the sheet from the printer unit 300 is guided to the holding guide 820. Further, a narrowing member (not shown) is positioned to have a width by which predetermined-quantity room is given to the width of the sheet. Further, the positioning motor M11 is rotated by the predetermined number of steps such that the distance between the sheet positioning member 823 and the stapling position of the stapler 818 becomes half of the length in the sheet carrying direction.

Next, in response to the signal from the bookbinding inlet sensor 817, it is judged whether or not the sheet from the printer unit 300 is carried into the holding guide 820 (step S2803). If judged that the sheet is not carried into the holding guide 820, the flow returns to the step S2802.

Conversely, if judged in the step S2803 that the sheet from the printer unit 300 is carried into the holding guide 820, the narrowing member (not shown) is driven after a predetermined time elapsed, thereby aligning the sheets held in the holding guide 820 in the sheet width direction (step S2804).

Next, it is judged whether or not the sheet processed in the step S2804 is the final one of the plural sheets to be subjected to the bookbinding processing as one sheaf (step S2805). When the sheet in question is not the final sheet, the flow returns to the step S2802. Conversely, if judged in the step S2805 that the sheet in question is the final sheet, the image formation inhibition signal is transferred to the CPU circuit unit 150 not to carry the sheet from the printer unit 300 to the finisher 500 (step S2806).

Next, it is judged whether or not the sheet feed from the inserter 900 is designated by the user on the screen of the operation unit 1 of FIG. 7B (step S2807). If judged that the sheet feed from the inserter 900 is designated, inserter sheet feed processing (or operation) is performed (step S2808). The inserter sheet feed processing in the step S2808 will be explained later with reference to the flowchart shown in FIG. 29.

Conversely, if judged in the step S2807 that the sheet feed from the inserter 900 is not designated, the stapling processing is performed to the sheaf of the sheets aligned in the holding guide 820, by using the stapler 818 (step S2809).

After the processing in the step S2809 ended, sheaf carrying (conveyance) processing (or operation) is performed (step S2810). In the sheaf carrying processing of the step S2810, the positioning motor M1 is driven to lower the sheet positioning member 823 and the carrying motor M10 is driven to rotate the carrying roller 813, so as to move the sheaf of the sheet by the distance between the stapling position of the stapler 818 and the nip position of the folding roller 826.

After the processing in the step S2810, folding control processing (or operation) was performed (step S2811). In the folding control processing of the step S2811, the clutch CL1 and the folding motor M12 are driven to move the extrusion member 825 toward the folding roller 826 (in the direction indicated by the arrow of FIG. 22A).

By the folding control processing, the center of the sheaf of the sheets (i.e., the stapling position on the sheets) is guided to the nip point of the folding roller 826, and the sheaf is folded double by the folding roller 826. It should be noted that the extrusion member 825 can be reciprocated by a camshaft mechanism. Thus, when one reciprocation motion of the extrusion member 825 is detected by a sensor (not shown), the driving of the clutch CL1 is stopped.

After the processing of the step S2811 ended, in response to the detection signal from the bookbinding sheet discharge sensor 830, it is judged whether or not the folded sheaf of the sheets is discharged to the sheet discharge tray 832 (step S2812). It should be noted that the bookbinding sheet discharge sensor 830 detects the trailing edge of the folded sheet. The processing in the step S2812 is repeated until it is confirmed that the sheaf of the sheets is discharged to the sheet discharge tray 832.

Conversely, if judged in the step S2812 that the sheaf of the sheets is discharged to the sheet discharge tray 832, then the driving of the folding motor M12 is stopped (step S2813). Next, it is judged whether or not the discharge sheaf of the sheets is the final sheaf to be subjected to the bookbinding processing (step S2814).

If judged in the step S2814 that the discharge sheaf is the final sheaf to be subjected to the bookbinding processing, then end processing (or operation) of the bookbinding mode is performed (step S2815). In the end processing of the bookbinding mode of the step S2815, the narrowing member and the sheet positioning member 823 are moved respectively to predetermined standby positions. Besides, the change flapper 551 is changed to the side of the finisher path 552. Then the processing in the bookbinding mode ends. After the processing in the step S2815 ended, the flow returns to the step S2301 in the flowchart of FIG. 23.

Conversely, if judged in the step S2814 that the discharged sheaf is not the final sheaf to be subjected to the bookbinding processing, then the image formation inhibition signal is released, and such a release of the image formation inhibition signal is informed to the CPU circuit unit 150 (step S2818). Then the flow returns to the step S2802.

Figure 29:
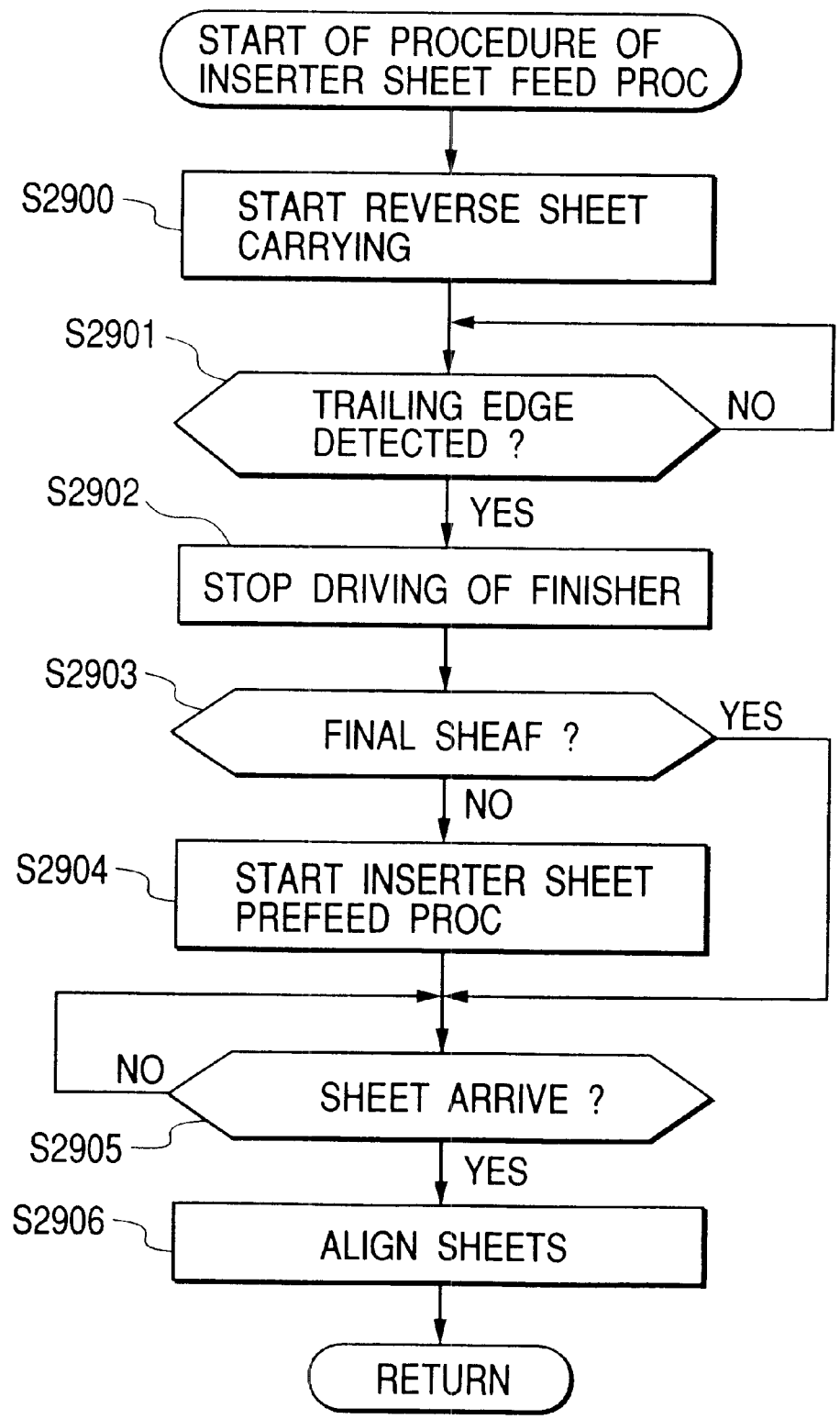
FIG. 29 is a flowchart showing inserter sheet feed processing.

Next, the inserter sheet feed processing in the step S2808 of FIG. 28 will be explained with reference to the flowchart of FIG. 29. The inserter sheet feed processing is performed when it is judged in the step S2807 of FIG. 28 that the sheet feed from the inserter 900 is designated, and is to guide the sheet from the inserter 900 to the holding guide 820.

In the present embodiment, before the inserter sheet feed processing is performed, the inserter sheet prefeed processing shown in FIG. 24 is performed. By the bookbinding sheet prefeed processing of the step S2411 in the inserter sheet prefeed processing of FIG. 24, the sheet C1 from the inserter 900 is on standby in the nonsort path 521 (FIG. 17).

In the inserter sheet feed processing, the sheet which is fed from the inserter 900 and on standby in the nonsort path 521 is first reversed and carried (step S2900). In the processing of the step S2900, the rotational direction of the inlet motor M1 is set to be opposite to the rotational direction of the buffer motor M2, and the driving of the motors M1 and M2 is started, such that the sheet C1 fed from the inserter 900 and on standby in the nonsort path 521 is guided to the second bookbinding path 554. At the same time, the driving of the carrying motor M10 is started.

Next, it is judged whether or not the trailing edge of the sheet C1 from the inserter 900 which sheet C1 is carried from the side of the nonsort path 521 to the side of the second bookbinding path 554 is detected by the inlet sensor 531 (step S2901). The processing in the step S2901 is repeated until the trailing edge of the sheet C1 is detected by the inlet sensor 531.

When the trailing edge of the sheet C1 from the inserter 900 is detected by the inlet sensor 531 in the step S2901, finisher driving stop processing (or operation) is performed (step S2902). In the finisher driving stop processing of the step S2902, the driving of the inlet motor M1 and the buffer motor M2 is stopped. Namely, the carrying of the sheet C1 from the inserter 900 is continued until the trailing edge of the sheet C1 is detected in the step S2901.

Next, it is confirmed whether or not the sheaf of the sheets currently processed is the final sheaf to be subjected to the bookbinding processing (step S2903). If judged that the currently processed sheaf is not the final sheaf, the command to start the above inserter sheet prefeed processing is emitted (step S2904). When such a start command is emitted, the inserter sheet prefeed processing is performed besides the above bookbinding processing.

Next, in response to the detection signal from the bookbinding inlet sensor 817, it is judged whether or not the sheet C1 from the inserter 900 is carried into the holding guide 820 (step S2905). The processing in the step S2905 is repeated until the sheet C1 from the inserter 900 is carried into the holding guide 820. the bookbinding inlet sensor 817 detects the trailing edge of the sheet. If judged in the step S2903 that the currently processed sheaf is the final sheaf to be subjected to the bookbinding processing, the flow advances to the step S2905.

If judged in the step S2905 that the sheet C1 from the inserter 900 is carried into the holding guide 820, the narrowing member (not shown) is driven after the predetermined time elapsed, thereby aligning the sheets held in the holding guide 820 in the sheet width direction (step S2906). After the processing in the step S2906 ended, the flow advances to the step S2809.

Figure 30:
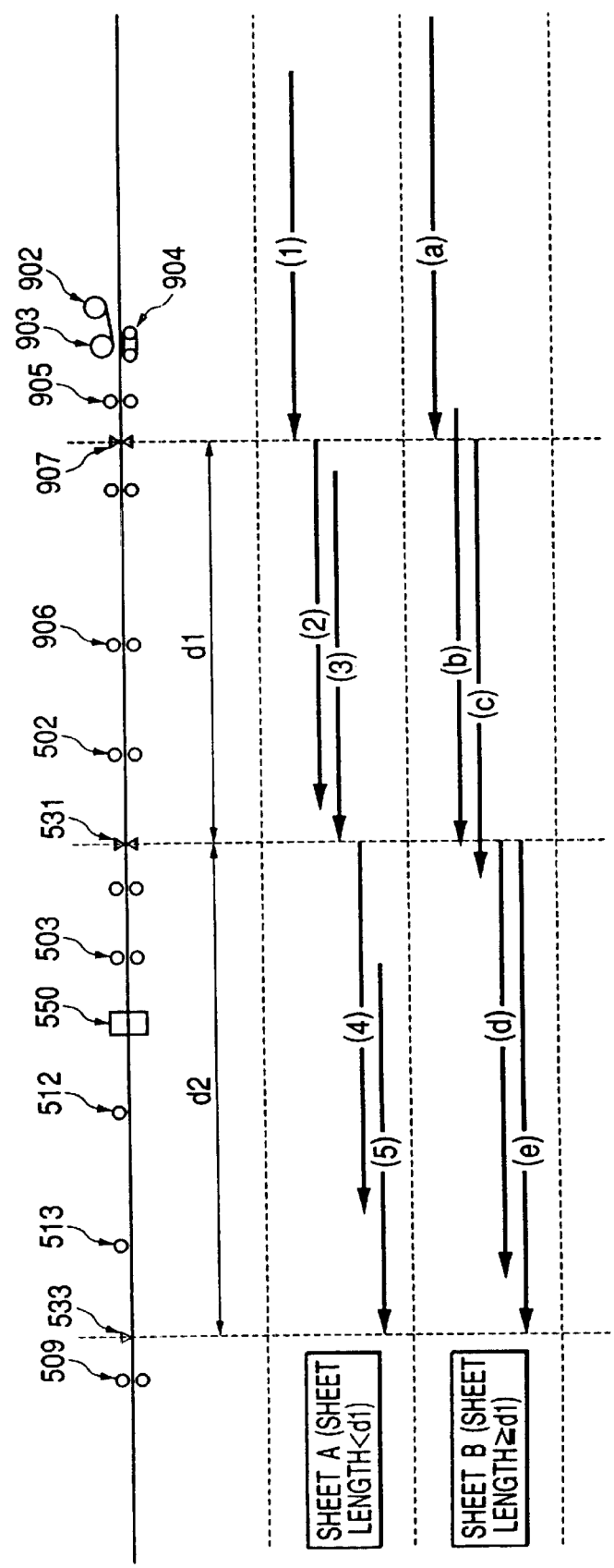
FIG. 30 is a diagram for explaining a sheet carrying (conveyance) situation from the inserter.

Next, jam detection in case of feeding the insert sheet from the inserter 900 and discharging the sheet to the nonsort tray (sample tray) 701 through the carrying (conveyance) path in the finisher 500 will be explained with reference to FIGS. 30 and 31. FIG. 30 is a diagram for explaining a sheet carrying situation from the inserter 900 to the nonsort tray 701. Also, FIG. 30 shows the expanded sheet carrying path through which the insert sheet is carried in the nonsort mode.

The sheet carrying path from the inserter 900 to the nonsort tray 701 will be explained with reference to FIG. 30 and FIG. 5. The sheet on the tray 901 of the inserter 900 is carried into the finisher 500 through the separation unit of the inserter 900 composed of the sheet feed roller 902, the carrying roller and the separation belt, the extraction roller 905, and the sheet feed sensor 907. The sheet is then discharged to the nonsort tray 701 through the carrying roller 906, the inlet rollers 502, the inlet sensor 531, the carrying roller 503, the punch unit 550, the push rollers 512 and 513, the sheet discharge sensor 533, and the sheet discharge roller 509. At this time, the jams such as a sheet delay jam, a sheet residence (or stay) jam and the like are detected by using the sheet feed sensor 907, the inlet sensor 531 and the sheet discharge sensor 533.

In FIG. 30, symbol d1 denotes a distance between the sheet feed sensor 907 and the inlet sensor 531, and symbol d2 denotes a distance between the inlet sensor 531 and the sheet discharge sensor 533. In the explanation of the present embodiment, a case where a sheet A of which carrying-direction (feed-direction) length (i.e., sheet length) is shorter than the distance D1 is carried from the tray 901 of the inserter 900 to the nonsort tray 701 is compared with a case where a sheet B of which carrying-direction length is equal to or longer than the distance D1 is carried from the tray 901 of the inserter 900 to the nonsort tray 701.

In FIG. 30, arrows (1), (2), (3), (4) and (5) together represent the sheet carrying situation of the sheet A (the sheet length<d1) from the inserter 900 in time series manner in due order. For example, the arrow (1) represents that the leading edge of the sheet A reaches the sheet feed sensor 907, the arrow (2) represents that the trailing edge of the sheet A passed the sheet feed sensor 907, the arrow (3) represents that the leading edge of the sheet A reaches the inlet sensor 531, the arrow (4) represents that the trailing edge of the sheet A passed the inlet sensor 531, and the arrow (5) represents that the leading edge of the sheet A reaches the sheet discharge sensor 533.

Similarly, arrows (a), (b), (c), (e) and (e) together represent the sheet carrying situation of the sheet B (the sheet length≧d1) from the inserter 900 in time series manner in due order. For example, the arrow (a) represents that the leading edge of the sheet B reaches the sheet feed sensor 907, the arrow (b) represents that the leading edge of the sheet B reaches the inlet sensor 531, the arrow (c) represents that the trailing edge of the sheet B passed the sheet feed sensor 907, the arrow (d) represents that the trailing edge of the sheet B passed the inlet sensor 531, and the arrow (e) represents that the leading edge of the sheet B reaches the sheet discharge sensor 533.

Check timing for the jam detection has been previously stored in the ROM 512 of the finisher control unit 501 shown in FIG. 6. Thus, jam occurrence is judged according to whether or not the sheet is positioned in each sensor at predetermined timing. When the jam occurs, a code (a jam code) by which the content of the jam is discriminable is transmitted from the finisher control unit 501 to the CPU circuit unit 150 on the side of the copying machine body through the communication IC 514'.

The inlet sensor 531 detects jams such as an inlet delay jam, an inlet residence jam and the like. The occurrence of the inlet delay jam is detected on the condition that, e.g., the inlet sensor 531 is not turned on for predetermined time after a sheet discharge signal of the copying machine body became on (i.e., the carried sheet does not reach the inlet sensor 531). At this time, the jam code "16" is transmitted to the copying machine body. On the other hand, the occurrence of the inlet residence jam is detected on the condition that, after the sheet was carried for a predetermined distance (e.g., the sheet length+100 mm), this sheet does not pass the inlet sensor 531 (i.e., the inlet sensor 531 is not turned off) after the inlet sensor 531 detected the sheet (i.e., the inlet sensor 531 is turned on). At this time, the jam code "26" is transmitted to the copying machine body.

The sheet discharge sensor 533 detects jams such as a nonsort delay jam, a nonsort residence jam and the like. The occurrence of the nonsort delay jam is detected on the condition that, after the inlet sensor 531 was turned on, the sheet discharge sensor 533 does not detect the sheet after this sheet was carried for a predetermined distance (e.g., 348 mm+150 mm). At this time, the jam code "18" is transmitted to the copying machine body. On the other hand, the occurrence of the nonsort residence jam is detected on the condition that, after the sheet discharge sensor 533 detected the sheet (i.e., the sensor 533 is turned on), this sheet does not pass the sensor 533 (i.e., the sensor 533 is not turned off) after this sheet was carried for a predetermined distance (e.g., the sheet length+100 mm). At this time, the jam code "28" is transmitted to the copying machine body.

The sheet feed sensor 907 detects jams such as a carrying delay jam, a carrying residence jam and the like. The occurrence of the carrying delay jam is detected on the condition that, e.g., after the sheet feed motor M20 of the inserter was turned on, the sheet feed sensor 907 is not turned on (i.e., the sheet does not reach the sheet feed sensor 907) before this sheet is carried for a predetermined distance (e.g., 600 mm). At this time, the jam code "1A" is transmitted to the copying machine body. On the other hand, the occurrence of the carrying residence jam is detected on the condition that, after the sheet feed sensor 907 detected the sheet (i.e., the sensor 907 is turned on), this sheet does not pass the sensor 907 (i.e., the sensor 907 is not turned off) after this sheet was carried for a predetermined distance (e.g., the sheet length+100 mm). At this time, the jam code "2A" is transmitted to the copying machine body.

When the delay and residence jams of the sheet are detected by the above various sensors such as the sheet feed sensor 907, the inlet sensor 531, the sheet discharge sensor 533 and the like, not-shown jam timers (hereinafter called a delay jam timer and a residence jam timer) for detecting the jams are used. For example, a timer value corresponding to the time necessary for carrying the sheet for a predetermined distance is set to the residence jam timer, and both the sensor and this residence jam timer are turned on. Then, when the time set by the residence jam timer is up, if the sensor is not off, such a situation is detected as the residence jam.

In the present embodiment, according as the sheet is set on the tray 901 of the inserter 900, the width-direction length (i.e., the length of the direction perpendicular to the sheet carrying direction) of the sheet set on the inserter 900 is detected. On the other hand, the length of the sheet feed direction (the sheet carrying direction) which is equivalent to the sheet length is detected while the sheet is being carried from the inserter 900. Namely, the length of the sheet carrying direction is detected by measuring a sheet feed quantity when the sheet passes the sheet feed sensor 907 (i.e., from the time when the leading edge of the sheet reaches the sensor 907 to the time when the trailing edge thereof passed the sensor 907) (see the steps S2403 to S3405 in FIG. 24).

The timer value to be set to the jam timer before the length of the sheet to be carried (i.e., the length of the sheet carrying direction (equivalent to the sheet length)) is determined is made differ from the timer value to be set to the jam timer after such the length was determined. This will be explained with reference to FIGS. 30 and 31.

FIG. 31 is a diagram for explaining the processing to be performed when the jam detection is performed to the sheet. In FIG. 31, the sheets A and B shown in FIG. 30 will be explained by way of example. In this case, it is assumed that relation of the lengths of the sheets A and B in the sheet carrying direction are A<d1≦B.

In a case where the sheet to be carried from the inserter 900 is the sheet A (the sheet length<d1), when the sheet A is in the state of the arrow (1) shown in FIG. 30 (i.e., the leading edge of the sheet A reaches the sheet feed sensor 907), the size detection of the sheet A in the sheet feed direction is started, and a value "max_length+stay_margin" is set as the timer value to the residence jam timer used in the residence jam detection by the sheet feed sensor 907. The value "max_length" represents a maximum length (corresponding to the sheet length in the sheet carrying direction) capable of being managed by the inserter 900 and corresponds to 432 mm in the present embodiment. This value is set not to needlessly detect the residence jam. The value "stay_margin" represents a detection margin for the residence jam detection and corresponds to 50 mm in the present embodiment. Further, it is assumed that the sheet capable of being managed by the inserter 900 is the sheet stackable on the tray 901 of the inserter and capable of being normally carried from the tray 901 to the sheet discharge tray (e.g., the tray 700, 701 or 832) through the inside of the finisher 500. Therefore, the sheet of which size is too larger than the size of the tray 901 of the inserter 900 and the sheet which can not be entered in the inlet to supply the sheet from the inserter 900 to the finisher 500 because its sheet size is too large are not managed by the inserter 900.

The jam detection method after then is as follows. For example, after the sheet feed sensor 907 was turned on, when the time necessary to carry the sheet by 432 mm+50 mm elapsed, if the sheet sensor 907 is not yet turned off (i.e., the trailing edge of the sheet does not pass the sheet feed sensor 907), it is judged that the carrying residence (or stay) jam occurs.

Subsequently, when the sheet A is in the state of the arrow (2) shown in FIG. 30 (i.e., the trailing edge of the sheet A passed the sheet feed sensor 907), the size of the sheet A is determined, and also the residence jam timer used in the residence jam detection by the sheet feed sensor 907 is cleared, as shown in FIG. 31. When the sheet A is in the state of the arrow (3) shown in FIG. 30 (i.e., the leading edge of the sheet A reaches the inlet sensor 531), a value "detect_length1+stay_margin" is set as the timer value to the residence jam timer used in the residence jam detection by the inlet sensor 531.

The value "detect_length" represents an actual length of the sheet A in the carrying direction (or feed direction) detected by measuring the sheet feed quantity when the sheet passes the sheet feed sensor 907, and corresponds to XA mm in the present embodiment. On the other hand, as described above, the value "stay_margin" represents the detection margin for the residence jam detection and corresponds to 50 mm in the present embodiment.

The jam detection method after then is as follows. For example, after the inlet sensor 531 was turned on, when the time necessary to carry the sheet by XA mm+50 mm elapsed, if the inlet sensor 531 is not yet turned off, it is judged that the inlet residence jam occurs.

Subsequently, when the sheet A is in the state of the arrow (4) shown in FIG. 30 (i.e., the trailing edge of the sheet A passed the inlet sensor 531), the residence jam timer used in the residence jam detection by the inlet sensor 531 is cleared. When the sheet A is in the state of the arrow (5) shown in FIG. 30 (i.e., the leading edge of the sheet A reaches the sheet discharge sensor 533), the value "detect_length1+stay_margin" is set as the timer value to the residence jam timer used in the residence jam detection by the sheet discharge sensor 533.

The jam detection method after then is as follows. For example, after the sheet discharge sensor 533 was turned on, when the time necessary to carry the sheet by XA mm+50 mm elapsed, if the sensor 533 is not yet turned off, it is judged that the nonsort residence jam occurs.

On the other hand, in a case where the sheet to be carried from the inserter 900 is the sheet B (the sheet length≧d1), when the sheet B is in the state of the arrow (a) shown in FIG. 30 (i.e., the leading edge of the sheet B reaches the sheet feed sensor 907), as shown in FIG. 31, the size detection of the sheet B in the sheet feed direction is started, and the value "max_length+stay_margin" is set as the timer value to the residence jam timer used in the residence jam detection by the sheet feed sensor 907. The value "max_length" represents the maximum length (corresponding to the sheet length in the sheet carrying direction) capable of being managed by the inserter 900 and corresponds to 432 mm in the present embodiment. The value "stay_margin" represents the detection margin for the residence jam detection and corresponds to 50 mm in the present embodiment.

The jam detection method after then is as follows. For example, after the sheet feed sensor 907 was turned on, when the time necessary to carry the sheet by 432 mm+50 mm elapsed, if the sheet sensor 907 is not yet turned off, it is judged that the carrying residence jam occurs.

Subsequently, when the sheet B is in the state of the arrow (b) shown in FIG. 30 (i.e., the leading edge of the sheet B reaches the inlet sensor 531), like the above, the value "max_length+stay_margin" is set as the timer value to the residence jam timer used in the residence jam detection by the inlet sensor 531.

In the sheet carrying direction, the length of the sheet B is longer than that of the sheet A, and the length of the sheet B is longer than the distance d1 from the sheet feed sensor 907 to the inlet sensor 531. Thus, in the state of the arrow (b) shown in FIG. 30, the sheet size (the sheet length in the sheet carrying direction) is not determined (i.e., the detection of the sheet length in the sheet feed direction by the sheet feed sensor 907 does not end). Therefore, the value which is to be set to the residence jam timer used in the residence jam detection by the inlet sensor 531 is set to be a value corresponding to a maximum size which can be managed by the inserter 900, so as not to needlessly detect the residence jam.

The jam detection method after then is as follows. For example, after the inlet sensor 531 was turned on, when the time necessary to carry the sheet by 432 mm+50 mm elapsed, if the inlet sensor 531 is not yet turned off, it is judged that the inlet residence jam occurs.

Subsequently, when the sheet B is in the state of the arrow (c) shown in FIG. 30 (i.e., the trailing edge of the sheet B passed the sheet feed sensor 907), as shown in FIG. 31, the size of the sheet B is determined, and the residence jam timer used in the residence jam detection by the sheet feed sensor 907 is cleared. When the sheet B is in the state of the arrow (d) shown in FIG. 30 (i.e., the trailing edge of the sheet B passed the inlet sensor 531), the residence jam timer used in the residence jam detection by the inlet sensor 531 is cleared. When the sheet B is in the state of the arrow (e) shown in FIG. 30 (i.e., the leading edge of the sheet B reaches the sheet discharge sensor 533), a value "detect_length2+stay_margin" is set as the timer value to the residence jam timer used in the residence jam detection by the sheet discharge sensor 533.

The value "detect_length2" represents an actual length of the sheet B in the carrying direction (or feed direction) detected by measuring the sheet feed quantity when the sheet passes the sheet feed sensor 907, and corresponds to XB mm in the present embodiment.

The jam detection method after then is as follows. For example, after the sheet discharge sensor 533 was turned on, when the time necessary to carry the sheet by XB mm+50 mm elapsed, if the sheet discharge sensor 533 is not yet turned off, it is judged that the nonsort residence jam occurs.

Hereinafter, the timer values to be set to the residence jam timers in the sheet feed sensor 907, the inlet sensor 531 and the sheet discharge sensor 533 will be explained. As described above, since the residence jam is detected by the residence jam timer in each sensor, the residence jam detection is performed three times in the present embodiment. When the leading edge of the sheet reaches the sheet feed sensor 907, second detection of the residence jam is started, and when the leading edge of the sheet reaches the sheet discharge sensor 533, third detection of the residence jam is started.

As shown in FIGS. 30 and 31, in the case where the sheet to be carried is the sheet A, when the residence jam is detected by the sheet feed sensor 907, the value to be set to the residence jam timer is set to be the value corresponding to the maximum (longest) size (i.e., 432 mm in the present embodiment) capable of being managed by the inserter 900, so as not to needlessly detect the residence jam. Next, when the residence jam is detected by the inlet sensor 531, the trailing edge of the sheet has already passed the sheet feed sensor 907. Namely, since measurement (count) processing (or operation) to the sheet feed quantity when the sheet passes the sheet feed sensor 907 ended (see the steps S2403 to S2405 in FIG. 24) and thus the sheet size (the sheet length in the sheet carrying direction in the present embodiment) has been detected (determined), the timer value of the residence jam timer in the inlet sensor 531 is adjusted to the sheet size actually detected. Next, even in the residence jam detection by the sheet discharge sensor 533, like the above, the timer value is adjusted to the sheet size actually detected. Thus, after the sheet size was determined, the value which is adjusted to the actual sheet size is used.

On the other hand, in the case where the sheet to be carried is the sheet B, when the residence jam is detected by the sheet feed sensor 907, the timer value of the residence jam timer is set to be the value corresponding to the maximum (longest) size (i.e., 432 mm in the present embodiment) capable of being managed by the inserter 900, so as not to needlessly detect the residence jam. Next, when the residence jam is detected by the inlet sensor 531, unlike the sheet A, the trailing edge of the sheet B does not yet pass the sheet feed sensor 907. Namely, since the sheet length in the sheet carrying direction is not yet detected (determined), the timer value of the residence jam timer in the inlet sensor 531 is set to be the value corresponding to the maximum (longest) size (i.e., 432 mm in the present embodiment) capable of being managed by the inserter 900 so as not to needlessly detect the residence jam. Next, when the residence jam is detected by the sheet discharge sensor 533, the trailing edge of the sheet has passed the sheet feed sensor 907. Namely, since the measurement (count) processing to the sheet feed quantity when the sheet passes the sheet feed sensor 907 ended and thus the sheet length in the sheet carrying direction has been detected (determined), the timer value of the residence jam timer in the sheet discharge sensor 533 is adjusted to the sheet size actually detected. As described above, when the sheet size is determined after the residence jam detection was started, the timer value of the residence jam timer is adjusted to the actual sheet size from the next residence jam detection.

In the present embodiment, the case of the nonsort mode was described with reference to FIG. 30. However, the present embodiment is applicable to the sort mode or the bookbinding mode. Further, programs to realize the processing in each flow chart and the various processing (functions) including the processing explained with reference to FIGS. 30 and 31 are stored as program codes in the ROM 512 of the finisher control unit 501, whereby the CPU 511 of the finisher control unit can read the stored program codes and execute the functions thereof. Further, the program codes can be stored in the ROM 151 of the CPU circuit unit 150 on the side of the image formation apparatus body such that a CPU (not shown) of the CPU circuit unit 150 reads them and executes the functions thereof.

Further, in the present embodiment, since the sheet managed by the inserter 900 is the value-added specific sheet (e.g., a sheet on which a photographic image was formed, a cover of a catalog, a coated (or slick) sheet, a colored sheet, or the like), the sheet carried from the inserter 900 was emphatically explained. However, of course, the above processing is applicable to the sheet carried from the side of the image formation apparatus body.

For example, a not-shown sensor which is the same as the sensor 907 capable of detecting the sheet length in the carrying direction is provided on the sheet carrying path through which the sheet image-formed by the printer unit 300 is carried, and the size of the carried sheet is calculated based on sheet detection information from this sensor. In this example, it is controlled to define standard values used for the sheet jam detection respectively before and after acquirement of sheet size information generated based on the sheet detection information from the above sensor. Further, before the sheet size information generated based on the information from the above sheet sensor is acquired, a maximum value according to the maximum size of the sheet capable of being carried by the system is set as the standard value for the sheet jam detection. Then the sheet jam detection is actually performed by using this standard value. Accordingly, as the sheet size information is acquired, a value according to the acquired sheet size information is set as the standard value for the sheet jam detection, and it is controlled to perform the sheet jam detection by using the set standard value. The above processing is possible in this example. However, this example has a following exception. Namely, when the acquired sheet size is the same as the maximum size of the sheet capable of being managed by the apparatus (i.e., the sheet actually carried is the maximum-sized sheet), the standard value for the sheet jam detection before the sheet size determination is conformed with that after the sheet size determination. By the way, in consideration of costs, it is possible to provide one sensor on the sheet carrying path through the sheet from the side of the image formation apparatus body and the sheet from the inserter are carried, so as to detect both the sheets only by this sensor.

As above, in the present embodiment, the sizes (the sheet lengths in the carrying direction) of the sheets including the sheet from the inserter 900 and the sheet from the side of the image formation apparatus body are detected during the sheet carrying operation. Further, the sheet size information is directly acquired by using the sheet carrying operation, the timer value to be set to the residence jam timer for sheet residence detection before the sheet size determination is made differ from the timer value after the sheet size determination. Further, the timer value of the residence jam timer in each sensor 531 is set to be the value corresponding to the maximum (longest) size (432 mm in the present embodiment) capable of being managed by the inserter 900 (the finisher 500, the printer unit 300, the entire system or the like) so as not to needlessly detect the residence jam until the sheet size is determined. Next, accordingly as the sheet size is determined, the timer value is set to be the value corresponding to the actual sheet size.

Thus, it is possible to prevent erroneous detection of the sheet residence jam without decreasing productivity. Further, it is possible to prevent inconvenience which conventionally occurs when the size of the sheet set on the tray 901 of the inserter 900 is different from the size of the sheet set from the operation unit 1 by the user. Thus, even if the user performs erroneous setting to the sheet, it is possible to reuse the sheet without inappropriate processing, thereby improving operability.

For example, when "A4" (the sheet length in the carrying direction is 210 mm) is erroneously set as the sheet size for the inserter from the operation unit 1 by the user though the size of the sheet actually set on the tray 901 of the inserter 900 is "A3" (the sheet length in the carrying direction is 420 mm), the value (e.g., 210 mm +50 mm) which is obtained by adding the residence jam detection margin (e.g., 50 mm) to the size (e.g., 210 mm) set by the user is set as the timer value to the residence jam timer. Thus, it is possible to prevent the inconvenience that, though the sheet is normally carried from the inserter 900, the time set by the residence jam timer is up while the sheet is passing the jam detection sensor (e.g., the sheet feed sensor 907) (i.e., the time is up when the sheet is at the position far from the sensor 907 by 210 mm+50 mm), whereby the finisher control unit 501 erroneously detects the residence jam occurrence, thus stops the sheet carrying operation, and then transmits erroneous information to the side of the copying machine body. Further, for example, the present embodiment is effective in a case where the size of the sheet set on the inserter 900 is a size of an irregular sheet incapable of being selected by the operation unit 1.

Further, even in a case where it is impossible on the side of the copying machine body to confirm or know that the sheet of what feed length (i.e., the sheet length in the carrying direction) is carried from the inserter 900, it is possible to accurately perform the jam detection. Further, since the residence jam is not needlessly detected, it is possible to reduce extra time and labor to the user and also prevent the increase of cost.

For example, since the sheet carrying operation is stopped when the jam is detected, the user has to perform a sheet elimination working (a working to eliminate the sheet stopped inside the apparatus). Thus, if the sheet tears or becomes dirty in the sheet elimination working, the user has to prepare the identical sheet again. Therefore, as the residence jam is needlessly detected, the number of user's sheet elimination workings increases, whereby the possibility that sheet's damage and dirt occur in the sheet elimination working increases. The present embodiment intends not to needlessly detect the residence jam in order to eliminate such problems as above.

Further, the possibility that the sheet managed by the inserter 900 is the value-added specific sheet (e.g., the sheet on which the photographic image was formed, the cover of the catalog, the coated sheet, the colored sheet, or the like) is high, and also the possibility that the sheet managed by the inserter 900 is a sheet (e.g., a color output sheet) incapable of being managed by the currently used copying machine (e.g., a black-and-white copying machine) is high. Thus, the present embodiment is farther effective in these cases.

The timer value of the residence jam timer is set to be the value corresponding to the maximum size (432 mm in the present embodiment) capable of being managed by the inserter 900 until the sheet size (in the sheet carrying direction) is determined. However, in order to compensate for the sheet of which size is very much shorter than the above maximum size, as previously described, in addition to the residence jam detection in each sensor, the delay jam detection is performed in each sensor (the sheet feed sensor 907, the inlet sensor 531 and the sheet discharge sensor 533) by using the delay jam timer in the present embodiment. Then, in consideration of the sheet of which size is very much shorter than the above maximum size, the jam margin (100 mm in FIG. 31) by which the jam is detected in the delay jam detection is previously determined before the jam is detected in the residence jam detection, and the timer value to be set to the delay jam timer is set based on the determined jam margin. Thus, it is possible to prevent the inconvenience that quality of the sheet is degraded because the actual residence jam detection to the sheet of which size is very much shorter than the above maximum size is delayed.

As explained above, in the present embodiment, it is controlled to start the sheet carrying before the sheet size detection by the sensor, and also it is controlled to make the condition (the standard value) of judging whether or not the sheet jam occurs differ before and after the determination of the sheet size calculated according to the sheet detection result from the sensor, whereby it is possible to prevent erroneous jam detection without decreasing productivity. Further, it is possible to prevent inconvenience which conventionally occurs when the size of the sheet actually set is different from the size of the sheet set from the operation unit by the user. Further, it is possible to reduce extra time and labor to the user and also prevent the increase of cost. Thus, even if the user performs the erroneous setting to the sheet, it is possible to reuse the sheet without inappropriate processing, thereby improving operability.

In the above embodiment, the countermeasures which concern the sheet jam detection were explained as one idea by which the inconvenience occurring when the operator erroneously designates the size different from the actual sheet size is prevented beforehand. Furthermore, another embodiment of the present invention will be explained hereinafter.

Figure 32:
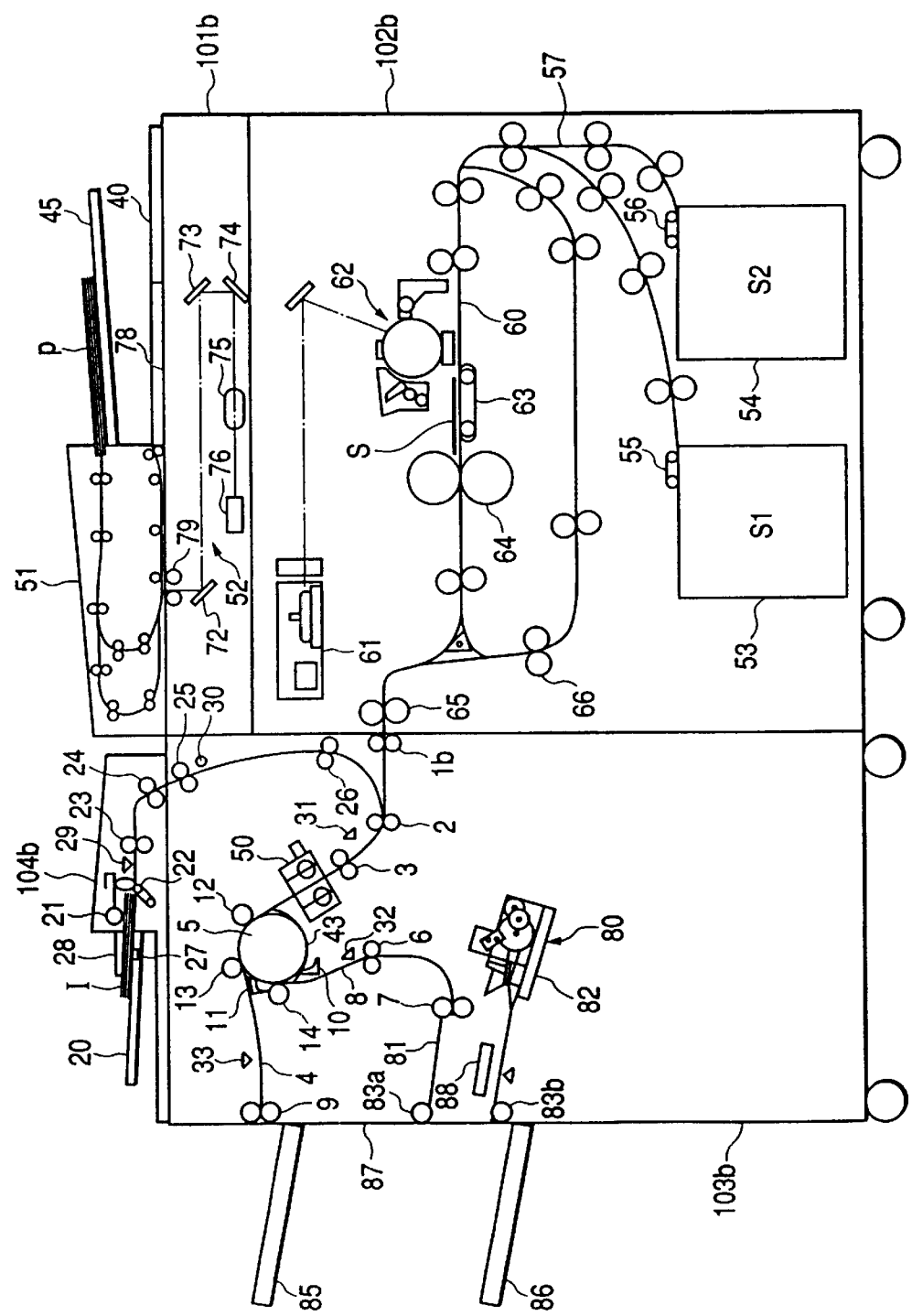
FIG. 32 is a sectional view showing an entire structure of an image formation system to which a sheet processing apparatus of the embodiment is applied.

FIG. 32 is a sectional view showing an entire structure of an image formation system to which a sheet processing apparatus of the present embodiment is applied.

The image formation system is composed of a read sheet feed apparatus 101*b*, an image formation apparatus 102*b* and a sheet processing apparatus 103*b*.

The read sheet feed apparatus 101*b* is composed of an ADF (automatic document feeder) 51 which feeds a set original p up to a reading position on an original mounting board glass 78 and then carries (or conveys) the original p up to a sheet discharge position, a lamp 79 which irradiates the original p fed to the reading position, a CCD line sensor (simply called a CCD hereinafter) 76 which detects an image of the original, reflection mirrors 72, 73 and 74 which guide reflection light from the original p into the CCD 76, an optical system 52 which includes a lens 75 for condensing the original image on the CCD 76, and the like.

The image formation apparatus 102*b* contains recording sheet storage units 53 and 54 on which different-sized recording sheets (S1 and S2) are stacked respectively, and recording sheet feed units 55 and 56 which respectively feed the recording sheets. The recording sheet fed by the recording sheet feed unit 55 or 56 is carried to a sheet carrying (or conveyance) path 60 through a sheet carrying path 57. Numeral 61 denotes a laser scanner which performs laser beam scanning based on image information read by the optical system 52 and forms a latent image (i.e., a toner image) on a photosensitive body of an image formation unit 62.

Numeral 62 denotes the image formation unit which transfers the toner image on the photosensitive body to a recording sheet S. The recording sheet S on which the image was formed by the image formation unit 62 is carried to the carrying path of the sheet processing apparatus 103*b* through a carrying belt 63, a pair of fixing rollers (simply called a fixing roller) 64 and a pair of carrying rollers (simply called a carrying roller) 65. The fixing roller 64 softens and melts the toner image, whereby the toner image is fixed to the sheet S.

Numeral 40 denotes an operation unit which is used to perform operation setting of the image formation apparatus 102*b* and the sheet processing apparatus 103*b* and to confirm the set contents. The operation unit 40 is composed of a display unit by which the user confirms the set contents, a touch panel key which is overlaid on the display unit and used to perform detailed setting for an image formation operation and operation setting for the sheet processing apparatus 103*b*, numeric keys which are used to set numerals, e.g., the number of copies and the like, a stop key which is used to stop the image formation operation, a reset key which is used to return current setting to initial setting, a start key which is used to start the image formation operation, and the like.

Numeral 103*b* denotes the sheet processing apparatus (referred to as a finisher hereinafter). The finisher 103*b* contains a pair of inlet rollers (simply called an inlet roller) 1*b* through which the sheet S is carried from the image formation apparatus 102*b*, and an inserter 104*b*. The inserter 104*b* is used to perform insert processing (or operation).

The insert processing is the processing to feed a sheet I (called an insert sheet I hereinafter) set on a tray 20 of the inserter 104*b* to either a sample tray 85 or a stack tray 86 without passing it through the image formation apparatus 102*b*, and insert the insert sheet I between the successive sheets carried from the image formation apparatus 102*b* into the finisher 103*b*.

An insert sheet sensor 27 is the sensor to detect whether or not the insert sheet I is set on the tray 20. On the tray 20 of the inserter 104*b*, a pair of width-direction regulator boards 28 is slidably disposed in the width direction of the insert sheet I to regulate the width direction of the insert sheet I on the tray 20, thereby stabilizing the insert sheet I when the sheet I is fed and carried.

Figure 33:
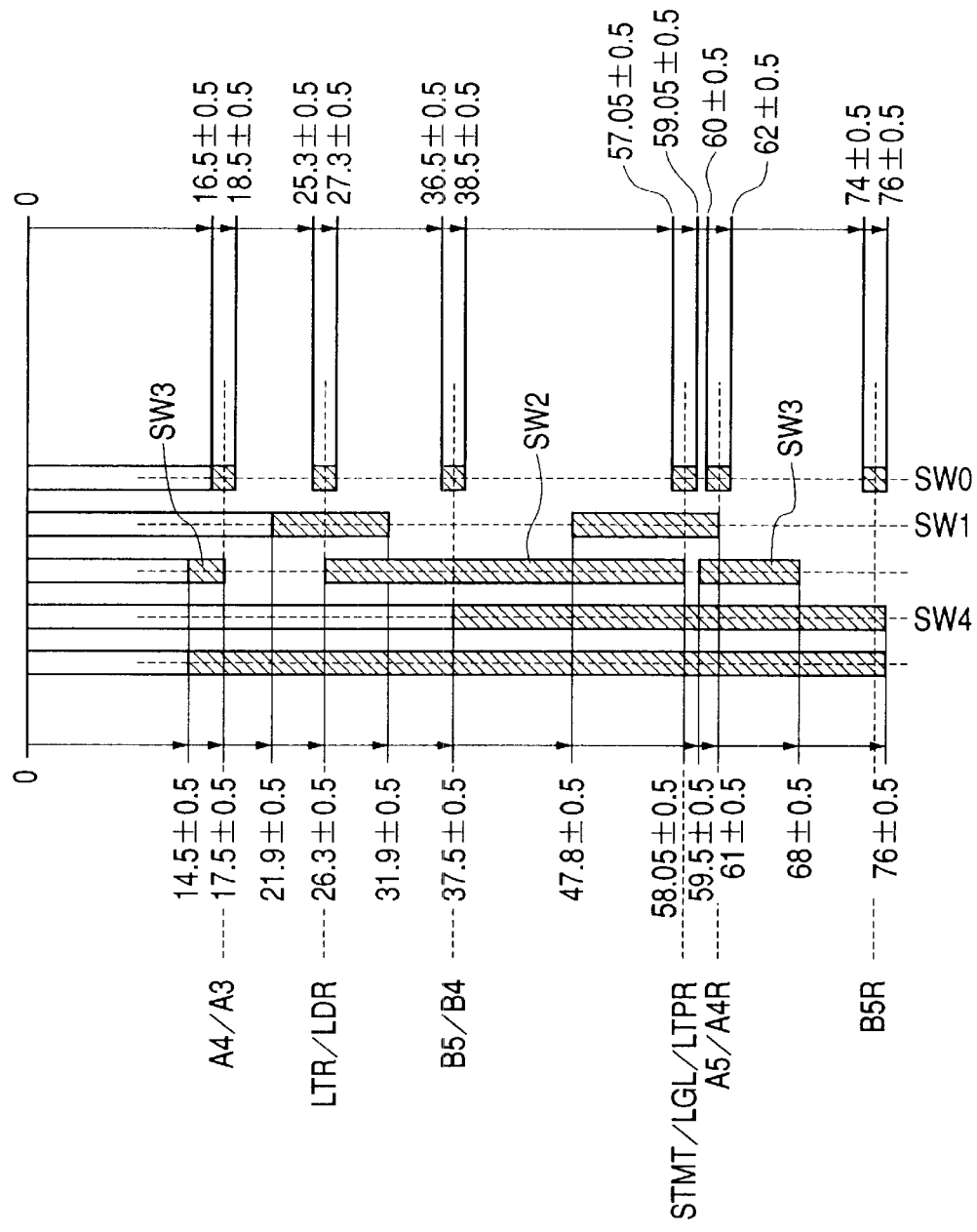
FIG. 33 is a diagram showing inner slide switches which are on and off by movement of a pair of width-direction regulator boards.

FIG. 33 is a diagram showing inner slide switches which are on and off by movement of the pair of width-direction regulator boards 28. By moving the pair of width-direction regulator boards 28, the four inner slide switches are on and off on five lines respectively, and values of slide switches SW0, SW1, SW2, SW3 and SW4 are added, whereby the user can discriminate width-direction sizes of the insert sheets as shown in FIG. 34. FIG. 34 is a table showing width-direction size information of the insert sheets determined by the slide switches SW0 to SW4. For example, when only the slide switches SW0 and SW3 are "1", the size information represents "A4/A3".

An inserter sheet feed sensor 29 and an inserter sheet sensor 30 are used to detect the insert sheet I being carried and a carrying state of the insert sheet I respectively. These sensors 29 and 30 are used also to detect the length of the insert sheet I in the carrying direction.

The insert sheets I set on the tray 20 of the inserter 104*b* are sequentially fed from uppermost one by a sheet feed roller 21 and separation rollers 22. Here, the sheet feed roller 21 is tiltable by a solenoid (not shown), the upper one of the separation rollers 22 is rotated in the sheet carrying direction, and the lower one of the separation rollers 22 is rotated in the direction opposite to the sheet carrying direction. The inserter sheet feed sensor 29 confirms a feed of the insert sheet I by detecting the leading edge of the fed insert sheet I. Then the insert sheet I is sequentially carried by pairs of carrying rollers (simply called carrying rollers) 23, 24 and 25.

When the leading edge of the insert sheet I is detected by the inserter sheet sensor 30, then count of clock pulses (or insert carrying clock pulses) which are used to drive an insert carrying driving motor (not shown) for rotating the insert sheet carrying rollers 23, 24, 25 and 26 is started. When it is detected by the inserter sheet feed sensor 29 that the trailing edge of the insert sheet I passed, the count of the insert carrying clocks, and the measurement of the carrying-direction length of the insert sheet I ends. Thus the carrying-direction length of the insert sheet I is detected by the count value and the distance between the inserter sheet sensor 30 and the inserter sheet feed sensor 29. Then the insert sheet I is carried to a pair of carrying rollers (simply called a carrying roller) 2 by the carrying roller 26

When the insert sheet I is set faceup on the tray of the inserter 104*b* by the user, the insert sheets I are sequentially fed from uppermost one by the sheet feed roller 21 and the separation rollers 22. Since the insert sheet I from the inserter 104*b* is carried to the sample tray 85 or the stack tray 86 through the carrying rollers 23, 24, 25 and 26 as it is, the sheet I is discharged facedown.

Further, the plural originals p are set faceup on an original stack tray 45 by the user. The read sheet feed apparatus 101*b* sequentially reads the originals p from the uppermost one.

When the recording sheet subjected to the image formation by the image formation apparatus 102*b* is fed facedown to the finisher 103*b*, the sheet is once carried to the side of a pair of carrying rollers (simply called a carrying roller) 66, and the sheet is then switched back (or returned) to the finisher 103*b*. Conversely, when the recording sheet is fed faceup to the finisher 103*b*, the sheet is not carried to the side of the carrying roller 66 but is fed to the finisher 103*b* as it is.

Namely, when the insert processing is performed by using the inserter 104*b*, the sheet is switched back on the side of the image formation apparatus 102*b* and then carried facedown to the finisher 103*b*. On the side of the finisher 103*b*, the sheet is discharged facedown to the sample tray 85 or the stack tray 86 as it is. Thus, the face of the insert sheet I from the inserter 104*b* can be conformed with the face of the sheet S from the image formation apparatus 102*b*.

Numerals 2 and 3 denote the carrying rollers which carry the sheet S or the insert sheet I. Numeral 31 denotes a sheet sensor which detects passage of the sheet S or the insert sheet I on the inlet size. Numeral 50 denotes a punch unit which punches the vicinity of the trailing edge of the sheet S or the insert sheet I carried.

Numeral 5 denotes a roller (hereinafter called a buffer roller) of which diameter is relatively large and which is disposed on the way of the carrying path. The sheet is pressed to the face of the buffer roller 5 and carried by push rollers 12, 13 and 14 disposed around it.

Numeral 11 denotes a first change flapper which selectively changes or switches a nonsort path 4 and a sort path 8. Numeral 10 denotes a second change flapper which changes or switches a buffer path 43 used to temporarily store the sheet S or the insert sheet I and the sort path 8. Numeral 33 denotes a sheet sensor which detects the sheet in the nonsort path 4, and numeral 32 denotes a sheet sensor which detects the sheet in the sort path 8. Numeral 6 denotes a pair of carrying paths (simply called a carrying path) which are disposed in the sort pat 8.

Numeral 84 denotes a processing tray unit which includes an intermediate tray (called a processing tray) 82 and an alignment board 88. The processing tray 82 temporarily accumulates the sheets, aligns or jogs the sheets S or the insert sheets I accumulated to be subjected to stapling processing (or operation) by a stapling unit 80. The alignment board 88 is used to align or jog the sheets S or the insert sheets I stacked on the processing tray 82.

On the output side of this processing tray 82, one of sheaf discharge rollers (a fixed-side discharge roller 83*b*) is disposed. Numeral 7 denotes a pair of first discharge rollers (simply called a first discharge roller) which are disposed in the sort path 8 and to discharge the sheet S or the insert sheet I onto the processing tray 82. Numeral 9 denotes a pair of second discharge rollers (simply called a second discharge roller) which are disposed in the nonsort path 4 and to discharge the sheet S or the insert sheet I onto the sample tray (a first stack tray) 85.

Numeral 83*a* denotes an upper discharge roller which is supported by a swing guide 81. When the swing guide 81 comes to a closing position, the upper discharge roller 83*a* pressingly comes into contact with the lower discharge roller 83*b* to discharge the sheets S or the insert sheets I on the processing tray 82 onto the stack tray (a second stack tray) 86 as the sheaf. Numeral 87 denotes a sheaf stack guide which bumpingly supports the trailing edge end of the sheaf of sheets (i.e., the trailing edge end along the sheaf discharge direction) stacked on the stack tray 86 or the sample tray 85. The sheaf stack guide 87 also acts as the case of the sheet processing apparatus 103*b*.

Figure 40A:
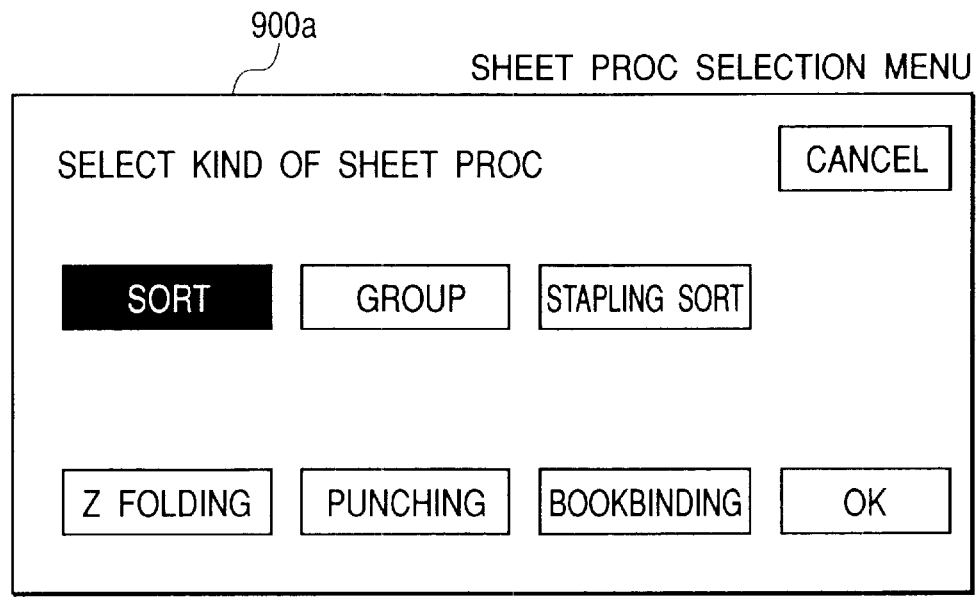
FIGS. 40A and 40B are diagrams showing example of screens displayed on an operation panel of an operation unit.
Figure 40B:
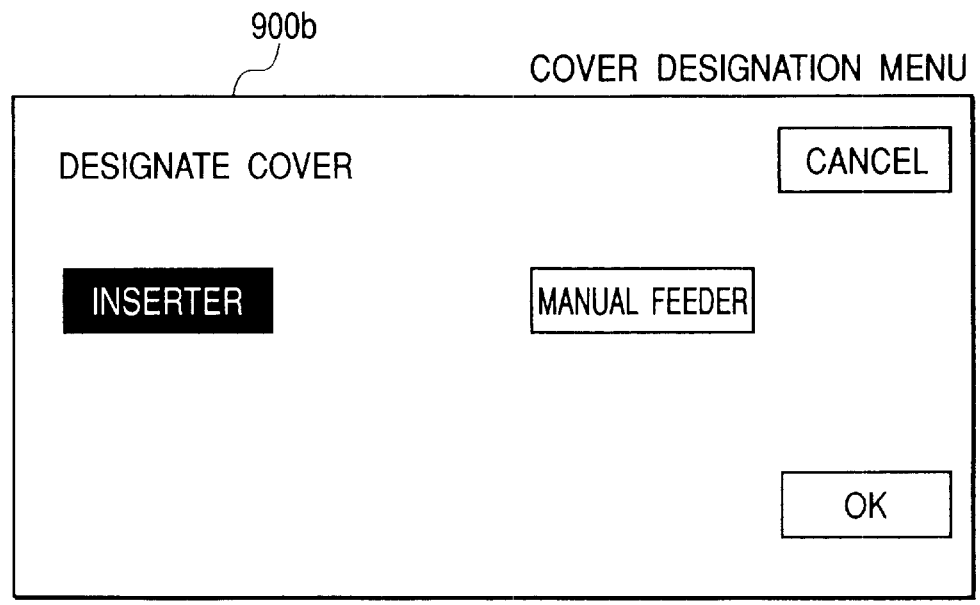

In the image formation system which has such the structure as above, the original is set to the ADF 51 of the read sheet feed apparatus 101b, the user's desired setting is performed from the operation unit 40 to set the operation start, whereby the image formation operation is started. The operation unit 40 includes an operation panel 4210 (FIG. 45) for displaying such screens as shown in FIGS. 40A and 40B. For example, accordingly as an application mode key 4180 on the screen of the operation panel 4210 is depressed by the user, a screen 900a shown in FIG. 40A is displayed on the operation panel 4210. The screen 900a is the sheet processing selection menu screen on which the user can set a desired operation mode. Further, a screen 900b shown in FIG. 40B is the cover designation menu screen. When the user intends to set a mode using the inserter (called an inserter mode), he may depress an "INSERTER" button on the screen 900b. Then, accordingly as the "INSERTER" button is depressed by the user, the screen 900b is changed to an inserter sheet size selection screen (not shown), and a sheet size for the inserter is input on this inserter sheet size selection screen by the user. The information (e.g., the screens 900a and 900b) which is input on the operation unit 40 by the user is all input to a controller circuit unit 200b through an operation unit control unit 201b (FIG. 35).

When the image formation operation is started, the original is read by the read sheet feed apparatus 101b. At the same time, the feed of the recording sheet from the set recording sheet storage unit 53 or 54 is started, and the sheet is carried to the image formation unit 62 through the sheet carrying path. Then the toner image which was formed based on the image information read by the read sheet feed apparatus 101b is transferred to the fed sheet, and the transferred toner image is fixed to the sheet through the fixing unit. On the other hand, the insert sheet is fed and carried by the sheet processing apparatus 103b, the carried sheet is subjected to punch processing (or operation), sheet sort (in the sort mode), stapling processing (or operation) (in a stapling sort mode) and the like according to the operation mode set on the operation unit 40 by the user, and the processed sheet is discharged.

Figure 35:
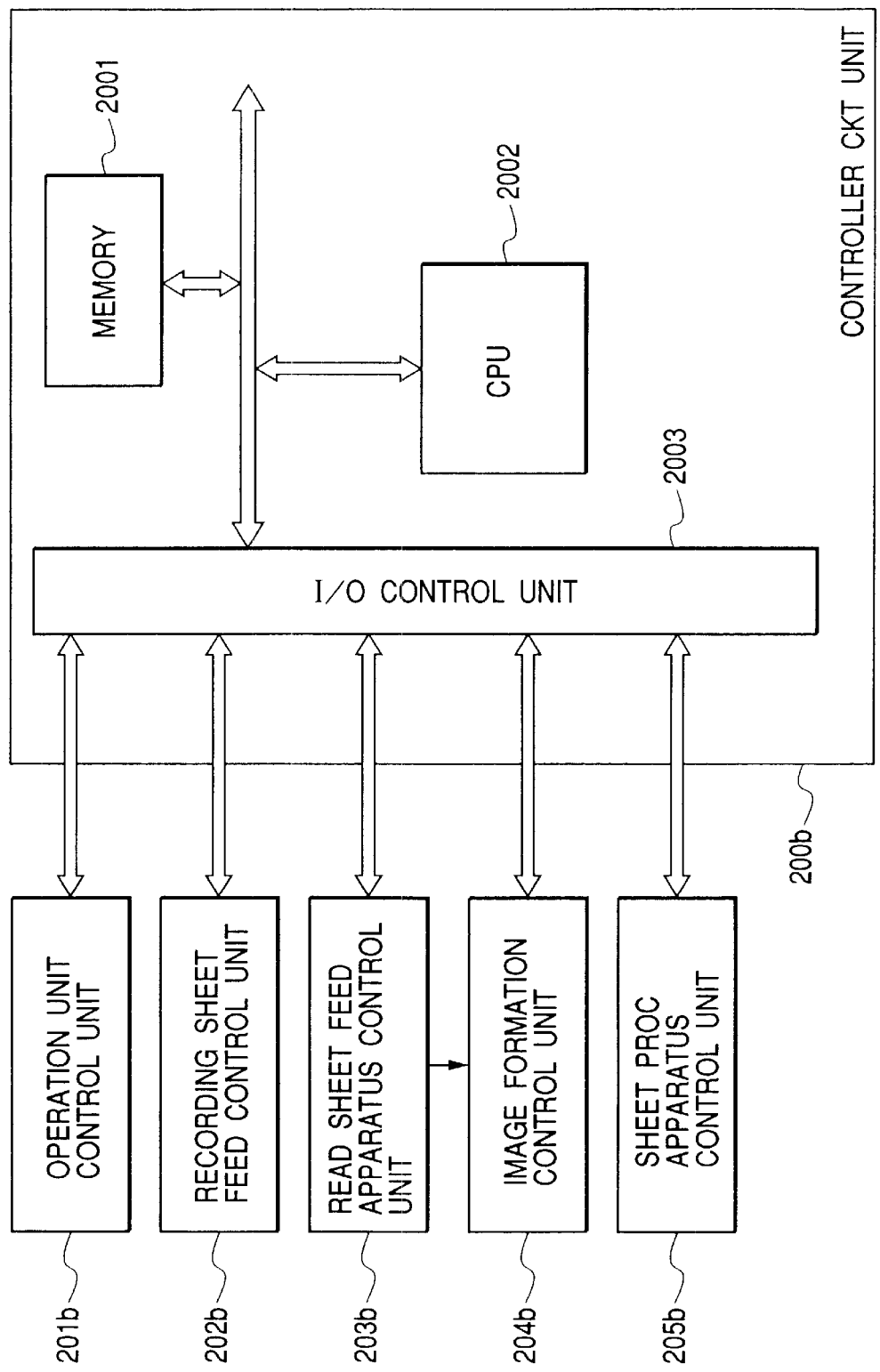
FIG. 35 is a block diagram showing a structure of a control unit in the image formation system.

FIG. 35 is a block diagram showing the structure of the control unit in the image formation system according to the present embodiment. The controller circuit unit 200b is composed of a CPU 2002, a memory 2001, an I/O control unit 2003 and the like. The CPU 2002 performs calculation according to a predetermined program to entirely control the controller circuit unit 200b. The memory 2001 which includes a RAM, a ROM, an IC card, a floppy disk and the like to store programs and predetermined data reads and writes the program and the data. The I/O control unit 2003 transmits and controls input and output signals. Various loads such as a motor, a clutch and the like for controlling the image formation apparatus 102b, a sensor for detecting a sheet position, and the like are connected to an I/O port (e.g., the various loads and sensors shown in FIG. 6 are connected to the I/O port).

The operation unit control unit 201b, a recording sheet feed control unit 202b, a read sheet feed apparatus control unit 203b, an image formation control unit 204b, and a sheet processing apparatus control unit 205b are connected to the I/O control unit 2003.

The memory 2001 and the I/O control unit 2003 are controlled in response to a control signal from the CPU 2002. Further, the controller circuit unit 200b operates the operation unit control unit 201b, the recording sheet feed control unit 202b, the read sheet feed apparatus control unit 203b, the image formation control unit 204b and the sheet processing apparatus control unit 205b through the I/O control unit 2003.

In the image formation system which has such the structure as above, when the user sets the original to the ADF 51 of the read sheet feed apparatus 101b, performs the setting of the operation mode on the operation unit 40 of the image formation apparatus, and instructs to start the copying, then the ADF 51 feeds the original one by one to the reading position on the original mounting board glass 78 and reads the original by using the optical system 52.

The original image exposed by the CCD 76 is photoelectrically converted, and the thus obtained image signal is read. After the various image processing was performed to the read image signal according to the setting from the operation unit 40, the image signal is converted into a light signal to exposure the photosensitive body. Then the image is formed on the sheet S through electrification, exposure, latent image formation, development, transfer, separation and fixing steps in ordinary electrophotographic processing (or operation), and the sheet S on which the image was formed is carried to the carrying path of the sheet processing apparatus 103b by the carrying belt 63 and the carrying roller 65 through the inlet roller 1b. The sheet processing apparatus 103b is controlled by the controller circuit unit 200b in accordance with the setting from the operation unit 40. The sheet S discharged from the image formation apparatus 102b is transferred to the sheet processing apparatus 103b.

When the sheet feed from the inserter is selected on the operation unit 40, the controller circuit unit 200b operates the sheet processing apparatus control unit 205b, and lowers the sheet feed roller 21 by operating the solenoid (not shown) to contact it with uppermost one of the insert sheets I set on the tray 20. Then the controller circuit unit 200b feeds the insert sheet I from the tray 20 by driving an inserter sheet feed driving motor, an inserter separation driving motor and an inserter carrying driving motor (all not shown).

The insert sheet I passed the separation unit is detected by the insert sheet feed sensor 29 and then cramped and carried by the carrying roller 23. When the insert sheet I is carried by the carrying roller 23, the sheet feed roller 21 is lifted up, and the driving of the separation roller is stopped. Since the separation roller 22 is the one-way roller, this roller 22 is attractingly rotated according to the movement of the carried insert sheet I.

When the leading edge of the insert sheet I is detected by the inserter sheet sensor 30, the controller circuit unit 200b starts counting clock pulses used to drive an insert sheet carrying driving motor (not shown) rotating the insert sheet carrying rollers 23, 24, 25 and 26. When the inserter sheet feed sensor 29 detects that the trailing edge of the insert sheet I passed, the controller circuit unit 200b stops counting the insert carrying clocks and calculates the length of the insert sheet I in the carrying direction on the basis of the number of counted pulses and the distance between the inserter sheet sensor 30 and the inserter sheet feed sensor 29. When it is assumed that the number of counted pulses is P, a movement quantity of the insert sheet for one pulse is X, and the distance between the inserter sheet sensor 30 and the inserter sheet feed sensor 29 is L, the length of the insert sheet I in the carrying direction is calculated by P×X+L.

The controller circuit unit 200b compares the carrying-direction length calculated (or detected) with a carrying-direction length (a sheet size) of the insert sheet I input when the insert mode is previously set on the operation unit 40 by the user. When it is judged that the detected carrying-direction length is different from the carrying-direction length of the insert sheet I previously input by the user, the controller circuit unit 200b changes the setting such that the punch processing is not performed irrespective of the operation mode set on the operation unit 40 by the user, and further changes the setting such that the insert sheet I is discharged onto the sample tray 85.

When it is judged that the detected carrying-direction length is identical with the input carrying-direction length and the mode to perform the punch processing is set on the operation unit 40 by the user, the controller circuit unit 200*b* operates the sheet processing apparatus control unit 205*b* to drive a punch driving motor (not shown) being a driving source of the punch unit 50. Thus a punch roller in the punch unit 50 is rotated once to punch out the sheet S or the insert sheet I.

The controller circuit unit 200*b* operates the sheet processing apparatus control unit 205*b* to drive the carrying flapper 11, whereby the carrying path is changed or switched. When the sheet is stacked on the sample tray 85, the sheet S or the insert sheet I is discharged through the discharge roller 9. On the other hand, when the sheet is stacked on the stack tray 86, the sheet S or the insert sheet I is carried by the discharge rollers 6 and 7 and once discharged onto the processing tray 82.

When the stapling processing mode is selected on the operation unit 40, the controller circuit unit 200*b* operates the sheet processing apparatus control unit 205*b* to drive the stapling unit 80, whereby the stapling processing is performed to the sheaf of sheets stacked on the processing tray 82. Further, the controller circuit unit 200*b* operates the sheet processing apparatus control unit 205*b* to drive the alignment board 88 so as to align or jog the sheets stacked on the processing tray 82 and also control a sort direction of the sheaf of sheets to be stacked on the stack tray 86.

Further, the controller circuit unit 200*b* operates the sheet processing apparatus control unit 205*b* to close the swing guide 81 and then drive the sheaf discharge rollers (the upper discharge roller 83*a* and the lower discharge roller 83*b*), whereby the sheaf of sheets on the processing tray 82 is discharged and stacked on the stack tray 86.

Figure 36:
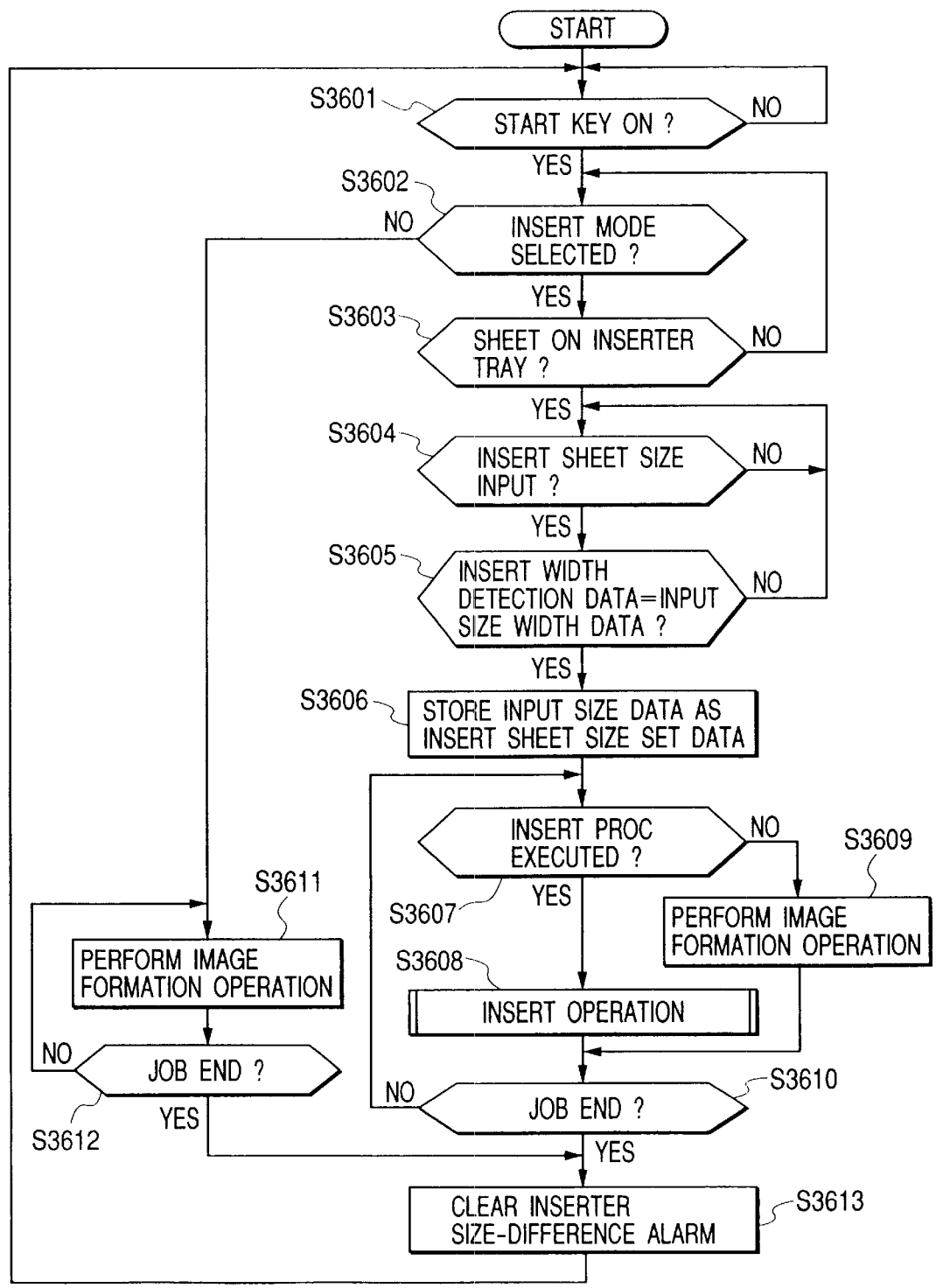
FIG. 36 is a flowchart showing a basic processing procedure.

As insert operation of the image formation system having such a structure as above will be explained. FIG. 36 is a flowchart showing a basic processing (or operation) procedure. A program for executing this procedure is stored in the ROM of the memory 2001 and actually executed by the CPU 2002.

The CPU 2002 operates the operation unit control unit 201*b* to receive input of a stack operation, a stapling operation, a punch operation, an inserter operation, and further operates the recording sheet feed control unit 202*b*, the read sheet feed apparatus control unit 203*b*, the image formation control unit 204*b* and the sheet processing apparatus control unit 205*b* on the basis of the operation setting instructed by the user's input from the operation unit 40.

First, the CPU 2002 waits for the copy start operation (a copy start key 6140) to be selected by the user (step S3601). When the copy start operation is selected, it is then judged whether or not the insert operation (the insert mode) has been selected by the user before the copy start operation is selected (step S3602).

If judged that the insert mode is not selected by the user, the image formation operation is performed (step S3611), and then it is further judged whether or not the job ends (step S3612). If judged that the job does not end, the flow returns to the step S3611 to continue the image formation operation. Conversely, if judged in the step S3612 that the job ends, an inserter size-difference alarm is cleared (step S3613), and then the flow returns to the step S3601. It should be noted that the inserter size-difference alarm will be explained later.

If judged in the step S3602 that the insert operation has been selected by the user, it is further judged by the CPU 2002 whether or not the insert sheet has been set on the tray 20 of the inserter 104*b* (step S3603).

If judged by the CPU 2002 that the insert sheet is not set on the tray 20, the flow returns to the step S3602 to wait until the insert sheet is set on the tray or the insert mode is released.

Conversely, if judged in the step S3603 whether or not the insert sheet has been set on the tray 20 of the inserter 104*b*, the CPU 2002 waits until the size data of the insert sheet is designated on the operation unit 40 by the user (step S3604).

When the size data of the insert sheet is designated by the user, it is judged by the CPU 2002 whether or not the width-direction length data of the insert sheet designated by the user is equal to the width data of the insert sheet detected by the slide switches SW0 to SW4 within the pair of width-direction regulator boards 28 (step S3605).

If judged that the width-direction length data of the insert sheet designated by the user is not equal to the width data of the insert sheet detected by the internal slide switches of the pair of width-direction regulator boards 28, the flow returns to the step S3604 to cause the user to designate the correct size.

Conversely, if judged in the step S3605 that the width-direction length data of the insert sheet (i.e., the length in the direction perpendicular to the sheet carrying direction) designated by the user is equal to the width data of the insert sheet detected by the slide switches within the pair of width-direction regulator boards 28, the size data designated by the user is stored in the memory 2001 as size set data of the insert sheet (step S3606).

Then it is judged by the CPU 2002 whether or not the page in question is the page to which the insert processing has been designated (step S3607). If judged that the page in question is the page to which the insert processing has been designated, the insert operation is performed (step S3608). Conversely, if judged that the page in question is not the page to which the insert processing has been designated, the image formation operation is performed (step S3609).

After then, it is judged whether or not the job ends (step S3610). If judged that the job ends, the inserter size-difference alarm is cleared (step S3613), and then the flow returns to the step S3601. Conversely, if judged that the job does not end, the flow returns to the step S3607 to continue the insert operation and the image formation operation.

Figure 37:
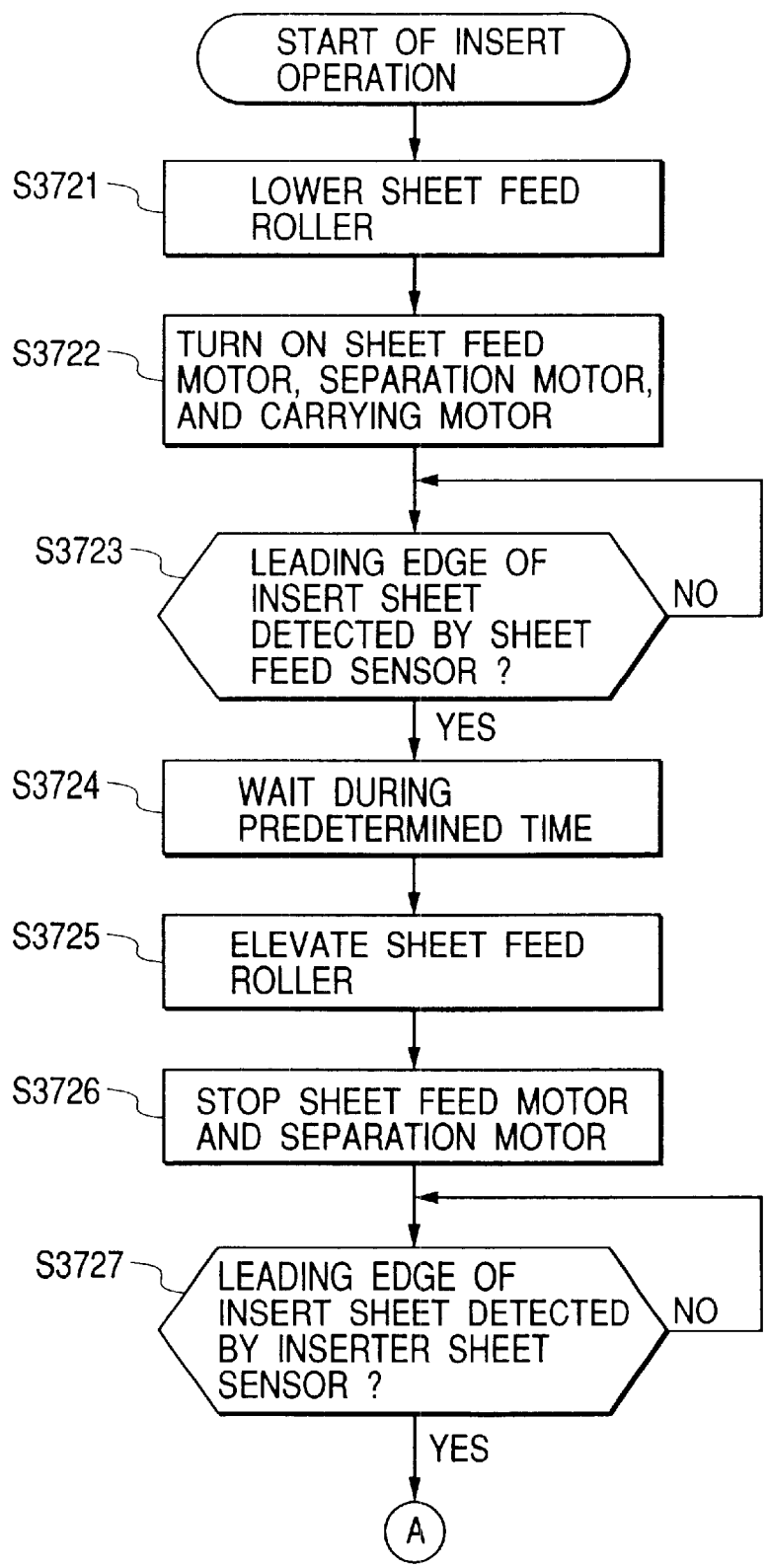
FIG. 37 is a flowchart showing an insert processing procedure.
Figure 38:
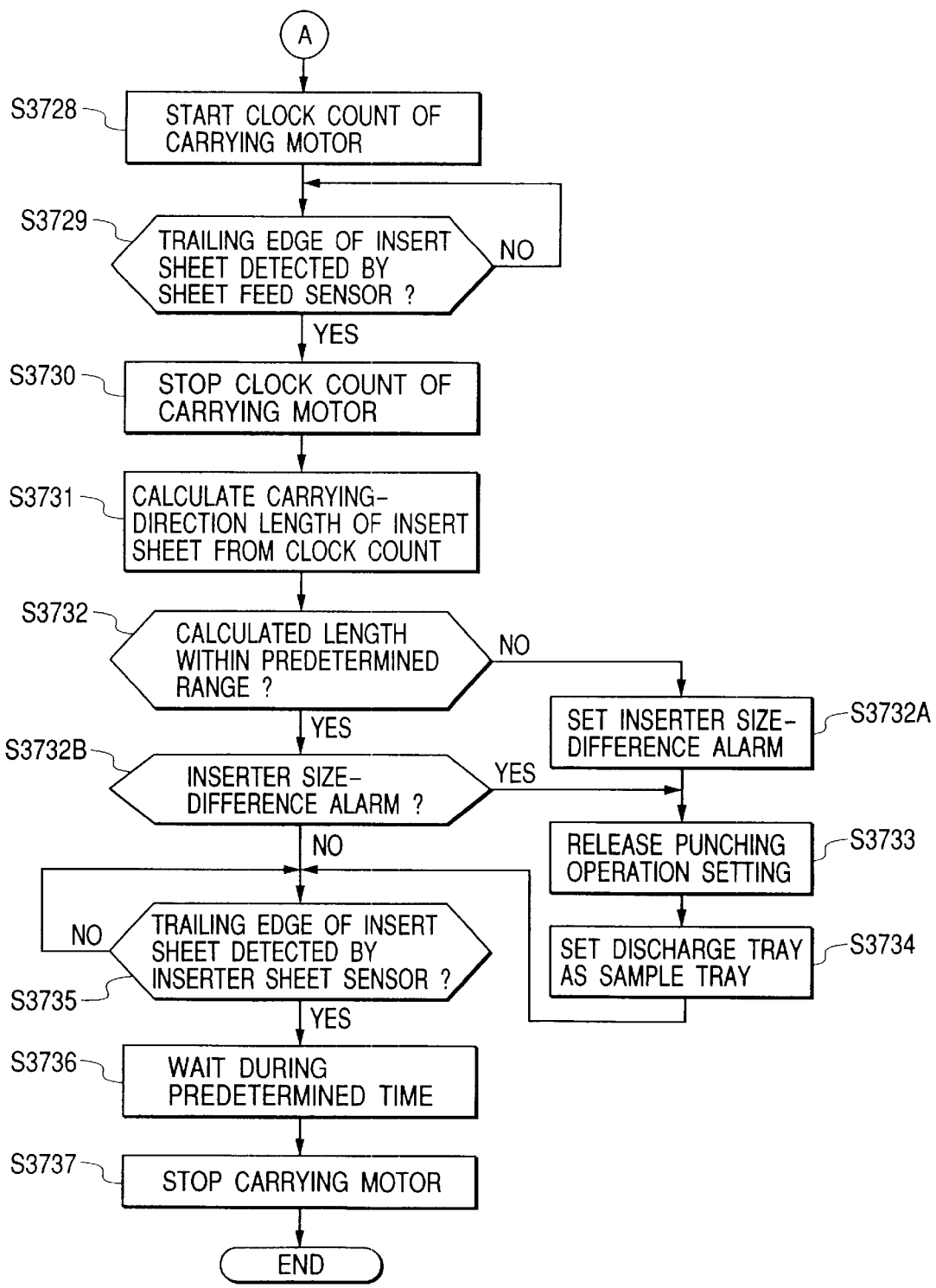
FIG. 38 is a flowchart showing the insert processing procedure.

FIGS. 37 and 38 and flowcharts showing the insert processing procedure in the step S3608. When the insert processing is started in the step S3608, the CPU 2002 operates the sheet processing apparatus control unit 205*b* and turns on a sheet feed solenoid to lower the sheet feed roller 21 (step S3721). Further, the CPU 2002 operates the sheet processing apparatus control unit 205*b* to start driving the sheet feed motor, the separation motor and the inserter carrying motor (step S3722).

Then the CPU 2002 waits until the leading edge of the insert sheet I is detected by the inserter sheet feed sensor 29 (step S3723). After the leading edge of the insert sheet I was detected by the inserter sheet feed sensor 29, the CPU 2002 waits for predetermined time until the insert sheet I reaches the carrying roller 23 (step S3724). After elapsing the predetermined time, the CPU 2002 operates the sheet processing apparatus control unit 205*b* and turns off the sheet feed solenoid to lift up the sheet feed roller 21 (step S3725). Further, the CPU 2002 operates the sheet processing apparatus control unit 205*b* to stop driving the sheet feed motor and the separation motor (step S3726).

After then, the CPU 2002 waits until that the leading edge of the insert sheet I is detected by the inserter sheet sensor 30 (step S3727). When the leading edge of the insert sheet I is detected by the inserter sheet sensor 30, then count of clock pulses used to drive the insert carrying driving motor is started (step S3728). Then, the CPU 2002 waits until that the trailing edge of the insert sheet I is detected by the inserter sheet feed sensor 29 (step S3729). When the trailing edge of the insert sheet I is detected by the inserter sheet feed sensor 29, then the count of clock pulses used to drive the insert carrying driving motor is stopped (step S3730).

After then, the carrying-direction length of the insert sheet I being carried is calculated based on the counted value (step S3731). The CPU 2002 judges whether or not the calculated carrying-direction length of the insert sheet I is within a predetermined range (±range) of the carrying-direction length of the size set data stored in the step S3606 (step S3732).

If judged that the calculated carrying-direction length of the insert sheet I exceeds the predetermined range (±range) of the carrying-direction length of the size set data stored in the step S3606, the CPU 2002 sets the inserter size-difference alarm (step S3732A). Even if the instruction to execute the punch processing mode has been input from the operation unit 40 by the operator, the setting of the punch operation to the insert sheet I is released (step S3733), and the setting of the sheet discharge tray to the insert sheet I is set to the sample tray 85 (step S3734).

Incidentally, in the step S3733, even if the sheet processing (e.g., the sort processing, the stapling processing, the bookbinding processing by a not-shown bookbinding unit, the folding processing by a not-shown folding processing unit, or the like) other than the punch processing has been set on the screen 900a or the like of the operation unit by the user, it is inhibited to perform such processing to the sheet, whereby the above sheet processing is invalidated.

Further, in the step S3734, for example, even if it is not instructed by the user to perform the above sheet processing, when the storage unit selected and determined according to the user's setting information from the operation unit 40 is the tray 86 (i.e., the data designating the sheet discharge destination represents the tray 86), it is inhibited to discharge the sheet to the tray 86, the sheet discharge destination is changed to the tray 85 (i.e., the designation of the sheet discharge destination for the sheet is invalidated), and it is controlled to discharge the sheet to the tray 85.

The reason why the sheet is not discharged to the tray 86 but discharged to the tray 85 is to cause the user to easily notice his erroneous operation, by discharging the sheet to the uppermost tray 85 which can most-easily enter user's view, and also to enable the user to easily take out the sheet from the tray. Thus, even if the sheet is discharged to the tray 86 disposed under the tray 85, there is some fear that the user does not notice his erroneous operation. Even if the user noticed his erroneous operation, when the plural sheets are stacked on the tray 86, he has to look for the intended sheet from among them. In consideration of the above inconvenience, when the user performs the erroneous operation, it is controlled to notify him of such the fact, inhibit from discharging the sheet to the tray 86, and discharge the sheet to the tray 85, in order to eliminate complicated working beforehand.

On the other hand, if judged in the step S3732 that the calculated carrying-direction length of the insert sheet I is within the predetermined range (±range) of the carrying-direction length of the size set data (including the sheet size data designated by the user) stored in the step S3606, the CPU 2002 judges whether or not the inserter size-difference alarm is being given (step S3732B). If judged that the inserter size-difference alarm is being given, the flow advances to the step S3733. Namely, while this alarm is being given, the above invalidation to the sheet is maintained. Conversely, if judged that the inserter size-difference alarm is not given, the flow waits until the trailing edge of the insert sheet I is detected by the inserter sheet sensor 30 (step S3755). When the trailing edge of the insert sheet I is detected by the inserter sheet sensor 30, then the CPU 2002 waits for predetermined time until the trailing edge of the insert sheet I passes the carrying roller 26 (step S3736).

Then, after elapsing the predetermined time, the CPU 2002 operates the sheet processing apparatus control unit 205b and stops driving the insert sheet feed driving motor (step S3737).

As above, the size of the insert sheet being carried is detected, and the detected size data is compared with the size data of the insert sheet designated by the user. As a result, when the user erroneously designated the sheet size different from the sheet size actually set in the inserter, the sheet processing such as the punch processing, the stack processing, the stapling processing, the folding processing, the bookbinding processing and the like to be performed to the insert sheet designated by the user is inhibited. Thus, it is possible to reuse the insert sheet erroneously designated by the user, thereby improving operability of the sheet processing apparatus. Further, even if to which tray the insert sheet is discharged has been determined beforehand according to the information set by the user, when the determined tray is the tray other than the tray 85, such the designation of the sheet discharge destination is invalidated, and the sheet discharge destination is changed such that the sheet is discharged to the tray 85. Thus, the above effect rises further.

Incidentally, even if the user erroneously designates the sheet size different from the sheet size actually set in the inserter, he might occasionally hope to output the sheets in the sorted state by convenience. Thus, when the size of the insert sheet is different, it is possible not to change the setting of the sheet discharge tray (destination) for the insert sheet I to the sample tray 85 but to only inhibit the above sheet processing. Further, when the user's erroneous operation occurs, it is possible to provide a mode to inhibit only the above sheet processing, a mode to inhibit the sheet processing and also change the sheet discharge destination, a mode to inhibit the stapling processing and the punch processing but allow the alignment processing and the sort processing such that the user can previously select the desired mode according to the user mode or the like and thus the mode is changed to the user-selected mode in case of the above situation.

Figure 41:
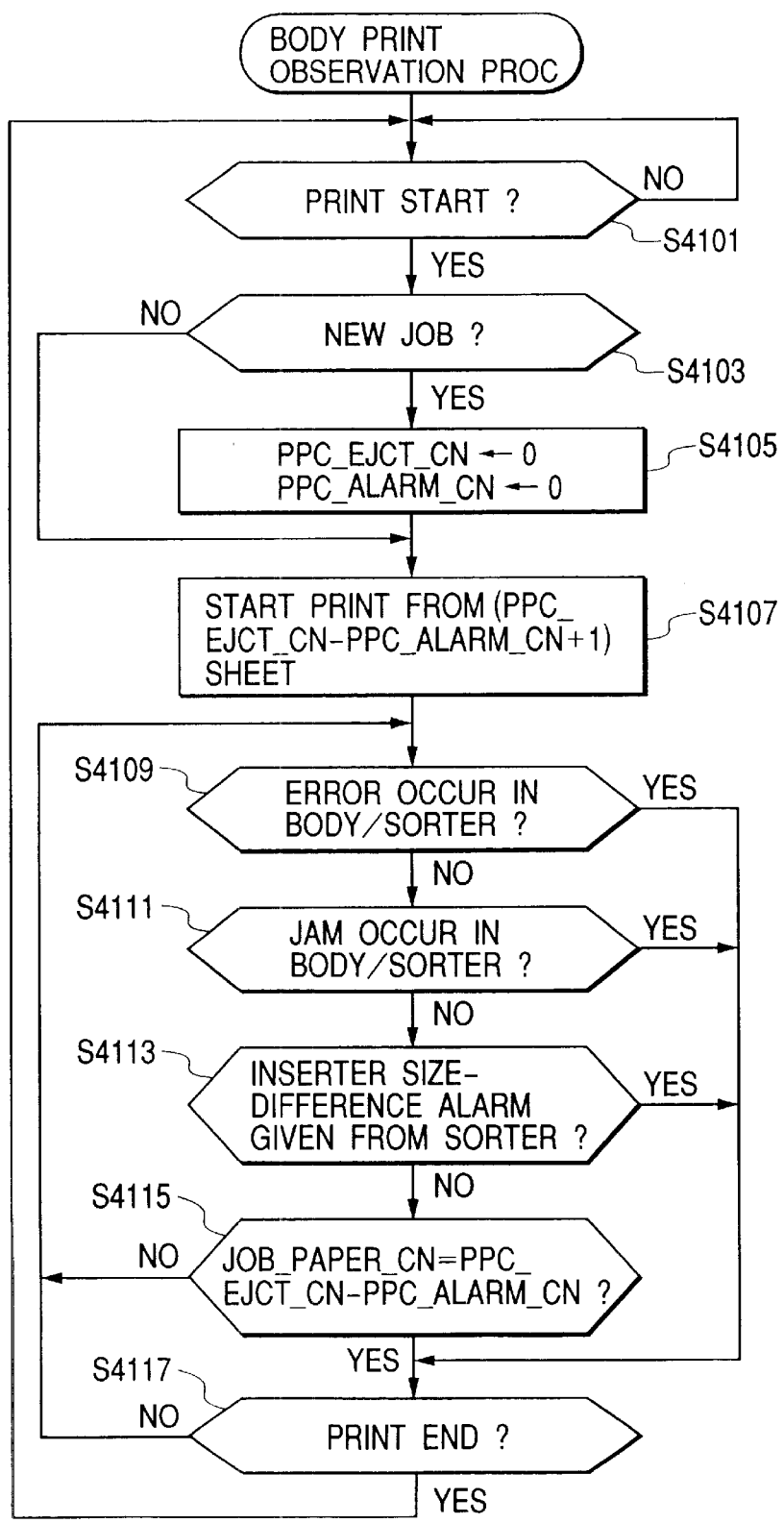
FIG. 41 is a flowchart showing a print observation processing procedure.

Next, print observation processing of the body of the image formation apparatus will be explained with reference to FIG. 41. First, in a step S4101, it is observed whether or not print of the body is started. When the print is not started, the observation is continued. Conversely, when the print is started, it is judged whether or not the print is based on a new job (step S4103). If judged that the print is based on a new job, a code "PPC_EJCT_CN" representing the number of discharge sheets and a code "PPC_ALARM_CN" representing the number of discharge sheet after the alarm was given are cleared to be "0" (step S4105), and the flow advances to a step S4107. Conversely, if judged that the print is not based on a new job, the flow directly advances to the step S4107.

In the step S4107, a sheet counter necessary to start the print is set based on the code "PPC_EJCT_CN" representing the number of discharge sheets and the code "PPC_ALARM_CN" representing the number of discharge sheet after the alarm was given, and the print is started. Then, if a body/sorter error, a body/sorter jam and the inserter size-difference alarm are not detected respectively in steps S4109, S4111 and S4113, it is observed whether or not the sheet discharge based on a code "JOB_PAPER_CN" representing the intended number of discharge sheets is performed (step S4115). When the sheet discharge does not reach the intended number, the flow returns to the step S4109. Conversely, when the sheet discharge reaches the intended number, it is judged whether or not the print processing completely ends (step S4117). If judged that the print processing ends, the flow returns to the step S4101. Conversely, if judged that the print processing does not end, the flow returns to the step S4109.

Figure 42:
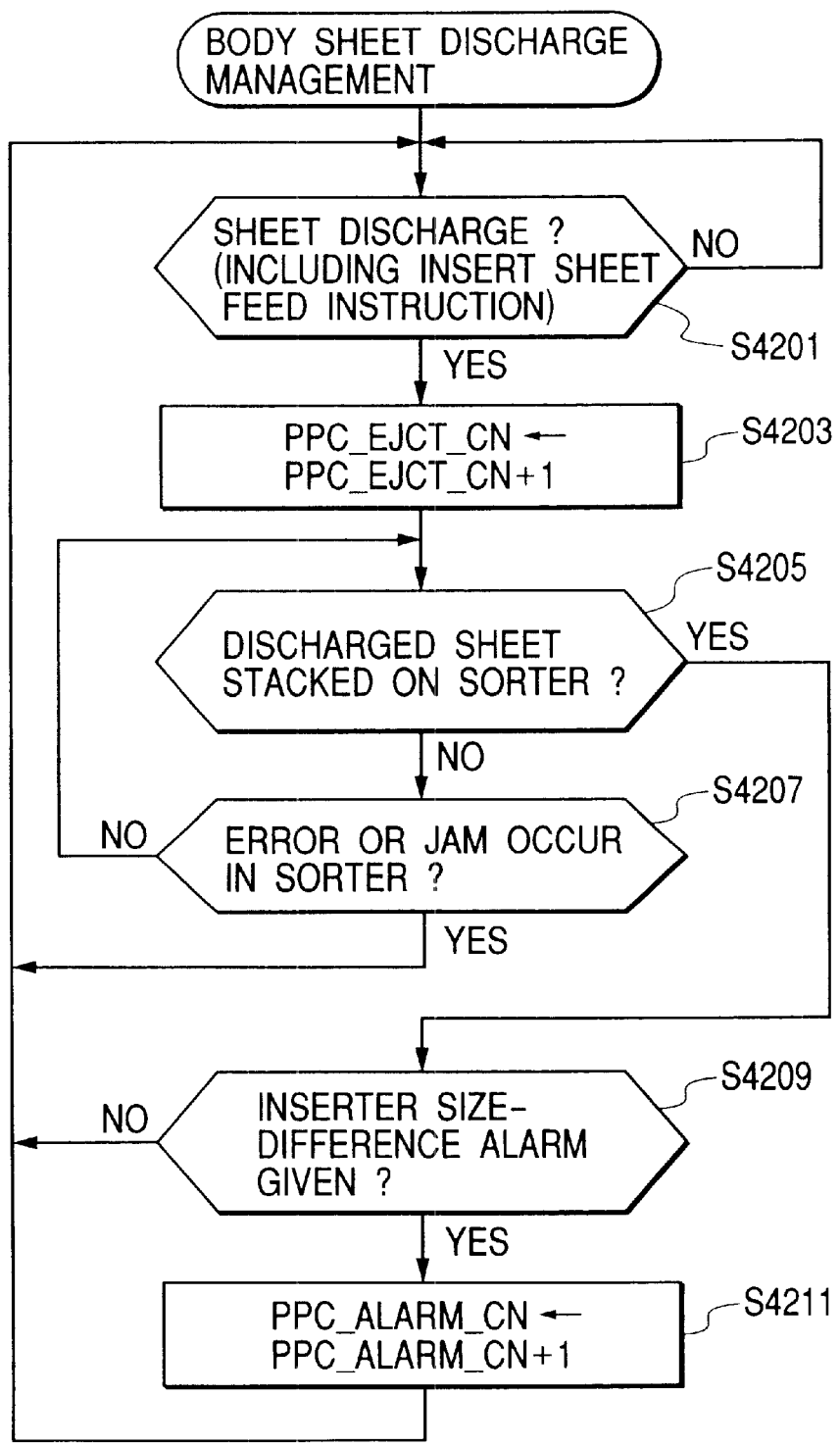
FIG. 42 is a flowchart showing a sheet discharge processing procedure.

Next, sheet discharge processing of the body of the image formation apparatus will be explained with reference to FIG. 42. First, it is observed whether or not the body discharges the sheet to the sorter (or the body instructs the inserter sheet feed) (step S4201). When the sheet is not discharged, the observation in the step S4201 is continued. Conversely, when the sheet is discharged, the flow advances to a step S4203 to increase the code "PPC_EJCT_CN" representing the number of discharge sheets by one. Then, it is judged whether or not the discharged sheet is stored in the sorter (step S4205). If judged that the discharged sheet is not stored, the error and the jam in the sorter is observed (step S4207). If judged that none of the error and the jam occur, the flow returns to the step S4205. Conversely, if judged that the error or the jam occurs in the sorter, the flow returns to the step S4201.

On the other hand, if judged in the step S4205 that the discharged sheet is stored in the sorter, then it is further judged whether or not the inserter size-difference alarm is given (step S4209). If judged that the inserter size-difference alarm is not given, the flow returns to the step S4201. Conversely, if judged that the inserter size-difference alarm is given, the code "PPC_ALARM_CN" is increased by one (step S4211), and the flow returns to the step S4201.

Next, inserter size-difference alarm display processing will be explained with reference to FIG. 43. First, in a step S4301, it is observed whether or not print of the body is started. When the print is not started, the observation is continued. Conversely, when the print is started, it is judged whether or not the inserter size-difference alarm is being displayed (step S4303). If judged that the inserter size-difference alarm is being displayed, such alarm display is turned off (step S4305), and the flow advances to a step S4307.

Conversely, if judged that the inserter size-difference alarm is not displayed, the flow directly advances to the step S4307. It is judged in the step S4307 whether the inserter alarm is given. If judged that the inserter alarm is given, the inserter size-difference alarm is displayed as a message at the top of the display unit shown in FIG. 44 to notify the user of this state (step S4309), and the flow advances to a step S4311. Conversely, if judged that the inserter alarm is not given, the flow directly advances to the step S4311. In the step S4311, it is judged whether or not the print processing completely ends. If judged that the print processing ends, the flow returns to the step S4301. Conversely, if judged that the print processing does not end, the flow returns to the step S4307.

Figure 44:
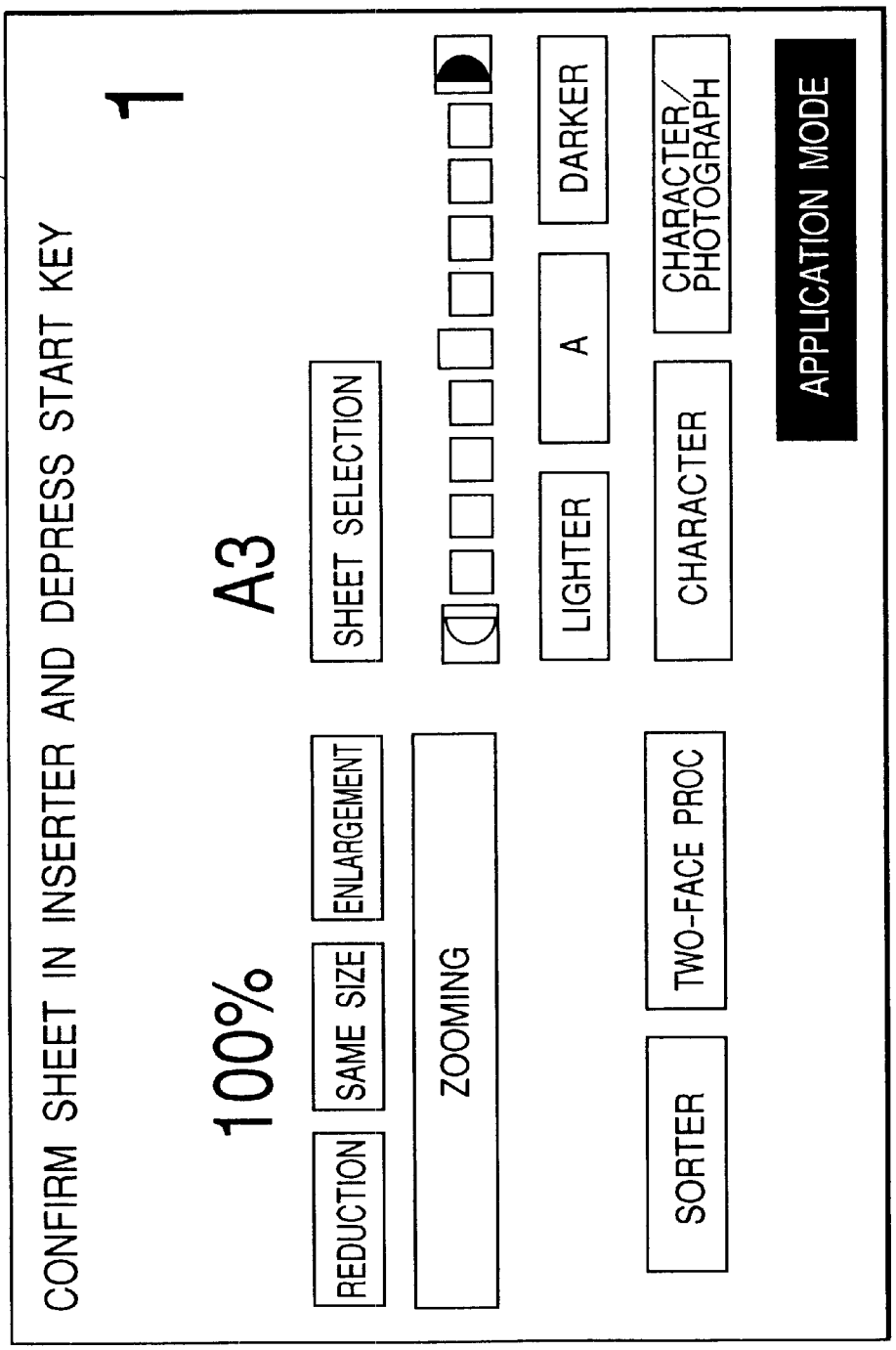
FIG. 44 is a diagram showing an example of a screen displayed on an operation panel 421 of an operation unit 40.

As above, when the detected sheet size (the length in the sheet carrying direction is detected in the present embodiment, but the length in the direction perpendicular to the sheet carrying direction may be detected) is different from the sheet size set on the operation unit 40, for example, a sheet size-difference alarm signal is input from the CPU circuit unit on the side of the sheet processing apparatus 103b to the CPU on the body of the image formation apparatus 102b through a signal line. Thus, on the side of the body of the image formation apparatus 102b, a screen shown in FIG. 44 is displayed in response to the alarm signal. Further, while the alarm is given, all the sheets are discharged onto the sample tray 85.

Then, according as all the sheet to be processed during the alarm are output to the sample tray 85, the alarm is released. Further, according as the alarm is released, recovery processing of enabling to restart the sheet processing is performed. Hereinafter, the recovery processing will be explained in detail.

For example, it is assumed that the user instructs from the operation unit 40 the image formation apparatus to output three sets of sheaves each having three pages including two original copies and one insert sheet (cover) in the stapled state.

Figure 45:
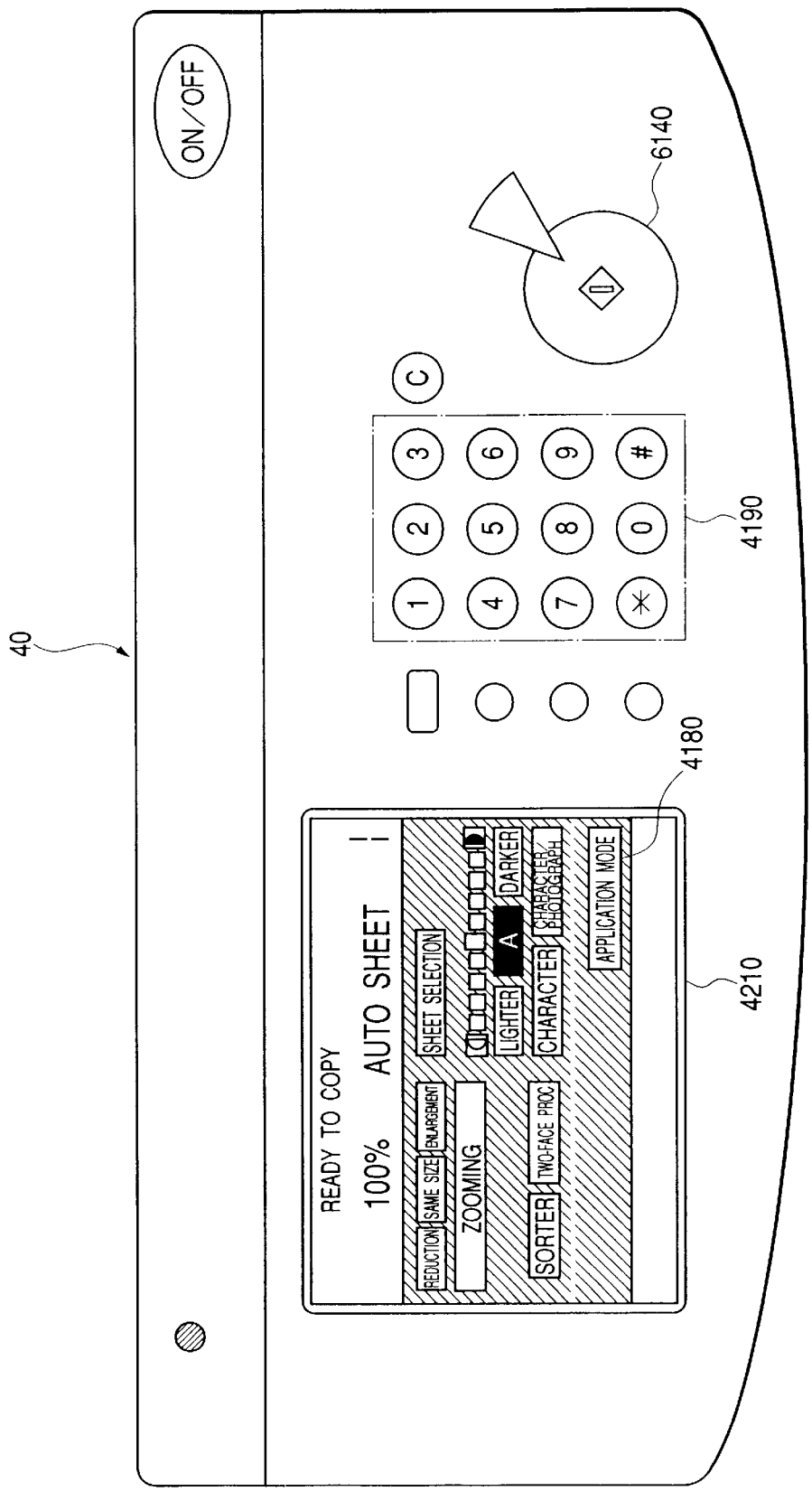
FIG. 45 is a diagram showing the operation unit 40.

In this case, the user previously sets the three insert sheets (the covers) on the tray 20 of the inserter and also sets the two originals on the original stack tray 45 of the body of the copying machine. Then, on the operation unit 40, the user designates the stapling sort mode and the insert mode, determines the size of the insert sheet (A4 in this case), selects "3" by using numeric keys 4190 to set the three output copies, and depresses the copy start key 6140 (FIGS. 45 and 40).

In this case, it is assumed that, in the three insert sheets set on the tray 20 of the inserter by the user, the second insert sheet (called an insert sheet C2) is A3 size, and each of the first and third insert sheets (called insert sheets C1 and C3) is A4 size.

According as the copy start key 6140 is depressed by the user, the sheet processing apparatus 103b starts feeding the insert sheet C1, detects the size of the fed insert sheet C1 in the above manner, and compares the detected size of the sheet C1 with the size of the insert sheet set on the operation unit 40. In this case, since the detected size of the sheet C1 coincides with the size of the insert sheet set on the operation unit 40, this insert sheet C1 is stacked on the processing tray 82 through the sort path 8.

On the other hand, at this time, the image formation apparatus 102b reads the original, sequentially stores the original images in the memory, and reads the original image data from the memory. Then, on the basis of the read image data, the image formation apparatus 102b forms the image on the sheet fed from the recording sheet storage unit 53 or 54. Incidentally, the two copied originals of the first copy discharged from the body of the image formation apparatus 102b into the sheet processing apparatus 103b are carried (in the order of first page and second page) following the previously carried insert sheet C1, and stacked or stored on the processing tray 82 in the order of first page and second page following the insert sheet C1. Then, according as the second page of the copied originals of the first copy is stacked or stored on the processing tray 82, the stapling processing is performed by the stapling unit 80, and the stapled sheaf of sheets (i.e., copied originals) of the first copy is discharged onto the stack tray 86.

Accordingly, as the second page of the copied originals of the first copy passed the sheet sensor 31, the sheet processing apparatus starts carrying the second insert sheet C2, detects the size of the fed insert sheet C2 in the above manner, and compares the detected size of the sheet C2 with the set size of the insert sheet.

In this case, since the detected size of the insert sheet C2 does not coincide with the size of the insert sheet set on the operation unit 40, the inserter size-difference alarm is given, and this alarm is transmitted to the side of the image formation apparatus 102*b*. Further, the carrying flapper 11 is changed to the side of the nonsort path 4 to guide the insert sheet C2 to this path 4, and the sheet C2 is discharged onto the sample tray 85. The body of the image formation apparatus 102*b* displays a screen 4270 shown in FIG. 44 on the operation panel 4210 in response to the notification from the sheet processing apparatus 103*b*, and stops its operation.

At this time, when the copied originals of the second copy are carried from the body of the image formation apparatus 102*b* following the insert sheet C2, these sheets are also discharged onto the sample tray 85. In this case, until the second copied original of the second copy is discharged onto the sample tray 85, the inserter size-difference alarm is being given. Then, accordingly as the second copied original of the second copy is discharged onto the sample tray 85, the sheet processing apparatus 103*b* releases the inserter size-difference alarm.

In the current state, the sheaf of sheets of the first copy has been stacked on the stack tray 86 in the stapled state, the sheaf of sheets of the second copy has been stacked on the sample tray 85 in the unstapled state, and the sheaf of sheets of the third copy is not yet subjected to the image formation processing. In any case, in a punch mode set by the user, each sheet including the sheaf of the first copy is subjected to the punch processing by the punch roller when it passes the punch unit 50. Conversely, it is inhibited in this mode to punch each sheet including the sheaf of the second copy by the punch roller when each sheets passes the punch unit 50.

Accordingly as the inserter size-difference alarm is released, the operation can return to the ordinary operation. Thus, when the user resets the insert sheet C2 which is not subjected to the stapling processing, the punch processing and the like and then performs new setting on the operation unit 40, this sheet is reusable.

The recovery processing can be performed after the inserter size-difference alarm was released. Thus, for example, in the case where the screen 4270 shown in FIG. 44 is being displayed, when an A4-sized insert sheet (called a sheet C2A) instead of the insert sheet C2 is set on the insert sheet C2 not fed yet and the copy start key 6140 is depressed, the recovery processing is performed.

The recovery processing will be explained with reference to FIG. 41. In the present embodiment, the number of discharge sheets (PPC_EJCT_CN) is "9"{=3 (two copied originals+one insert sheet)×3 copies}. Further, the number of discharge sheet after the alarm was given (PPC_ALARM_CN) is "6", since the alarm is given while the sheet C2 is being discharged and thus the output of the first copy should be eliminated. Further, the value "1" is added. Thus, the processing is started from the fourth sheet (9−6+1=4). Namely, the processing is started from the feed processing of the sheet C2A. On the other hand, on the side of the body of the image formation apparatus 102*b*, the processing is started from the copied originals of the second copy.

Incidentally, it is possible to notify the user of the state that the setting of the processing to the insert sheet I has been released.

Like the first-described embodiment, in the present embodiment, since the sheet managed by the inserter 104*b* is a value-added specific sheet (e.g., a sheet on which a photographic image was formed, a cover of a catalog, a coated sheet, a colored sheet, or the like), the sheet carried from the inserter 104*b* was emphatically explained. However, of course, the above various processing is applicable to the sheet carried from the side of the image formation apparatus body.

For example, a not-shown sensor which is the same as the sensor 29 capable of detecting the sheet length in the carrying direction is provided on the sheet carrying path through which the sheet image-formed by the printer unit 102*b* is carried, and the size of the carried sheet is calculated based on sheet detection information from this sensor, and the sheet size information generated based on the sheet detection information from the above sensor is compared with the sheet size information acquired based on the user's set information. Thus, according to the compared result, it is possible to inhibit the above sheet processing, change the tray to which the sheet should be discharged, and execute the inserter size-difference display mode or the like.

As above, in the present embodiment, the sizes of the sheets which include the insert sheet being carried and the sheet carried from the side of the image formation apparatus body are detected, and the sheet size data acquired based on the detection result from the sensor is compared with the sheet size data acquired based on the user's setting. Then, when the sheet size different from the actual sheet size is erroneously designated and input by the user, the sheet processing such as the sort processing, the binding processing, the stack processing, the punch processing, the bookbinding processing, the folding processing and the like to be performed to the sheet designated by the user is inhibited (but it is set to enable the user to select and allow the sort processing, the stack processing and the like). Further, when the previously designated storage unit automatically set based on the user's setting information or manually set by the user's operation is not the predetermined storage unit, it is controlled to invalidate (or inhibit) such designation and change the sheet discharge destination such that the sheet is discharged to the predetermined storage unit. Further, it is controlled to notify the user of such the operations through the display unit. Therefore, it is possible to reuse the insert sheet erroneously designated by the user, thereby improving operability of the sheet processing apparatus.

Next, processing which concerns an application example using the inserter size-difference alarm set in the step S3732A of FIG. 38 will be explained.

Figure 46:
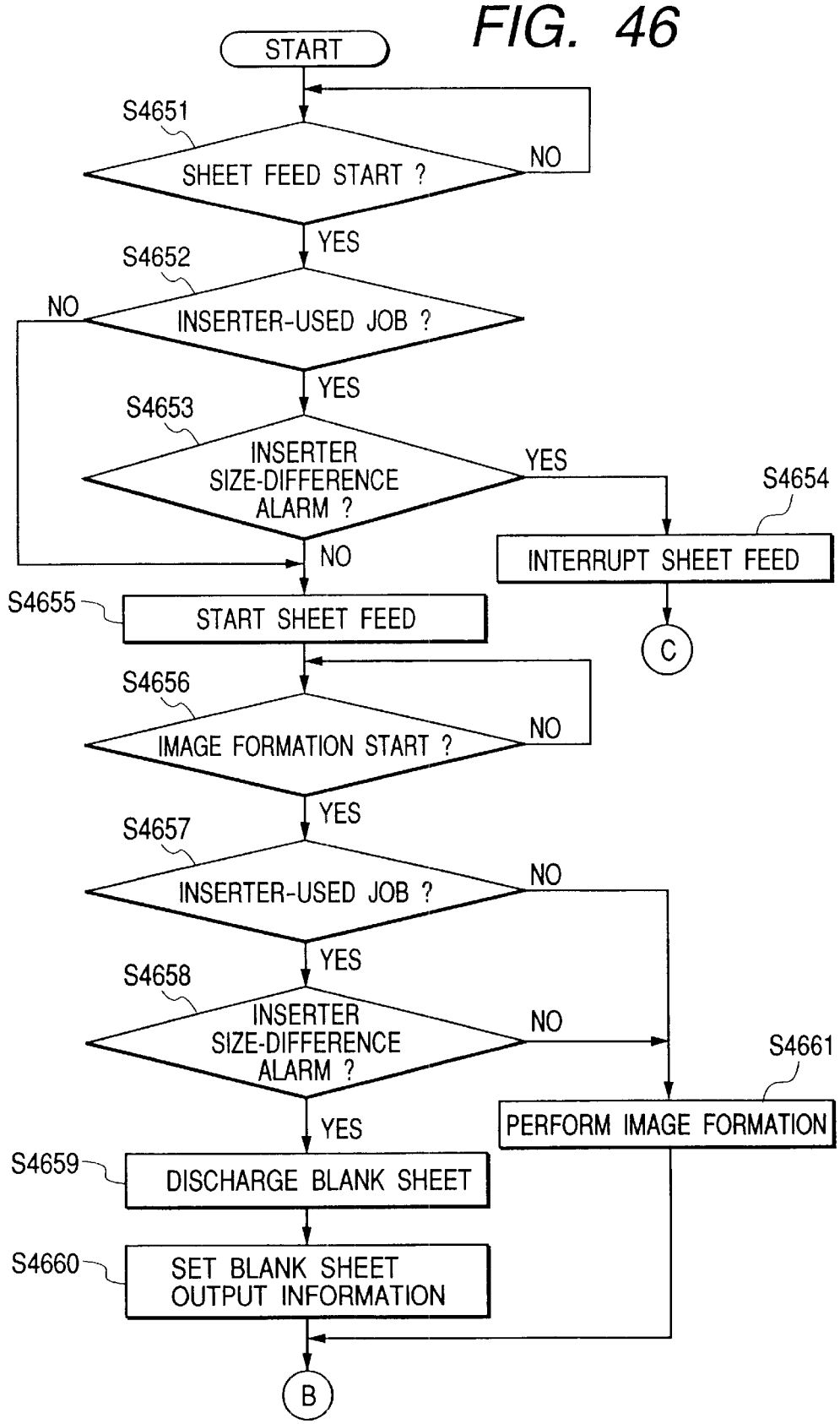
FIG. 46 is a flowchart showing a recording sheet feed processing procedure, an image formation processing procedure and a sheet discharge processing procedure in case of an inserter size-difference alarm.
Figure 47:
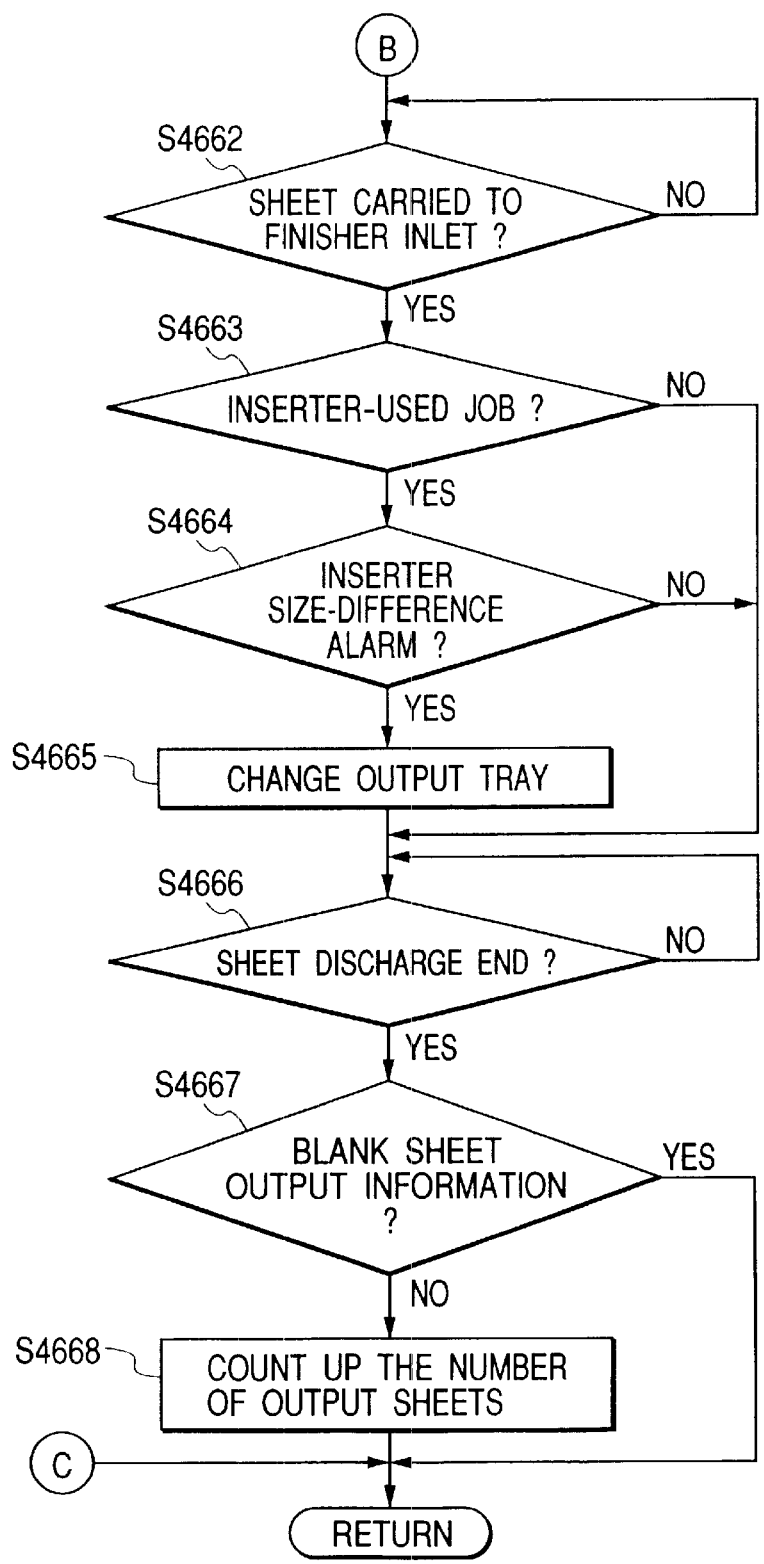
FIG. 47 is a flowchart showing the recording sheet feed processing procedure, the image formation processing procedure and the sheet discharge processing procedure in case of the inserter size-difference alarm.

FIGS. 46 and 47 are a flow chart showing a recording sheet feed processing procedure, an image formation processing procedure and a sheet discharge processing procedure in case of the inserter size-difference alarm (FIG. 38). Since a program for such processing has been stored in the ROM of the memory 2001, this program is called at regular intervals or according to necessity from the main flow chart and executed by the CPU 2002.

First, it is judged whether or not the sheet feed operation is to be started (step S4651). It should be noted that the sheet feed operation is started at a predetermined interval of the image formation operation. If judged that the sheet feed operation is not started, the CPU 2002 waits until the sheet feed operation is started. Conversely, if judged in the step S4651 that the sheet feed operation is to be started, then it is further judged whether or not the recording sheet to which the sheet feed operation is started is one of the output sheaf using the inserter 104*b* (step S4652).

If judged that the recording sheet in question is one of the output sheaf not using the inserter 104*b*, the flow advances to a step S4655. Conversely, if judged in the step S4652 that the recording sheet in question is one of the output sheaf using the inserter 104*b*, then it is further judged whether or not the inserter size-difference alarm described in the step S3732A of FIG. 38 is given (step S4653). If judged that the alarm is given, the sheet feed operation is interrupted, and thus the image formation operation is interrupted (step S4654). Then, the processing ends.

On the other hand, if judged in the step S4653 that the inserter size-difference alarm is not given, the sheet feed operation is started (step S4655). Then it is judged whether or not the recording sheet S1 or S2 from the recording sheet storage unit 53 or 54 is carried up to the image formation start position (step S4656). If judged that the recording sheet is not carried up to the image formation start position, the CPU 2002 waits until the sheet is carried up to the image formation start position. Conversely, if judged in the step S4656 that the sheet is carried up to that position, then it is judged whether or not the carried recording sheet is one of the output sheaf using the inserter 104*b* (step S4657).

If judged that the recording sheet in question is one of the output sheaf not using the inserter 104*b*, the flow advances to a step S4661. Conversely, if judged that the recording sheet in question is one of the output sheaf using the inserter 104*b*, then it is further judged whether or not the inserter size-difference alarm described as above is given (step S4658). If judged that the alarm is given, the working (image formation operation) to the recording sheet being carried is interrupted, and the recording sheet is discharged in the state of blank sheet (step S4659). After then, the information which represents that the image formation operation to the recording sheet being carried is stopped and the blank sheet is output is set (step S4660). Conversely, if judged in the step S4658 that the inserter size-difference alarm is not given, then timing with the recording sheet is taken, and the image formation operation is started (step S4661).

Then it is judged whether or not the recording sheet is carried up to the inlet of the finisher 103*b* (step S4662). If judged that the recording sheet is not carried up to the inlet of the finisher 103*b*, the CPU 2002 waits until the sheet is carried up to this inlet. Conversely, if judged that the sheet is carried up to this inlet, then it is judged whether or not the recording sheet carried up to the inlet of the finisher 103*b* is one of the output sheaf using the inserter 104*b* (step S4653).

If judged that the recording sheet is one of the output sheaf not using the inserter 104*b*, the flow advances to a step S4666. Conversely, if judged in the step S4663 that the recording sheet is one of the output sheaf using the inserter 104*b*, then it is further judged whether or not the inserter size-difference alarm described as above is given (step S4664). If judged that the alarm is given, the sheet output (discharge) destination is changed, such that the sheet is discharged to the tray 85 identical with the tray to which the sheet fed from the inserter sheet feed tray 20 is discharged when it is judged that the alarm is given (step S4665). Then the flow advances to the step S4666. Conversely, if judged in the step S4664 that the alarm is not given, the flow directly advances to the step S4666.

Then it is judged whether or not the discharge of the recording sheet being carried ends (step S4666). If judged that the sheet discharge does not end, the CPU 2002 waits until the sheet discharge ends. Conversely, if judged in the step S4666 that the sheet discharge ends, then it is judged whether or not the discharged recording sheet is the recording sheet to which the information representing the blank sheet output has been set (step S4667). If judged that the discharged sheet is not the recording sheet to which the information representing the blank sheet output has been set, the number of output sheets each subjected to the image formation is counted by the counter (step S4668), and the processing ends. Conversely, if judged in the step S4667 that the discharged sheet is the recording sheet to which the information representing the blank sheet output has been set, the processing ends as it is.

Figure 48A:
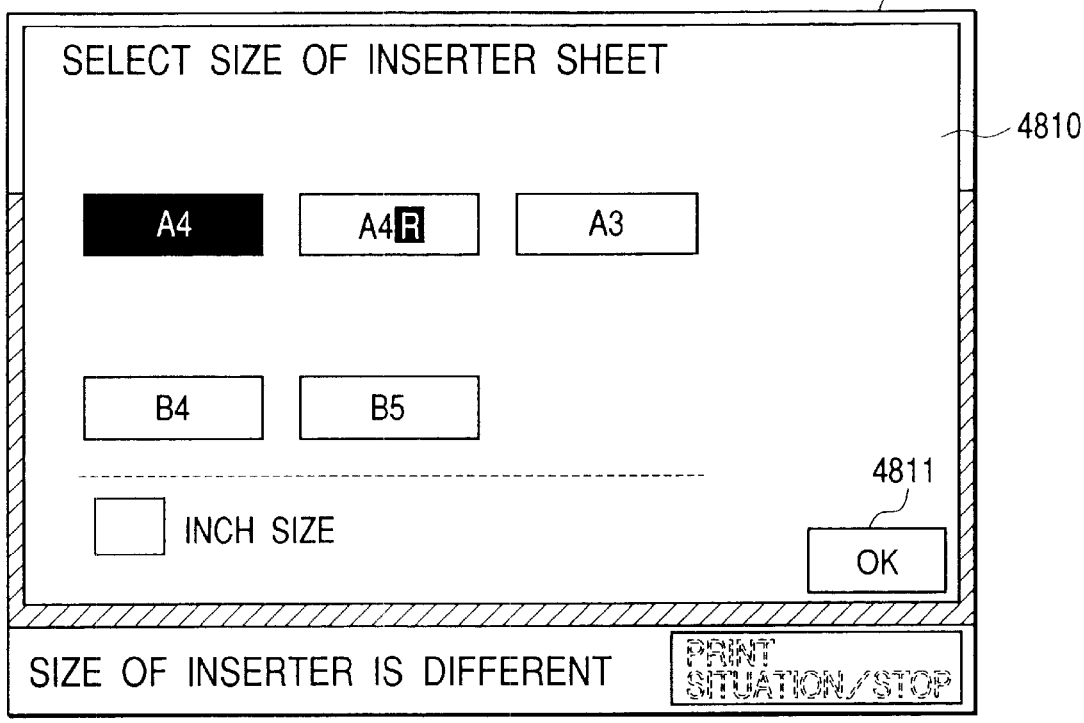
FIGS. 48A and 48B are diagrams showing a display state of an operation panel 4210 in a case where the inserter size-difference alarm is given and the image formation apparatus is stopped.

Next, examples of display on the operation panel 4210 of the operation unit 40 in the case where the inserter size-difference alarm is given in the processing of the step S3732A of FIG. 38 will be explained. FIGS. 48A and 49B are diagrams showing the display state of the operation panel 4210 in the case where the inserter size-difference alarm is given and the image formation apparatus is stopped. On the operation panel 4210, a message "SIZE OF INSERTER IS DIFFERENT " being the inserter size-difference alarm is displayed at a message line below a size setting screen 4810 to represent the state of the image formation apparatus. Further, on the operation panel 4210, the message for setting the inserter size and the size setting screen 4810 are displayed in pop-up manner (FIG. 48A).

Figure 48B:
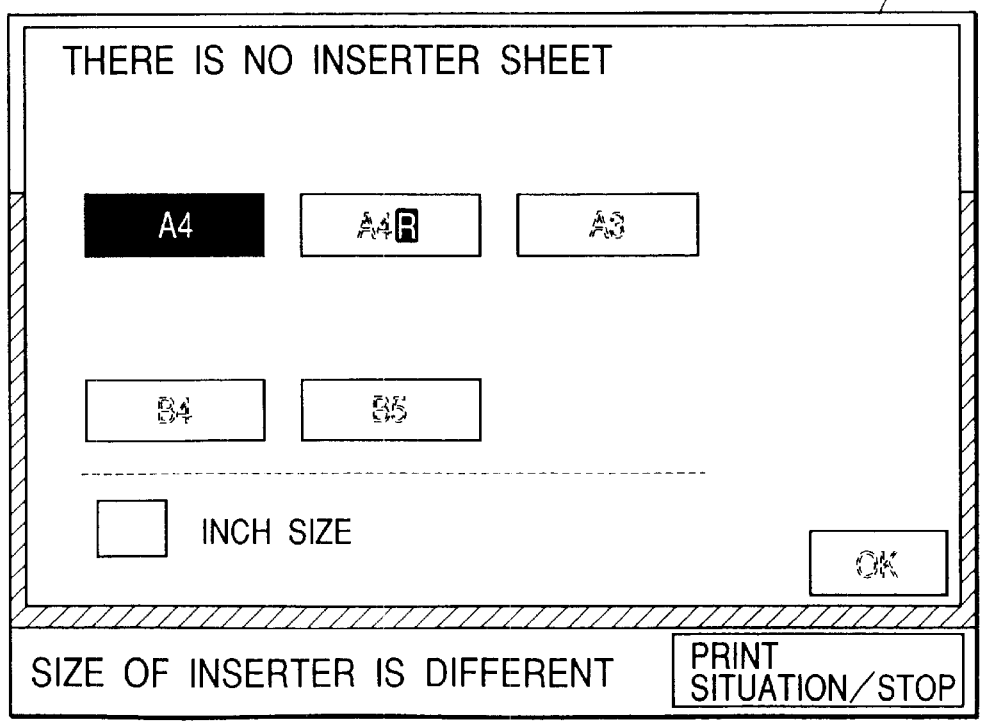

This display urges the user to reset the inserter size. On the screen 4810, several sheet size candidates capable of being designated by the user are displayed, whereby the user redesignates the appropriate size from among these candidates. When the appropriate sheet size is selected and an OK key 4811 is depressed by the user, the image formation apparatus clears the information of the inserter size-difference alarm and restarts the job from the output of the insert sheet I discharged to the tray 85. At this time, the image formation to the recording sheet which was discharged on the tray 85 subsequent to the insert sheet I and on which the ordinary image was formed is again performed. When the sheet of which size was designated on the screen 4810 does not exist, the screen 4210 of FIG. 48B is displayed. In this case, a message "THERE IS NO INSERTER SHEET" is displayed on the screen 4210.

Figure 49:
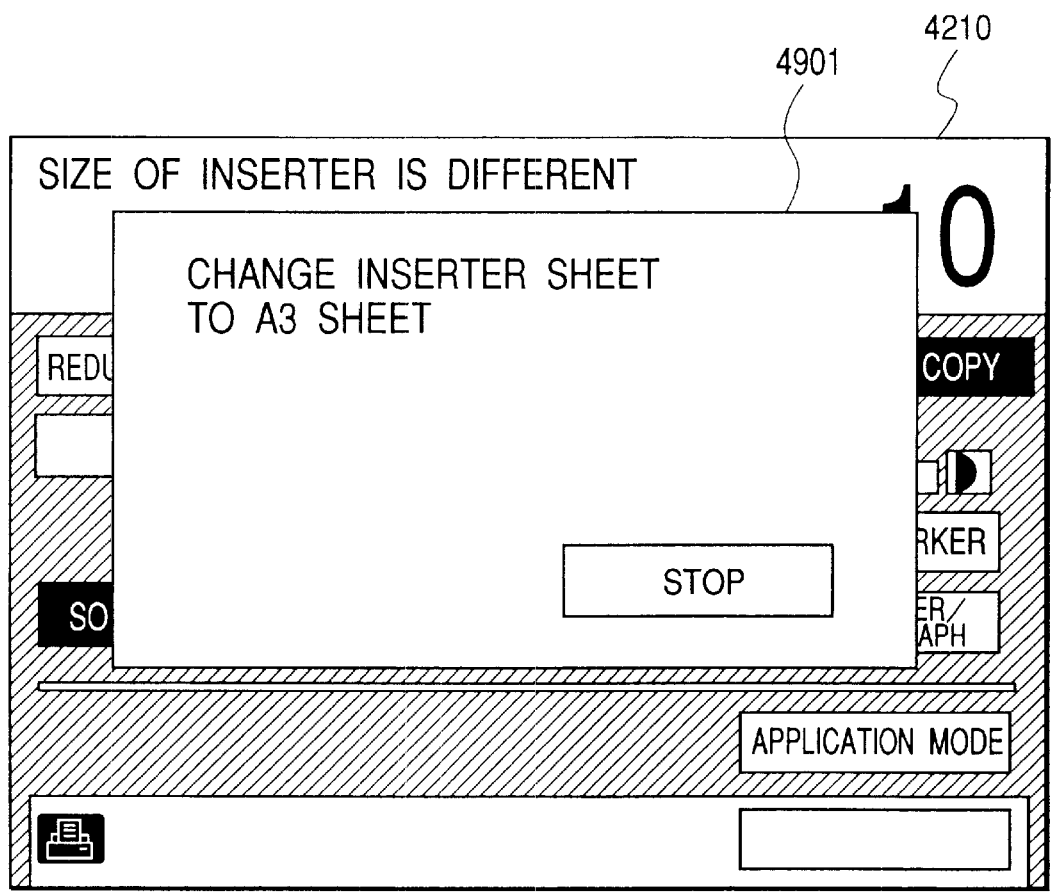
FIG. 49 is a diagram showing another display state of the operation panel 4210 in the case where the inserter size-difference alarm is given and the image formation apparatus is stopped.

FIG. 49 is a diagram showing another display state of the operation panel 4210 in the case where the inserter size-difference alarm is given and the image formation apparatus is stopped. On the operation panel 4210, a message "SIZE OF INSERTER IS DIFFERENT" being the inserter size-difference alarm is displayed at a message line above a screen 4901 to represent the state of the image formation apparatus. Further, on the operation panel 4210, the size change screen 4901 is displayed in pop-up manner (FIG. 49).

On the operation panel 4210, the pop-up screen 4901 is displayed not to overlap with the message line (i.e., the line along which the message "SIZE OF INSERTER IS DIFFERENT" is displayed) above this panel 4210, in order to inhibit handling of the touch keys on this panel 4210, whereby the keys for the mode setting and the like are not accepted.

Namely, it is confirmed that the sheet size designated by the user is different from the sheet size actually detected by the apparatus, and the image formation operation is interrupted and such the interruption state is maintained on the basis of the above confirmation result. Then, in order to inhibit the operator from setting through the operation panel 4210 the various operation modes concerning image formation operations such as magnification change processing (reduction, enlargement, etc.), image layout processing (N-in-1, 1-to-N, etc.), one-face/two-face processing, density setting, image quality setting, sheet processing (sort, stapling, punch, bookbinding, insert, etc.) during such the interruption state, the pop-up screen 4901 is displayed to hide the functional buttons concerning the above various operation modes. Thus, the state (i.e., an invalidation state)

that the user can not depress these functional buttons is established, whereby the various operation modes can not be set by the user.

Together with the above display control to inhibit the user from setting the various modes, a message "CHANGE INSERTER SHEET TO A3 SHEET" is displayed to urge the user to perform a necessary operation. It should be noted that, although the size "A3" is displayed on the screen 4901, the size to be displayed is changed according to the sheet size designated by the user or the sheet size acquired based on the sheet detection result from the sensor.

This size "A3" is the size of the insert sheet I which is necessary to execute the interrupted job which uses the inserter. The stop key on the pop-up screen 4901 is used to cancel the interrupted job. Thus, when this stop key is depressed by the user, the image formation apparatus clears the information of the inserter size-difference alarm, cancels the interrupted job, and waits until a next image formation operation is started.

In the state that the pop-up screen 4901 of FIG. 49 is being displayed, when it is detected by the insert sheet sensor 27 of the inserter 104b that the insert sheet was once got out of and then again stacked to the inserter 104b, the image formation apparatus clears the information of the inserter size-difference alarm and restarts the job from the output of the insert sheet I discharged to the tray 85. At this time, the image formation to the recording sheet which was discharged on the tray 85 subsequent to the insert sheet I and on which the ordinary image was formed is again performed (i.e., the interruption state of the image formation operation is released, and the job is restarted).

As to the condition for restarting the job, it is confirmed by the insert sheet sensor 27 that the insert sheet was once got out of and then again stacked to the inserter 104b (in this case, the insert sheet sensor 27 is turned on, turned off, and then turned on again), it is then confirmed on the screen of the operation unit 40 that the sheet size is anew input by the user, and after then it is possible to restart the job. In this case, it is controlled to display the size setting screen for the insert sheet on the operation panel 4210 so as to permit only the size input operation and inhibit other operations such as mode setting and the like. For example, it is controlled not to accept the key input operation.

Further, the job may be restarted when the sheet is again set to the inserter 104b and then the key such as the copy start key 6140 or the like to instruct the image formation start is depressed.

Further, in the present embodiment, the size of the sheet input from the operation unit by the user was compared with the actual size of the insert sheet I. However, it is possible to compare the size of the insert sheet I with the size of another recording sheet on which the image is to be formed to judge whether or not the size in question is an unquestionable size to which the sheet processing is performed, and to interrupt the image formation operation on the basis of the judged result.

Further, when the sheet size designated by the user through the operation unit is different from the actual sheet size detected by the apparatus, it is possible to cause the user to previously set desired one of the mode to correct the sheet size according to the user's designated size on the operation unit as shown in FIGS. 48A and 48B (i.e., sheet size redesignation on the operation unit) and the mode to cause the user to exchange the sheet set on the inserter 104b for the sheet of which size accords to the size designated on the operation unit by the user as shown in FIG. 49 (i.e., sheet reset on the insert tray). Thus, it may be controlled to change the mode to the user's desired mode when the sheet size designated by the user is different from the actual sheet size detected by the apparatus.

By performing such the display control as above, the effect of the present invention rises further.

The present invention may be applied to a system structured by plural equipments or to an apparatus structured by one equipment. Further, it is needless to say that the present invention can be adapted to a case of attaining the object by supplying a program to the system or the apparatus. In this case, a recording medium which stores a program expressed by software to attain the present invention is read out on the system or the apparatus, thereby, it becomes possible that the system or the apparatus enjoys the effect of the present invention.

Figure 39:
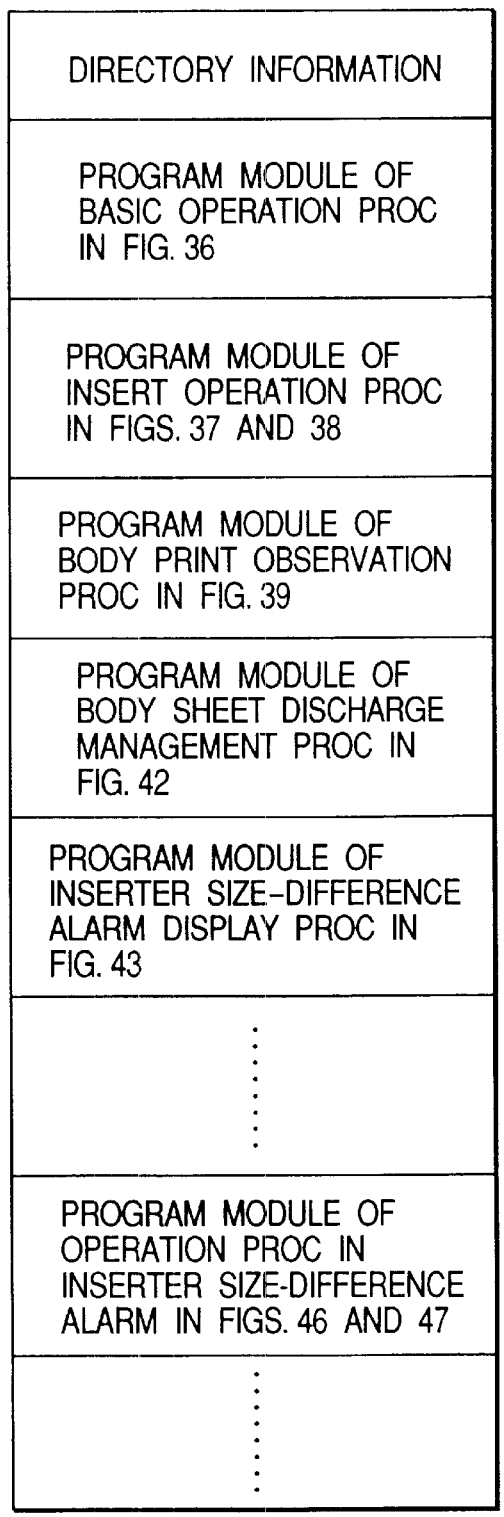
FIG. 39 is a diagram showing a memory map of a ROM in a memory being a storage medium.

FIG. 39 is a diagram showing a memory map of the ROM within the memory 2001 being the storage medium. In this ROM, a program module for the basic operation processing shown in FIG. 36, a program module for the insert operation processing shown FIGS. 37 and 38, a program module for the body print observation processing shown in FIG. 41, a program module for the body sheet discharge management processing shown in FIG. 42, a program module for the inserter size-difference alarm display processing shown in FIG. 43, a program module for the operation processing during the inserter size-difference alarm shown in FIGS. 46 and 47, and the like have been stored.

In addition to the ROM, for example, a floppy disk, a hard disk, an optical disk, a magnetooptical disk, a CD-ROM, a CD-R, a DVD, a magnetic tape, a nonvolatile memory card or the like can be used as the recording medium for supplying the program module.

What is claimed is:

1. A sheet processing apparatus which can be connected to an image formation apparatus and stacks image-formed sheets on which images were formed by said image formation apparatus, comprising:

first stacking means for stacking the sheets;

conveyance means for conveying the sheets stacked on said first stacking means and the image-formed sheets from said image formation apparatus;

second stacking means for stacking the sheets conveyed by said conveyance means from said first stacking means and the image-formed sheets conveyed by said conveyance means from said image formation apparatus;

size detection means for detecting sizes of the sheets stacked on said first stacking means;

abnormality detection means for detecting sheet conveyance abnormality of the sheets conveyed by said conveyance means on the basis of a condition for detecting the sheet conveyance abnormality; and control means for starting to convey the sheets stacked on said first stacking means by said conveyance means prior to the sheet size detection by said size detection means, and for controlling to make the condition of said abnormality detection means before sheet size determination by said size detection means differ from the condition of said abnormality detection means after the sheet size determination by said size detection means.

2. An apparatus according to claim 1, wherein said control means controls data corresponding to a maximum size of the sheet capable of being conveyed normally from said first stacking means to said second stacking means to be managed as a condition of said abnormality detection means until the sheet size is determined by said size detection means, and controls data corresponding to the size of the sheet detected by said size detection means to be managed as the condition of said abnormality detection means after the sheet size was determined by said size detection means.

3. An apparatus according to claim 1, wherein the sheets to be stacked on said first stacking means are stacked by a user.

4. A control method of a sheet processing apparatus which can be connected to an image formation apparatus and has first stacking means for stacking sheets, conveyance means for conveying the sheets stacked on said first stacking means and image-formed sheets on which images were formed by the image formation apparatus, second stacking means for stacking the sheets conveyed by said conveyance means from said first stacking means and the image-formed sheets conveyed by said conveyance means from the image formation apparatus, size detection means for detecting sizes of the sheets stacked on said first stacking means and abnormality detection means for detecting sheet conveyance abnormality of the sheets conveyed by said conveyance means on the basis of a condition for detecting the sheet conveyance abnormality, said method comprising:

a control step of starting to convey the sheets stacked on said first stacking means by said conveyance means prior to the sheet size detection by said size detection means, and of controlling to make the condition of said abnormality detection means before sheet size determination by said size detection means differ from the condition of said abnormality detection means after the sheet size determination by said size detection means.

5. An image formation system which has image formation means for forming images on sheets on the basis of input image data, comprising:

first stacking means for stacking the sheets;

conveyance means for conveying the sheets stacked on said first stacking means and image-formed sheets on which images were formed by said image formation means;

second stacking means for stacking the sheets conveyed by said conveyance means from said first stacking means and the image-formed sheets conveyed by said conveyance means from said image formation means;

size detection means for detecting sizes of the sheets stacked on said first stacking means;

abnormality detection means for detecting a sheet conveyance abnormality of the sheets conveyed by said conveyance means on the basis of a condition for detecting the sheet conveyance abnormality; and control means for starting to convey the sheets stacked on said first stacking means by said conveyance means prior to the sheet size detection by said size detection means, and for controlling to make the condition of said abnormality detection means before sheet size determination by said size detection means differ from the condition of said abnormality detection means after the sheet size determination by said size detection means.

6. An image formation system which has a sheet processing apparatus having conveyance means for conveying sheets, comprising:

detection means for detecting the sheets to be conveyed by said conveyance means;

generation means for generating sheet size information on the basis of the sheet detection result obtained by said detection means; and control means for confirming an abnormal state of the sheets to be conveyed on the basis of a reference value, wherein said control means makes the reference value before the generation of the sheet size information by said generation means differ from the reference value after the generation of the sheet size information by said generation means.

7. A system according to claim 6, wherein said control means sets the reference value before the generation of the sheet size information by said generation means higher than the reference value after the generation of the sheet size information by said generation means.

8. A system according to claim 7, wherein said control means controls the reference value before the generation of the sheet size information by said generation means to be managed as a value corresponding to a maximum size of the sheet capable of being conveyed by said conveyance means and controls a value corresponding to the generated sheet size information to be managed as the reference value in accordance with the fact that the sheet size information was generated by said generation means.

9. A control method of an image formation system which has a sheet processing apparatus having conveyance means for conveying sheets and detection means for detecting the sheets conveyed by said conveyance means, comprising:

a first step of generating sheet size information on the basis of a sheet detection result obtained by said detection means; and a second step of confirming an abnormal state of the sheet to be conveyed on the basis of a reference value, wherein the reference value before the generation of the sheet size information by said generating step is made to differ from the reference value after the generation of the sheet size information by said generating step.

10. A storage medium which stores a computer-readable program to execute the following steps for an image formation system which has a sheet processing apparatus having conveyance means for conveying sheets and detection means for detecting the sheets conveyed by said conveyance means, comprising:

a first step of generating sheet size information on the basis of a sheet detection result obtained by said detection means; and a second step of confirming an abnormal state of the sheet to be conveyed on the basis of a reference value, wherein the reference value before the generation of the sheet size information by said generation means is made differ from the reference value after the generation of the sheet size information by said generation means in said second step.

11. An image formation system which has a sheet processing apparatus for executing processing corresponding to an instruction from an operator to a sheet, comprising:

confirmation means for confirming a size of the sheet; and control means for invalidating the processing corresponding to the instruction from the operator to the sheet in accordance with sheet size information confirmed by said confirmation means and sheet size information acquired according to the instruction from the operator, wherein said sheet processing apparatus can execute sheet processing to the sheet and said control means inhibits the sheet processing to the sheet in accordance with the sheet size information confirmed by said confirmation means and the sheet size information acquired according to the instruction from the operator, even if the sheet processing is included in the processing corresponding to the instruction from the operator.

12. A system according to claim 11, wherein said sheet processing apparatus includes a plurality of sheet storage units for storing sheets and said control means inhibits to store the sheets in the sheet storage unit selected according to the instruction from the operator in accordance with the sheet size information confirmed by said confirmation means and the sheet size information acquired according to the instruction from the operator.

13. A system according to claim 12, wherein said control means stores the sheets in a predetermined sheet storage unit among said plurality of sheet storage units in case of inhibiting to store the sheets in a sheet storage unit selected according to the instruction from the operator.

14. A system according to claim 11, wherein said sheet processing apparatus includes a plurality of sheet storage units for storing the sheets and sheet processing means for executing sheet processing to the sheet, wherein said control means inhibits the sheet processing to the sheet and inhibits to store the sheets in a sheet storage unit selected according to the instruction from the operator so as to store the sheets in other sheet storage units in accordance with the sheet size information confirmed by said confirmation means and the sheet size information acquired according to the instruction from the operator, even if the sheet processing is included in the processing corresponding to the instruction from the operator.

15. An image formation system which performs an image formation operation corresponding to an instruction from an operator and has an image formation apparatus for discharging sheets, on which images were formed, to a sheet processing apparatus, comprising:

confirmation means for confirming sizes of the sheets conveyed in said sheet processing apparatus; and control means for interrupting the image formation operation in accordance with sheet size information confirmed by said confirmation means and sheet size information acquired according to the instruction from the operator.

16. A system according to claim 15, wherein said control means controls to perform a notification to the operator in accordance with the sheet size information confirmed by said confirmation means and the sheet size information acquired according to the instruction from the operator.

17. A system according to claim 15, wherein said control means controls to permit only a predetermined setting change in a state of interrupting the image formation operation.

18. A sheet processing apparatus which inserts an insert sheet into a sheaf of sheets, comprising:

size designation means for designating a size of the insert sheet;

size detection means for detecting the size of the insert sheet;

size comparison means for comparing the designated size of the insert sheet with the detected size of the insert sheet to discriminate whether or not these two sizes are identical with each other; and invalidation means for invalidating processing to the insert sheet when it is discriminated that these two sizes are not identical.

19. An apparatus according to claim 18, further comprising mode selection means for selecting a mode of inserting the insert sheet into a sheaf of the sheets on which images were formed, storage means for storing the insert sheet, set detection means for detecting that the insert sheet was set in said storage means and feed means for feeding the stored insert sheet.

20. An apparatus according to claim 18, wherein said size detection means detects the size of the insert sheet which is being conveyed.

21. An apparatus according to claim 18, wherein said size comparison means compares length of the insert sheet in the conveying direction.

22. An apparatus according to claim 18, wherein said invalidation means invalidates punch processing to the insert sheets.

23. An apparatus according to claim 18, wherein said invalidation means invalidates staple processing to the insert sheets.

24. An apparatus according to claim 18, wherein said invalidation means invalidates adjustment processing to the insert sheets.

25. An apparatus according to claim 18, wherein said invalidation means invalidates discharge processing of discharging the insert sheet to a designated tray.

26. An apparatus according to claim 18, wherein, in a case where the detected size of the insert sheet is not in a predetermined range which involves a core value regarded as the designated size of the insert sheet, said size comparison means discriminates that these two sizes are not identical with each other.

27. A sheet processing method for inserting an insert sheet into a sheaf of sheets on which images were formed, comprising the steps of:

designating a size of the insert sheet;

detecting the size of the insert sheet;

comparing the designated size of the insert sheet with the detected size of the insert sheet to discriminate whether or not these two sizes are identical with each other; and invalidating processing to the insert sheet when it is discriminated that these two sizes are not identical.

28. A storage medium which stores a program to be executed by a computer for controlling a sheet processing apparatus of inserting an insert sheet into a sheaf of sheets on which images were formed, said program comprising:

a procedure of designating a size of the insert sheet;

a procedure of detecting the size of the insert sheet;

a procedure of comparing the designated size of the insert sheet with the detected size of the insert sheet to discriminate whether or not these two sizes are identical with each other; and a procedure of invalidating processing to the insert sheet when it is discriminated that these two sizes are not identical.

29. A sheet processing apparatus which can be connected to an image formation apparatus, comprising:

first stacking means and second stacking means for stacking sheets;

conveyance means for conveying the sheets stacked on said first stacking means and the sheets, on which images were formed by said image formation apparatus, to said second stacking means;

detection means for detecting sizes of the sheets stacked on said first stacking means;

comparison means for comparing a size of the sheet detected by said detection means with a size of the sheet set in said image formation apparatus; and control means for inhibiting to convey the sheets stacked on said first stacking means to said second stacking means on the basis of a compared result obtained by said comparison means.

30. An apparatus according to claim 29, wherein said sheet processing apparatus has third stacking means for stacking the sheets and said control means controls to convey the sheets stacked on said first stacking means to said third stacking means, in case of inhibiting to convey the sheets stacked on said first stacking means to said second stacking means.

31. A control method of a sheet processing apparatus, which can be connected to an image formation apparatus and has first stacking means and second stacking means for stacking sheets, conveys the sheets stacked on said first stacking means and the sheets, on which images were formed by the image formation apparatus, to said second stacking means, said method comprising:
- a detection step of detecting sizes of the sheets stacked on said first stacking means;
- a comparison step of comparing a size of the sheet detected in said detection step with a size of the sheet set in the image formation apparatus; and
- a control step of inhibiting to convey the sheets stacked on said first stacking means to said second stacking means on the basis of a compared result obtained in said comparison step.

32. An image formation system composed of an image formation apparatus for forming images on sheets based on input data and a sheet processing apparatus for stacking the sheets, on which the images were formed by said image formation apparatus, comprising:
- first stacking means and second stacking means for stacking the sheets;
- conveyance means for conveying the sheets stacked on said first stacking means and the sheets, on which images were formed by said image formation apparatus, to said second stacking means;
- detection means for detecting sizes of the sheets stacked on said first stacking means; comparison means for comparing a size of the sheet detected by said detection means with a size of the sheet set in said image formation apparatus; and
- control means for inhibiting to convey the sheets stacked on said first stacking means to said second stacking means on the basis of a compared result obtained by said comparison means.

33. A system according to claim 32, wherein said image formation apparatus includes display means, and when the size of the sheet detected by said detection means is different from the size of the sheet set in said image formation apparatus, said control means notifies this fact to said display means.

34. A system according to claim 32, wherein said control means releases an inhibition of conveying the sheets to said second stacking means on the basis of a predetermined condition.

35. A system according to claim 34, further comprising recovery means for executing recovery processing according to the fact that the inhibition of conveying the sheets to said second stacking means is released by said control means.

36. A control method of a sheet processing apparatus which executes processing corresponding to an instruction from an operator to a sheet, comprising:
- a first step of confirming a size of the sheet; and
- a second step of invalidating the processing corresponding to the instruction from the operator to the sheet in accordance with sheet size information confirmed in said first step and sheet size information acquired according to the instruction from the operator,
- wherein the sheet processing apparatus is controlled to be able to execute sheet processing to the sheet and to inhibit the sheet processing to the sheet in accordance with the sheet size information confirmed in said first step and the sheet size information acquired according to the instruction from the operator, even if the sheet processing is included in the processing corresponding to the instruction from the operator.

37. A control method of an image formation apparatus which performs an image formation operation corresponding to an instruction from an operator and discharges sheets, on which images were formed, to a sheet processing apparatus, comprising:
- a first step of confirming sizes of sheets conveyed by the sheet processing apparatus; and
- a second step of interrupting the image formation operation in accordance with sheet size information confirmed in said first step and sheet size information acquired according to an instruction from an operator.

38. An image formation apparatus which has first sheet member storage means for storing a first sheet member and image formation means for forming an image on the first sheet member fed from said first sheet member storage means, comprising:
- processing/stacking means for processing the first sheet member on which the image was formed and stacking the first sheet member;
- conveyance means for conveying a second sheet member stored in second sheet member storage means to said processing/stacking means without passing it through said image formation means;
- size judgment means for judging a size of the second sheet member when the second sheet member is being conveyed from said second sheet member storage means; and
- interruption control means for interrupting an image formation operation when it is judged that a predetermined condition is satisfied.

39. An apparatus according to claim 38, wherein size input means for inputting a size of the second sheet member is provided and the predetermined condition is characterized in that the size judged by said size judgment means is different from the size input by said size input means.

40. An apparatus according to claim 39, wherein restart control means for restarting the interrupted image formation operation when a size of the second sheet member re-input is identical to the size judged by said size judgment means, is provided.

41. An apparatus according to claim 39, further comprising display means for displaying a message of recommending to reset the size of the second sheet member and a size setting screen when the size judged by said size judgment means is different from the size input by said size input means.

42. An apparatus according to claim 39, further comprising display means for simultaneously displaying a message of informing that the size input on a screen is different from the judged size and a pop-up screen managed not to be overlapped with said message of recommending to change the second sheet member on the screen when the size judged by said size judgment means is different from the size input by said size input means.

43. An apparatus according to claim 42, further comprising second sheet member detection means for detecting a presence or absence of the second sheet member in said second sheet member storage means and restart control means for deleting the pop-up screen to restart the image formation operation when it is judged that the second sheet member was once pulled up to restack it with a state of displaying the pop-up screen, are provided.

44. An apparatus according to claim 42, further comprising second sheet member detection means for detecting presence or absence of the second sheet member in said second sheet member storage means, permission means for permitting to input only the size of the second sheet member when it is judged that the second sheet member was once pulled up to restack it with a state of displaying the pop-up screen and restart control means for restarting the image formation operation when the size of the second sheet member is input by a user on the basis of the permission.

45. An apparatus according to claim 38, wherein the predetermined condition is characterized in that the judged size is a size which can not be processed by said processing/stacking means.

46. An apparatus according to claim 38, wherein display means for displaying the fact that the image formation operation is interrupted by said interruption control means is provided.

47. An apparatus according to claim 38, wherein sheet member detection means for detecting a presence or absence of the second sheet member in said second sheet member storage means and restart control means for restarting the interrupted image formation operation when it is detected that a new second sheet member is stored in said second sheet member storage means after the interruption, are provided.

48. An apparatus according to claim 38, wherein blank sheet output information setting means for setting blank sheet output information to the first sheet member fed from said first sheet member storage means when the image formation operation is interrupted and output destination change means for changing an output destination of the first sheet member to which the blank sheet output information was set, to a stacking unit to which the second sheet member is discharged, are provided and the number of output sheets is not counted when the sheet member to which the blank sheet output information was set is discharged.

49. A control method of an image formation apparatus, which forms an image on a first sheet member fed from a first sheet member storage unit storing the first sheet member, processes the image formed first sheet member to stack it on a processing/stacking unit and conveys a second sheet member stored in a second sheet member storage unit to the processing/stacking unit without passing it through the image formation apparatus, said method comprising the steps of:

judging a size of the second sheet member while the second sheet member is being conveyed from the second sheet member storage unit;

interrupting the image formation operation when the judgment satisfies a predetermined condition;

setting blank sheet output information to the first sheet member fed from the first sheet member storage unit, when the image formation operation is interrupted;

changing an output destination of the first sheet member to which the blank sheet output information was set to a stacking unit to which the second sheet member is discharged; and refraining from counting the number of output sheets when the sheet member to which the blank sheet output information was set is discharged.

50. A storage medium which stores a program to be executed by a computer for controlling an image formation apparatus of forming an image on a first sheet member fed from a first sheet member storage unit storing the first sheet member; said program being to control an image formation operation, process the first sheet member on which an image was formed, stack the first sheet member on a processing/stacking unit, and convey a second sheet member stored in a second sheet member storage unit to the processing/stacking unit without passing it through the image formation apparatus, said program comprising:

a procedure of judging a size of the second sheet member while the second sheet member is being conveyed from the second sheet member storage unit;

a procedure of interrupting the image formation operation when the judgment satisfies a predetermined condition;

a procedure of setting blank sheet output information to the first sheet member fed from the first sheet member storage unit, when the image formation operation is interrupted;

a procedure of changing an output destination of the first sheet member to which the blank sheet output information was set, to a stacking unit to which the second sheet member is discharged; and a procedure of refraining from counting the number of output sheets when the sheet member to which the blank sheet output information was set is discharged.

51. A sheet processing apparatus which can be connected to an image formation apparatus and stacks image-formed sheets on which images were formed by said image formation apparatus, comprising:

first stacking means for stacking the sheets;

conveyance means for conveying the sheets stacked on said first stacking means and the image-formed sheets from said image formation apparatus;

second stacking means for stacking the sheets conveyed by said conveyance means from said first stacking means and the image-formed sheets conveyed by said conveyance means from said image formation apparatus;

size detection means for detecting sizes of the sheets stacked on said first stacking means;

abnormality detection means for detecting sheet conveyance abnormality of the sheets conveyed by said conveyance means on the basis of a condition for detecting the sheet conveyance abnormality; and control means for starting to convey the sheets stacked on said first stacking means by said conveyance means prior to the sheet size detection by said size detection means, wherein the condition of said abnormality detection means before sheet size determination by said size detection means is a predetermined condition, and the condition of said abnormality detection means after the sheet size determination by said size detection means is a condition corresponding to the size of the sheet detected by said size detection means.

52. An apparatus according to claim 51, wherein the condition of said abnormality detection means before sheet size detection by said size detection means is a condition corresponding to a maximum size of the sheet capable of being conveyed normally from said first stacking means to said second stacking means.

53. An image formation system which has a sheet processing apparatus having conveyance means for conveying sheets, comprising:

detection means for detecting the sheets to be conveyed by said conveyance means;

generation means for generating sheet size information on the basis of the sheet detection result obtained by said detection means; and discriminating means for discriminating an abnormal state of the sheets to be conveyed on the basis of a reference value, wherein the reference value before the generation of the sheet size information by said generation means is a predetermined value, and the reference value after the generation of the sheet size information by said generation means is a value corresponding to the generated sheet size information by said generation means.

54. A system according to claim 53, wherein the reference value before the generation of the sheet size information by said generation means is a value corresponding to a maximum size of the sheet capable of being conveyed by said conveyance mans.

55. A system according to claim 53, wherein the abnormal state is a sheet conveyance abnormality.

56. A sheet processing apparatus which conveys an insert sheet, comprising:

size designation means for designating a size of the insert sheet;

size detection means for detecting the size of the insert sheet;

size comparison means for comparing the designated size of the insert sheet with the detected size of the insert sheet to discriminate whether or not these two sizes are identical with each other; and invalidation means for invalidating processing to the insert sheet when it is discriminated that these two sizes are not identical.

57. An apparatus according to claim 56, wherein said size detection means detects the size of the insert sheet which is being conveyed.

58. An apparatus according to claim 56, wherein said size comparison means compares length of the insert sheet in the conveying direction.

59. An apparatus according to claim 56, wherein said invalidation means invalidates punch processing to the insert sheets.

60. An apparatus according to claim 56, wherein said invalidation means invalidates staple processing to the insert sheets.

61. An apparatus according to claim 56, wherein said invalidation means invalidates adjustment processing to the insert sheets.

62. An apparatus according to claim 56, wherein said invalidation means invalidates discharge processing of discharging the insert sheet to a designated tray.

63. An apparatus according to claim 56, wherein, in a case where the detected size of the insert sheet is not in a predetermined range which involves a core value regarded as the designated size of the insert sheet, said size comparison means discriminates that these two sizes are not identical with each other.

* * * * *

UNITED STATES PATENT AND TRADEMARK OFFICE
CERTIFICATE OF CORRECTION

PATENT NO. : 6,339,685 B1
DATED : January 15, 2002
INVENTOR(S) : Kiyoshi Okamoto et al.

Figure 43:
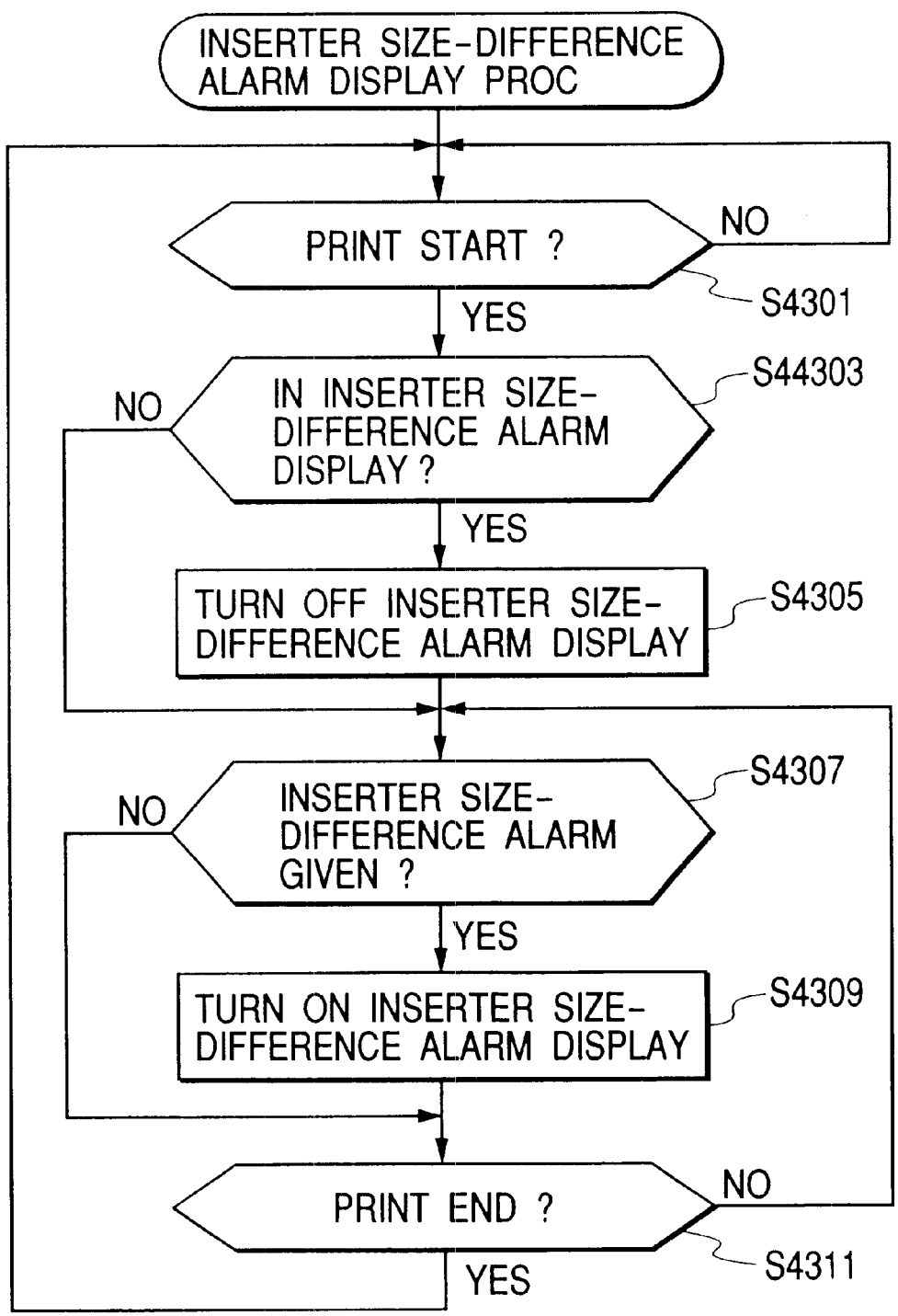
FIG. 43 is a flowchart showing an inserter size-difference alarm display processing procedure.

It is certified that error appears in the above-identified patent and that said Letters Patent is hereby corrected as shown below:

Drawings,
Sheet 43, Figure 43, "IN" should read -- IS --, "S44303" should read -- S4303 --, and "DISPLAY?" should read -- DISPLAYED? --.

Column 1,
Line 21, "slipsheet" should read -- slip sheet --;
Line 31, "divided" should read -- divide --;
Line 34, "process" should read -- processing --;
Line 47, "can not" should read -- cannot --; and
Line 60, "can not" should read -- cannot --.

Column 2,
Line 33, "an" should read -- a --; and
Line 53, "FIGS." should read -- ¶FIGS. --.

Column 6,
Line 28, "can not" should read -- cannot --.

Column 7,
Line 62, "unit 500" should read -- unit 300 --.

Column 8,
Line 64, "(referred" should read -- (referred to --.

Column 9,
Line 16, "is" should read -- are --; and
Line 37, "sheet" should read -- sheets --.

Column 10,
Line 53, "an" should read -- a --.

Column 12,
Line 32, "sheet PI," should read -- sheet P1 --.

Column 13,
Line 2, "according" should read -- accordingly --.

UNITED STATES PATENT AND TRADEMARK OFFICE
CERTIFICATE OF CORRECTION

PATENT NO. : 6,339,685 B1
DATED : January 15, 2002
INVENTOR(S) : Kiyoshi Okamoto et al.

It is certified that error appears in the above-identified patent and that said Letters Patent is hereby corrected as shown below:

Column 14,
Line 48, "ended," should read -- has ended, --.

Column 15,
Line 12, "sheet P1" should read -- sheet P1, --;
Line 13, "images" should read -- images, --;
Line 39, "sheet P2" should read -- sheet P2, --;
Line 40, "images" should read -- images, --; and
Line 53, "data Ri" should read -- data R1 --.

Column 16,
Line 39, "once stopped." should read -- stopped. --.

Column 17,
Line 40, "stapler 818" should read -- stapler 818. --;
Line 52, "To" should read -- to --; and
Line 59, "Judged" should read -- judged --.

Column 18,
Line 18, "step (S2306)" should read -- (step S2306). --;
Line 24, "step (S2307)" should read -- step (S2307). --; and
Line 26, "28 When" should read -- 28. When --.

Column 19,
Line 53, "at the" (second occurrence) should be deleted.

Column 21,
Line 31, "becomes" should read -- turns --;
Line 40, "becomes" should read -- turns --;
Line 41, "becomes" should read -- turns --; and
Line 61, "mode.-Please" should read -- mode. --.

Column 22,
Line 11, "becomes" should read -- turns --;
Line 23, "the" (first occurrence) should be deleted;
Line 32, "ended," should read -- has ended, --;
Line 34, "becomes" (both occurrences) should read -- turns --; and
Line 47, "step S23 11" should read -- step S2311 --.

UNITED STATES PATENT AND TRADEMARK OFFICE
CERTIFICATE OF CORRECTION

PATENT NO. : 6,339,685 B1
DATED : January 15, 2002
INVENTOR(S) : Kiyoshi Okamoto et al.

It is certified that error appears in the above-identified patent and that said Letters Patent is hereby corrected as shown below:

Column 23,
Line 1, "becomes" should read -- turns --;
Line 22, "ended," should read -- has ended, --; and
Line 24, "becomes" (both occurrences) -- turns --.

Column 24,
Line 7, "time elapsed," should read -- elapsed time, --; and
Line 53, "ended," should read -- has ended, --.

Column 25,
Line 10, "ended," should read -- has ended, --.

Column 26,
Line 1, "the" (second occurrence) should read -- The --;
Line 11, "ended," should read -- has ended, --;
Line 43, "D1" should read -- d1 --;
Line 46, "D1" should read -- d1 --; and
Line 60, "(e) and (e)" should read -- (d) and (e) --.

Column 27,
Line 19, "became" should read -- turned --.

Column 28,
Line 4, "according" should read -- accordingly --;
Line 22, "the" should be deleted;
Line 50, "too" should be deleted; and
Line 52, "can not" should read -- cannot --.

Column 29,
Line 6, " "detect_length" " should read -- "detect_length1" --.

Column 30,
Line 58, "ended" should read -- has ended --.

Column 31,
Line 33, "processing" should read -- processings --.

UNITED STATES PATENT AND TRADEMARK OFFICE
CERTIFICATE OF CORRECTION

PATENT NO. : 6,339,685 B1
DATED : January 15, 2002
INVENTOR(S) : Kiyoshi Okamoto et al.

It is certified that error appears in the above-identified patent and that said Letters Patent is hereby corrected as shown below:

Column 32,
Line 25, "differ" should read -- to differ --.

Column 33,
Line 27, "farther" should read -- further --.

Column 35,
Line 54, "roller 26" should read -- roller 26. --.

Column 36,
Line 35, "pat" should read -- path --; and
Line 66, "the" (second occurrence) should be deleted.

Column 38,
Line 1, "the" (second occurrence) should be deleted;
Line 11, "processing was" should read -- processings were --; and
Line 14, "exposure" should read -- expose --.

Column 40,
Line 7, "tray" should read -- tray 20 --.

Column 41,
Line 6, "that" should be deleted;
Line 50, "most-easily" should read -- most easily --; and
Line 59, "the" should be deleted.

Column 42,
Line 19, "designated" should read -- designates --;
Line 24, "is" should read -- are --; and
Line 61, "sheet" should read -- sheets --.

Column 43,
Line 2, "sheet" should read -- sheets --; and
Line 28, "is" should read -- are --.

UNITED STATES PATENT AND TRADEMARK OFFICE
CERTIFICATE OF CORRECTION

PATENT NO. : 6,339,685 B1
DATED : January 15, 2002
INVENTOR(S) : Kiyoshi Okamoto et al.

It is certified that error appears in the above-identified patent and that said Letters Patent is hereby corrected as shown below:

Column 44,
Line 10, "according as all the sheet" should read -- accordingly as all the sheets --;
Line 12, "according" should read -- accordingly --;
Line 35, "According" should read -- Accordingly --; and
Line 56, "according" should read -- accordingly --.

Column 45,
Line 32, "sheets" should read -- sheet --; and
Line 50, "sheet" should read -- sheets --.

Column 46,
Line 2, "processing is" should read -- processings are --;
Line 38, "the" (second occurrence) should be deleted;
Line 46, "flow chart" should read -- flowchart --; and
Line 52, "flow chart" should read -- flowchart --.

Column 48,
Line 56, "the" (first occurrence) should be deleted; and
Line 64, "the" should be deleted.

Column 49,
Line 1, "can not" should read -- cannot --;
Line 2, "can not" should read -- cannot --;
Line 22, "got out of" should read -- retrieved from --; and
Line 34, "got out of" should read -- retrieved from --.

Column 50,
Line 4, "the" (first occurrence) should be deleted; and
Line 29, "magnetooptical" should read -- magneto-optical --.

Column 55,
Line 33, "comparison" should read -- ¶comparison --.

Column 57,
Line 15, "can not" should read -- cannot --.

UNITED STATES PATENT AND TRADEMARK OFFICE
CERTIFICATE OF CORRECTION

PATENT NO. : 6,339,685 B1
DATED : January 15, 2002
INVENTOR(S) : Kiyoshi Okamoto et al.

It is certified that error appears in the above-identified patent and that said Letters Patent is hereby corrected as shown below:

<u>Column 59,</u>
Line 17, "mans." should read -- means. --.

Signed and Sealed this

Thirteenth Day of August, 2002

Attest:

JAMES E. ROGAN
Attesting Officer   Director of the United States Patent and Trademark Office